(12) United States Patent
Vandike et al.

(10) Patent No.: US 12,550,821 B2
(45) Date of Patent: Feb. 17, 2026

(54) SYSTEMS AND METHODS FOR PREDICTIVE REEL CONTROL

(71) Applicant: Deere & Company, Moline, IL (US)

(72) Inventors: Nathan R. Vandike, Geneseo, IL (US); Duane M. Bomleny, Geneseo, IL (US)

(73) Assignee: Deere & Company, Moline, IL (US)

( * ) Notice: Subject to any disclaimer, the term of this patent is extended or adjusted under 35 U.S.C. 154(b) by 908 days.

(21) Appl. No.: 17/695,213

(22) Filed: Mar. 15, 2022

(65) Prior Publication Data

US 2023/0292665 A1    Sep. 21, 2023

(51) Int. Cl.
| | |
|---|---|
| *A01D 41/14* | (2006.01) |
| *A01D 41/127* | (2006.01) |
| *A01D 57/12* | (2006.01) |
| *G05D 1/00* | (2024.01) |

(52) U.S. Cl.
CPC ......... *A01D 41/141* (2013.01); *A01D 41/127* (2013.01); *A01D 57/12* (2013.01); *G05D 1/0219* (2013.01); *G05D 1/0274* (2013.01)

(58) Field of Classification Search
CPC .... A01D 41/141; A01D 41/127; A01D 57/12; A01D 57/02; A01D 57/04; A01D 41/06; G05D 1/0219; G05D 1/0274
See application file for complete search history.

(56) References Cited

U.S. PATENT DOCUMENTS

| | | | |
|---|---|---|---|
| 10,049,296 B2 | 8/2018 | Walker | |
| 10,315,655 B2 * | 6/2019 | Blank | B60W 10/20 |
| 10,757,859 B2 | 9/2020 | Dima et al. | |
| 10,829,033 B1 | 11/2020 | McKinney et al. | |
| 2018/0139898 A1 | 5/2018 | Shearer | |
| 2019/0327892 A1 | 10/2019 | Fries et al. | |
| 2019/0335661 A1 | 11/2019 | Seiders | |
| 2020/0236853 A1 | 7/2020 | Trowbridge | |
| 2020/0337240 A1 | 10/2020 | Brimeyer et al. | |
| 2020/0359562 A1 | 11/2020 | Hunt et al. | |
| 2020/0375107 A1 | 12/2020 | Duerksen et al. | |
| 2020/0390035 A1 | 12/2020 | Hunt et al. | |
| 2021/0022283 A1 | 1/2021 | Vandike et al. | |
| 2021/0029877 A1 * | 2/2021 | Vandike | A01D 69/00 |

(Continued)

FOREIGN PATENT DOCUMENTS

| | | |
|---|---|---|
| BR | 102020026350 A2 | 7/2022 |
| CN | 111226603 A | 6/2020 |

(Continued)

OTHER PUBLICATIONS

Reza Karmulla Chaab et al., "Predicting Header Wheat Loss in a Combine Harvester, a New Approach" Sep. 18. 2018, 7 pages.

(Continued)

*Primary Examiner* — Kyle J Kingsland
(74) *Attorney, Agent, or Firm* — Kelly, Holt & Christenson; Joseph R. Kelly

(57) ABSTRACT

A predictive map is obtained by an agricultural system. The predictive map maps characteristic values at different geographic locations in a field. A geographic position sensor detects a geographic location of an agricultural harvester at the field. A control system generates a control signal to control a reel subsystem of the agricultural harvester based on the geographic location of the agricultural harvester and the predictive map.

19 Claims, 15 Drawing Sheets

(56) References Cited

U.S. PATENT DOCUMENTS

| | | |
|---|---|---|
| 2021/0029878 A1 | 2/2021 | Vandike et al. |
| 2021/0059117 A1 | 3/2021 | Hunt |
| 2021/0102713 A1 | 4/2021 | Kageyama et al. |
| 2021/0120738 A1 | 4/2021 | Ricketts et al. |
| 2021/0137006 A1* | 5/2021 | Shearer .............. A01D 41/1271 |
| 2021/0185877 A1 | 6/2021 | Hunt et al. |
| 2021/0185879 A1 | 6/2021 | Hunt et al. |
| 2021/0185880 A1 | 6/2021 | Martin et al. |
| 2021/0185916 A1 | 6/2021 | Hunt |
| 2021/0185917 A1 | 6/2021 | Hunt et al. |
| 2021/0185919 A1 | 6/2021 | Hunt |
| 2021/0212248 A1 | 7/2021 | Kong et al. |
| 2021/0212254 A1 | 7/2021 | Thomas et al. |
| 2021/0235622 A1 | 8/2021 | Baumgarten et al. |
| 2021/0237982 A1 | 8/2021 | Trowbridge et al. |
| 2021/0289702 A1 | 9/2021 | Jung et al. |
| 2021/0289703 A1 | 9/2021 | Hunt et al. |
| 2021/0307234 A1 | 10/2021 | Jongmans et al. |
| 2021/0307235 A1 | 10/2021 | Jongmans et al. |
| 2021/0307248 A1 | 10/2021 | Missotten et al. |
| 2021/0307249 A1 | 10/2021 | Jongmans et al. |
| 2021/0329837 A1 | 10/2021 | Schnaider et al. |
| 2021/0392814 A1 | 12/2021 | Verhoef et al. |
| 2022/0000023 A1 | 1/2022 | Du et al. |
| 2022/0000024 A1 | 1/2022 | Zielke et al. |
| 2022/0053693 A1 | 2/2022 | Gahres et al. |
| 2022/0061218 A1 | 3/2022 | Karst |
| 2022/0071093 A1 | 3/2022 | Risius |
| 2022/0087101 A1 | 3/2022 | Hunt et al. |
| 2022/0117143 A1 | 4/2022 | Kraus et al. |
| 2022/0167556 A1 | 6/2022 | Peters |
| 2022/0183229 A1 | 6/2022 | Hunt |
| 2022/0225569 A1 | 7/2022 | Zielke et al. |
| 2022/0232770 A1 | 7/2022 | Yanke et al. |
| 2022/0240446 A1 | 8/2022 | Martin |
| 2022/0264798 A1 | 8/2022 | Martin et al. |
| 2022/0304228 A1 | 9/2022 | Hunt et al. |
| 2022/0312676 A1 | 10/2022 | Reubens et al. |
| 2022/0338416 A1 | 10/2022 | Racchella et al. |
| 2022/0354056 A1 | 11/2022 | Hunt et al. |
| 2022/0369556 A1 | 11/2022 | Yanke et al. |
| 2022/0369557 A1 | 11/2022 | Hunt et al. |
| 2022/0369558 A1 | 11/2022 | Scharmann et al. |
| 2022/0377978 A1 | 12/2022 | Laugen et al. |
| 2022/0394927 A1 | 12/2022 | Seiders |
| 2022/0394928 A1 | 12/2022 | Seiders |
| 2022/0400611 A1 | 12/2022 | Missotten et al. |
| 2023/0176025 A1* | 6/2023 | Boddy .................. A01D 45/00 73/865.8 |

FOREIGN PATENT DOCUMENTS

| | | |
|---|---|---|
| CN | 111436276 A | 7/2020 |
| CN | 111819993 A | 10/2020 |
| CN | 111903317 A | 11/2020 |
| CN | 111990062 A | 11/2020 |
| CN | 212413857 U | 1/2021 |
| CN | 212589003 U | 2/2021 |
| CN | 112690089 A | 4/2021 |
| CN | 113016358 A | 6/2021 |
| CN | 113099836 A | 7/2021 |
| CN | 113228939 A | 8/2021 |
| CN | 113243194 A | 8/2021 |
| CN | 113607096 A | 11/2021 |
| CN | 113661827 A | 11/2021 |
| CN | 214902224 U | 11/2021 |
| CN | 113966667 A | 1/2022 |
| CN | 114187353 A | 3/2022 |
| CN | 114223386 A | 3/2022 |
| CN | 114303621 A | 4/2022 |
| CN | 114342665 A | 4/2022 |
| CN | 114467504 A | 5/2022 |
| CN | 114631426 A | 6/2022 |
| CN | 216930906 U | 7/2022 |
| CN | 114916306 A | 8/2022 |
| CN | 115067062 A | 9/2022 |
| EP | 3430881 A1 | 1/2019 |
| EP | 3861842 A1 | 8/2021 |
| EP | 3861843 A1 | 8/2021 |
| IN | 202021036612 A | 4/2022 |
| WO | 2021062552 A1 | 4/2021 |
| WO | 2021116802 A1 | 6/2021 |
| WO | 2021123963 A1 | 6/2021 |
| WO | 2021133756 A1 | 7/2021 |
| WO | 2021217112 A1 | 10/2021 |
| WO | 2021222592 A1 | 11/2021 |
| WO | 2021242867 A1 | 12/2021 |
| WO | 2022003457 A1 | 1/2022 |
| WO | 2022040765 A1 | 3/2022 |
| WO | 2022040769 A1 | 3/2022 |
| WO | 2022077122 | 4/2022 |
| WO | 2022147601 A1 | 7/2022 |
| WO | 2022212355 A2 | 10/2022 |
| WO | 2022232244 A1 | 11/2022 |
| WO | 2023278658 A1 | 1/2023 |

OTHER PUBLICATIONS

Extended European Search Report and Written Opinion issued in counterpart European Patent Application No. 23159704.8, dated Jul. 25, 2023, in 06 pages.

* cited by examiner

SYSTEMS AND METHODS FOR PREDICTIVE REEL CONTROL

FIELD OF THE DESCRIPTION

The present description relates agricultural harvesters. More particularly, the present description relates to predictively controlling an agricultural harvester.

BACKGROUND

There are several different types of agricultural harvesters. One type of agricultural harvester is a combine harvester which can have different heads attached to harvest different types of crops.

In one example, a cutter head can be attached to a combine harvester in order to harvest crop. A cutter head includes a cutter bar, a reel disposed above the cutter bar, and a cross conveyer (e.g., a cross auger) which delivers cut crop material to a feeder house. The reel engages crop and transports it rearward such that it can be cut by the cutter bar and engaged by the cross conveyer. The reel includes a number of reel arms to each of which a plurality of reel finger carriers are coupled. The reel finger carriers each carry one or more reel fingers. The reel fingers engage and feed the crop rearward.

The discussion above is merely provided for general background information and is not intended to be used as an aid in determining the scope of the claimed subject matter.

SUMMARY

A predictive map is obtained by an agricultural system. The predictive map maps characteristic values at different geographic locations in a field. A geographic position sensor detects a geographic location of an agricultural harvester at the field. A control system generates a control signal to control a reel subsystem of the agricultural harvester based on the geographic location of the agricultural harvester and the predictive map.

Example 1 is an agricultural system comprising:
a communication system that receives a predictive map that maps predictive values of a first characteristic corresponding to different geographic locations in a field;
a geographic position sensor that detects a geographic location of an agricultural harvester at the field;
a control system that generates a control signal to control a reel subsystem of the agricultural harvester based on the geographic location of the agricultural harvester and the predictive map.

Example 2 is the agricultural system of any or all previous examples and further comprising:
an in-situ sensor that detects a value of the first characteristic corresponding to a geographic location;
a predictive model generator that:
receives an information map that includes values of a second characteristic corresponding to different geographic locations in the field; and
generates a predictive model that models a relationship between values of the second characteristic and values of the first characteristic based on the value of the first characteristic detected by the in-situ sensor corresponding to the geographic location and a value of the second characteristic in the information map at the geographic location to which the detected value of the first characteristic corresponds; and
a predictive map generator that generates, as the predictive map, a functional predictive map of the field that maps predictive values of the first characteristic to the different geographic locations in the field, based on the values of the second characteristic in the information map and based on the predictive model.

Example 3 is the agricultural system of any or all previous examples, wherein the in-situ sensor detects, as the value of the first characteristic, a missed crop value corresponding to the geographic location;
wherein the predictive model generator generates, as the predictive model, a predictive missed crop model that models a relationship between values of the second characteristic and missed crop values based on the missed crop value detected by the in-situ sensor corresponding to the geographic location and a value of the second characteristic in the information map at the geographic location to which the detected missed crop value corresponds, the predictive missed crop model being configured to receive a value of the second characteristic as a model input and generate a predictive missed crop value as a model output; and
wherein the predictive map generator generates, as the functional predictive map, a functional predictive missed crop map of the field that maps predictive missed crop values to the different geographic locations in the field, based on the values of the second characteristic in the information map and based on the predictive missed crop model.

Example 4 is the agricultural system of any or all previous examples, wherein the in-situ sensor detects, as the value of the first characteristic, a control input value corresponding to the geographic location;
wherein the predictive model generator generates, as the predictive model, a predictive control input model that models a relationship between values of the second characteristic and control input values based on the control input value detected by the in-situ sensor corresponding to the geographic location and a value of the second characteristic in the information map at the geographic location to which the detected control input value corresponds, the predictive control input model being configured to receive a value of the second characteristic as a model input and generate a predictive control input value as a model output; and
wherein the predictive map generator generates, as the functional predictive map, a functional predictive control input map of the field that maps predictive control input values to the different geographic locations in the field, based on the values of the second characteristic in the information map and based on the predictive control input model.

Example 5 is the agricultural system of any or all previous examples, wherein the in-situ sensor detects, as the value of the first characteristic, a reel wrapping value corresponding to the geographic location;
wherein the predictive model generator generates, as the predictive model, a predictive reel wrapping model that models a relationship between values of the second characteristic and reel wrapping values based on the reel wrapping value detected by the in-situ sensor corresponding to the geographic location and a value of the second characteristic in the information map at the geographic location to which the detected reel wrapping value corresponds, the predictive reel wrapping model being configured to receive a value of the second characteristic as a model input and generate a predictive reel wrapping value as a model output; and wherein the predictive map generator generates, as the functional predictive map, a functional predictive reel wrapping map of the field that maps predictive reel wrapping values to the different geographic locations in the field, based on the values of the second characteristic in the information map and based on the predictive reel wrapping model.

Example 6 is the agricultural system of any or all previous examples, wherein the in-situ sensor detects, as the value of the first characteristic, a reel carryover value corresponding to the geographic location;
wherein the predictive model generator generates, as the predictive model, a predictive reel carryover model that models a relationship between values of the second characteristic and reel carryover values based on the reel carryover value detected by the in-situ sensor corresponding to the geographic location and a value of the second characteristic in the information map at the geographic location to which the detected reel carryover value corresponds, the predictive reel carryover model being configured to receive a value of the second characteristic as a model input and generate a predictive reel carryover value as a model output; and
wherein the predictive map generator generates, as the functional predictive map, a functional predictive reel carryover map of the field that maps predictive reel carryover values to the different geographic locations in the field, based on the values of the second characteristic in the information map and based on the predictive reel carryover model.

Example 7 is the agricultural system of any or all previous examples, wherein the in-situ sensor detects, as the value of the first characteristic, a reel tossing value corresponding to the geographic location;
wherein the predictive model generator generates, as the predictive model, a predictive reel tossing model that models a relationship between values of the second characteristic and reel tossing values based on the reel tossing value detected by the in-situ sensor corresponding to the geographic location and a value of the second characteristic in the information map at the geographic location to which the detected reel tossing value corresponds, the predictive reel tossing model being configured to receive a value of the second characteristic as a model input and generate a predictive reel tossing value as a model output; and
wherein the predictive map generator generates, as the functional predictive map, a functional predictive reel tossing map of the field that maps predictive reel tossing values to the different geographic locations in the field, based on the values of the second characteristic in the information map and based on the predictive reel tossing model.

Example 8 is the agricultural system of any or all previous examples, wherein the in-situ sensor detects, as the value of the first characteristic, a shatter value corresponding to the geographic location;
wherein the predictive model generator generates, as the predictive model, a predictive shatter model that models a relationship between values of the second characteristic and shatter values based on the shatter value detected by the in-situ sensor corresponding to the geographic location and a value of the second characteristic in the information map at the geographic location to which the detected shatter value corresponds, the predictive shatter model being configured to receive a value of the second characteristic as a model input and generate a predictive shatter value as a model output; and
wherein the predictive map generator generates, as the functional predictive map, a functional predictive shatter map of the field that maps predictive shatter values to the different geographic locations in the field, based on the values of the second characteristic in the information map and based on the predictive shatter model.

Example 9 is the agricultural system of any or all previous examples and further comprising:
an in-situ sensor that detects a value of the first characteristic corresponding to a geographic location;
an in-situ reel parameter sensor that detects a value of a reel parameter corresponding to the geographic location;
a predictive model generator that:
receives an information map that includes values of a second characteristic corresponding to different geographic locations in the field; and
generates a predictive model that models a relationship between values of the first characteristic, values of the second characteristic, and reel parameter values, based on the value of the first characteristic detected by the in-situ sensor corresponding to the geographic location, the reel parameter value detected by the in-situ reel parameter sensor corresponding to the geographic location, and a value of the second characteristic in the information map at the geographic location to which the detected value of the first characteristic corresponds; and
a predictive map generator that generates, as the predictive map, a functional predictive map of the field that maps predictive values of the first characteristic to the different geographic locations in the field, based on expected reel parameter values, the values of the second characteristic in the information map, and the predictive model.

Example 10 is the agricultural system of any or all previous examples, wherein the reel subsystem comprises an actuator that is controllably actuatable to adjust a position of a reel of the agricultural harvester, and wherein the control signal controls the actuator to adjust a position of the reel based on the geographic location of the agricultural harvester and the predictive map.

Example 11 is the agricultural system of any or all previous examples, wherein the reel subsystem comprises a reel speed actuator that is controllable to adjust a rotational speed of a reel of the agricultural harvester, and wherein the control signal controls the reel speed actuator to adjust a rotational speed of the reel based on the geographic location of the agricultural harvester and the predictive map.

Example 12 is the agricultural system of any or all previous examples, wherein the reel subsystem comprises a reel finger position actuator that is controllably actuatable to adjust a position of a reel finger of the agricultural harvester, and wherein the control signal controls the reel finger position actuator to adjust a position of the reel finger based on the geographic location of the agricultural harvester and the predictive map.

Example 13 is a method of controlling an agricultural harvester comprising:
receiving a predictive map of a field that maps predictive values of a first characteristic corresponding to different geographic locations in the field;
detecting a geographic location of the agricultural harvester at the field; and generating a control signal to control a reel subsystem of the agricultural harvester based on the geographic location of the agricultural harvester and the predictive map.

Example 14 is a method of any or all previous examples and further comprising:
receiving an information map that maps values of a second characteristic corresponding to the different geographic locations in the field;
detecting, with an in-situ sensor, a value of the first characteristic corresponding to a geographic location;
generating a predictive model that models a relationship between the first characteristic and the second characteristic; and
generating, as the predictive map, a functional predictive map of the field, that maps predictive values of the first characteristic to the different locations in the field based on the values of the second characteristic in the information map and the predictive model.

Example 15 is the method of any or all previous examples, wherein receiving the information maps comprises receiving one of:
an optical characteristic map that maps, as the values of the second characteristic, optical characteristic values corresponding to the different geographic locations in the field;
a crop state map that maps, as the values of the second characteristic, crop state values corresponding to the different geographic locations in the field;
a crop height map that maps, as the values of the second characteristic, crop height values corresponding to the different geographic locations in the field;
a vegetative index map that maps, as the values of the second characteristic, vegetative index values to the different geographic locations in the field;
a yield map that maps, as the values of the second characteristic, yield values to the different geographic locations in the field of interest;
a weed map that maps, as the values of the second characteristic, weed values to the different geographic locations in the field of interest;
a crop moisture map that maps, as the values of the second characteristic, crop moisture values to the different geographic locations in the field of interest; or
a genotype map that maps, as the values of the second characteristic, genotype values to the different geographic locations in the field of interest.

Example 16 is the method of any or all previous examples, wherein generating the control signal comprises generating the control signal to control a reel height actuator, of the reel subsystem, that is actuatable to adjust a height of a reel of the agricultural harvester based on the functional predictive map and the geographic location of the agricultural harvester or generating the control signal to control a reel fore-to-aft position actuator, of the reel subsystem, that is actuatable to adjust a fore-to-aft position of the reel of the agricultural harvester based on the functional predictive map and the geographic location of the agricultural harvester.

Example 17 is the method of any or all previous examples, wherein generating the control signal comprises generating the control signal to control a reel speed actuator, of the reel subsystem, that is actuatable to adjust a rotational speed of a reel of the agricultural harvester based on the functional predictive map and the geographic location of the agricultural harvester.

Example 18 is the method of any or all previous examples, wherein generating the control signal comprises generating the control signal to control a reel finger position actuator, of the reel subsystem, that is actuatable to adjust a position of a reel finger of the agricultural harvester based on the functional predictive map and the geographic location of the agricultural harvester.

Example 19 is an agricultural harvester comprising:
a communication system that receives a predictive map that maps predictive values of a first characteristic corresponding to different geographic locations in a field;
a geographic position sensor that detects a geographic location of the agricultural harvester in the field; and
a control system that generates a control signal to control a reel subsystem of the agricultural harvester based on the geographic location of the agricultural harvester and the predictive map.

Example 20 is the agricultural harvester of any or all previous examples, wherein the communication system receives an information map that includes values of a second characteristic corresponding to the different geographic locations in the field, the agricultural harvester further comprising:
an in-situ sensor that detects a value of the first characteristic corresponding to a geographic location at the field;
a predictive model generator that generates a predictive model that models a relationship between the first characteristic and the second characteristic based on the value of the first characteristic, detected by the in-situ sensor, corresponding to the geographic location and a value of the second characteristic in the information map at the geographic location to which the detected value of the first characteristic corresponds; and
a predictive map generator that generates, as the predictive map, a functional predictive map of the field, that maps predictive values of the first characteristic to the different geographic locations in the field, based on the values of the second characteristic in the information map and based on the predictive model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
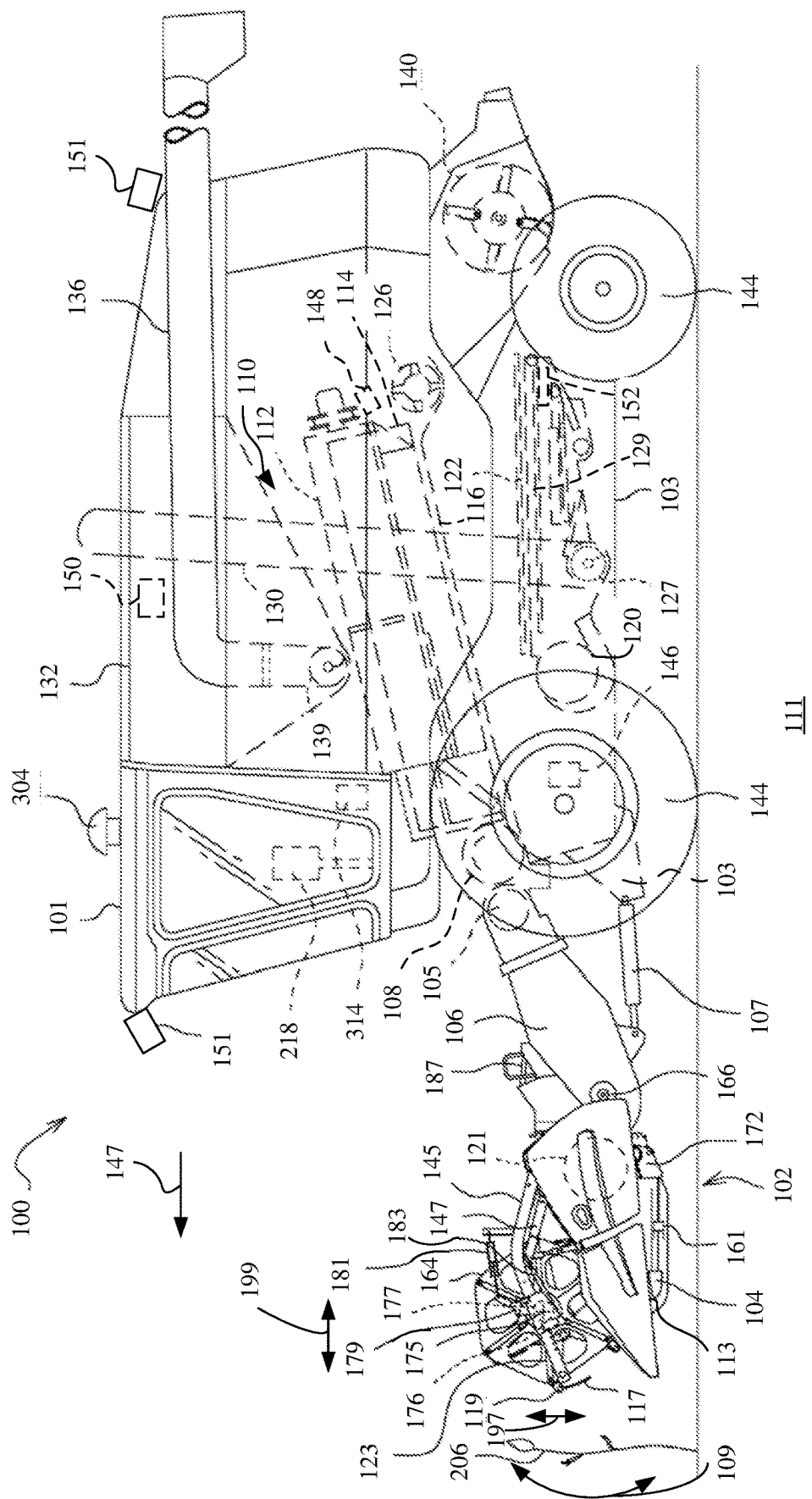
FIG. 1 is a partial pictorial, partial schematic illustration of one example of an agricultural harvester.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

In one example, the present description relates to using in-situ data taken concurrently with an operation, in combination with prior or predicted data, such as prior or predicted data represented in a map, to generate a predictive model and a predictive map. In some examples, the predictive map can be used to control a mobile machine.

As discussed above, agricultural harvesting machines, such as combine harvesters, can be attached to different types of heads for harvesting different types of crops. One such head is a cutter head that includes, among other things, a cutter bar, a reel disposed above the cutter bar, and a cross conveyer, such as a cross auger. The reel engages crop at the field and draws it rearwards, towards cutter bar such that the crop is severed at a cut height. The cut crop is carried further by the reel towards the cross auger which delivers the cut crop to a centrally disposed feeder house.

As characteristics at the field vary, the performance of the head in harvesting crop may also vary. For instance, as the characteristics at the field vary, the performance of the reel may also vary, if kept at the same set points. Thus, it may be desirable to vary the operating parameters of the reel, such as the height of the reel, the fore-to-aft position of the reel, the position of the reel fingers, as well as the reel speed as the characteristics at the field vary.

In one example, the present description relates to obtaining a map such as an optical characteristic map. The optical characteristic map illustratively includes geolocated electromagnetic radiation values across different geographic locations in a field of interest. Electromagnetic radiation values can be from across the electromagnetic spectrum. This disclosure uses electromagnetic radiation values from infrared, visible light and ultraviolet portions of the electromagnetic spectrum as examples only and other portions of the spectrum are also envisioned. An optical characteristic map may map datapoints by wavelength (e.g., a vegetative index). In other examples, an optical characteristic map identifies textures, patterns, color, shape, or other relations of data points. Textures, patterns, or other relations of data points can be indicative of presence or identification of characteristics in the field, such as crop state (e.g., downed/lodged or standing crop), plant presence, plant type, insect presence, insect type, etc. For example, plant type can be identified by a given leaf pattern or plant structure which can be used to identify the plant. For instance, a canopied vine weed growing amongst crop plants can be identified by a pattern. Or for example, an insect silhouette or a bite pattern in a leaf can be used to identify the insect. The optical characteristic map can be derived using satellite images, optical sensors on flying vehicles such as UAVS, or optical sensors on a ground-based system, such as another machine operating in the field before the harvesting operation. In some examples, optical characteristic maps may map three-dimensional values as well such as crop height when a stereo camera or lidar system is used to generate the map. These are merely some examples. The optical characteristic map can be generated in a variety of other ways.

In one example, the present description relates to obtaining a map such as a crop state map. The crop state map includes geolocated crop state values across different geographic locations at a field of interest. Without limitation, the crop state values may indicate a degree (magnitude) of downing (e.g., not down, partially down, fully down), as well as the direction (e.g., compass direction) in which the crops are downed. The crop state map may be derived from sensor readings taken during a prior operation, performed by a machine, at the field of interest (e.g., a prior spraying operation) or taken during an aerial survey of the field of interest (e.g., drone survey, plane survey, satellite survey, etc.). These machines may be outfitted with one or more different types of sensors, such as imaging systems (e.g., cameras), optical sensors, lidar, radar, ultrasonic sensors, as well as sensors that detect one or more bands of electromagnetic radiation reflected by the plants on the field of interest. These are merely some examples. The crop state map can be generated in a variety of other ways.

In one example, the present description relates to obtaining a map such as a crop height map. The crop height map includes geolocated crop height values across different geographic locations at a field of interest. The crop height map may be derived from sensor readings taken during a prior operation, performed by a machine, at the field of interest (e.g., a prior spraying operation) or taken during an aerial survey of the field of interest (e.g., drone survey, plane survey, satellite survey, etc.). These machines may be outfitted with one or more different types of sensors, such as imaging systems (e.g., cameras), optical sensors, lidar, radar, ultrasonic sensors, as well as sensors that detect one or more bands of electromagnetic radiation reflected by the plants on the field of interest. In some examples, the crop height map may be a predictive crop height map that maps predictive crop height values across different geographic locations in a field of interest. The predictive crop height values may be derived from historical crop height values, crop growth models, values measured from earlier in the season, expert knowledge, seed provider data, or by a predictive model generator and predictive map generator as described herein, as well as various other sources. These are merely some examples. The crop height map can be generated in a variety of other ways.

In one example, the present description relates to obtaining a map such as a vegetative index map. The vegetative index map includes geolocated vegetative index values across different geographic locations at a field of interest. Vegetative index values may be indicative of vegetative growth or vegetation health, or both. One example of a vegetative index includes a normalized difference vegetation index (NDVI). There are many other vegetative indices that are within the scope of the present disclosure. In some examples, a vegetative index may be derived from sensor readings of one or more bands of electromagnetic radiation reflected by the plants. Without limitations, these bands may be in the microwave, infrared, visible, or ultraviolet portions of the electromagnetic spectrum. A vegetative index map can be used to identify the presence and location of vegetation (e.g., crop, weeds, etc.). A vegetative index map can be generated in a variety of other ways.

In one example, the present description relates to obtaining a map such as yield map. The yield map includes geolocated yield values across different geographic locations at a field of interest. The yield map may be derived from sensor readings taken during a prior operation, performed by a machine, at the field of interest (e.g., a prior spraying operation) or taken during an aerial survey of the field of interest (e.g., drone survey, plane survey, satellite survey, etc.). These machines may be outfitted with one or more different types of sensors, such as imaging systems (e.g., cameras), optical sensors, lidar, radar, ultrasonic sensors, as well as sensors that detect one or more bands of electromagnetic radiation reflected by the plants on the field of interest. The yield map may be derived from a vegetative index, such as a yield map having predictive yield values based on vegetative index values. The yield map may be based on historical yield values, such as historical yield values for the same field, or another field. The yield map may generate during a current harvesting operation based on in-situ yield values and a predictive model that models a relationship between the in-situ yield values and one or more other characteristics of the field (which may be contained in a map). These are merely examples. A yield map can be generated in a variety of other ways.

In one example, the present description relates to obtaining a map such as a weed map. The weed map includes geolocated weed values across different geographic locations at a field of interest. The weed values may indicate one or more of weed intensity and weed type. Without limitation, weed intensity may include at least one of weed presence, weed population, weed growth stage, weed biomass, weed moisture, weed density, a height of weeds, a size of weed plants, an age of weeds, and health condition of weeds at locations in the field of interest. Without limitation, weed type may include weed genotype information (e.g., weed species) or more broad categorization of type, such as vine type weed and non-vine type weed. The weed map may derived from sensor readings taken during a prior operation, performed by a machine, at the field of interest (e.g., a prior spraying operation) or taken during an aerial survey of the field of interest (e.g., drone survey, plane survey, satellite survey, etc.). These machines may be outfitted with one or more different types of sensors, such as imaging systems (e.g., cameras), optical sensors, ultrasonic sensors, as well as sensors that detect one or more bands of electromagnetic radiation reflected by the plants on the field of interest. Alternatively, or additionally, the weed map may be derived from vegetative index values at the field of interest (such as vegetative index values in a vegetative index map). One example of a vegetive index is a normalize difference vegetation index (NDVI). There are many other vegetative indices that are within the scope of the present disclosure, including, but not limited to, a leaf area index (LAI). These are merely some examples. The weed map can be generated in a variety of other ways.

In one example, the present description relates to obtaining a map such as a crop moisture map. A crop moisture map includes geolocated values of crop moisture across different locations at a field of interest. The crop moisture map may be derived from sensor readings taken during a prior operation, performed by a machine, at the field of interest (e.g., a prior spraying operation) or taken during an aerial survey of the field of interest (e.g., drone survey, plane survey, satellite survey, etc.). These machines may be outfitted with one or more different types of sensors, such as imaging systems (e.g., cameras), optical sensors (e.g., thermal sensors, infrared sensors, etc.), as well as sensors that detect one or more bands of electromagnetic radiation reflected by the plants on the field of interest. The crop moisture map may be derived from sensor readings of moisture sensors that are disposed at the field of interest. The crop moisture map may be derived from lab testing crop samples. The crop moisture map may be derived from other characteristic values at the field of interest, such as vegetative index values at the field of interest, soil moisture index values at the field of interest, as well as various other characteristic values or combinations thereof. The crop moisture map may also be derived from weather characteristics (e.g., precipitation, temperature, wind, sun exposure, etc.), characteristics of the field, such as topography, as well as crop moisture modeling. These are merely some examples. The crop moisture map can be generated in a variety of other ways.

In one example, the present description relates to obtaining a map such as a genotype map. The genotype map includes geolocated values of crop genotype across different locations at a field of interest. The genotype values may indicate genotype information for the crop at the field, for instance, in a crop field, there may be several different types (e.g., hybrids, cultivar, etc.) of crop plants. The genotype map may be derived from operator or user inputs that indicate the crop genotype information at different areas of the field. The genotype map may be derived from information, including sensor readings, from a planting operation occurring on the field earlier in the year. For instance, the planting machine (e.g., planter, seeder, etc.) may have data, including sensor data, that indicates the genotype of seed planted and the locations at which the seeds were planted. These are merely some examples. The genotype map can be generated in a variety of other ways.

In one example, the present description relates to obtaining in-situ data from in-situ sensors on the mobile agricultural machine (e.g., agricultural harvester) taken concurrently with an operation. The in-situ sensor data can include missed crop data generated by missed crop sensors. In other examples, the in-situ sensor data can include in-situ control input data generated by in-situ control input sensors. In other examples, the in-situ sensor data can include in-situ reel wrapping data generated by in-situ reel wrapping sensors. In other examples, the in-situ sensor data can include in-situ reel carryover data generated by in-situ reel carryover sensors. In other examples, the in-situ sensor data can include in-situ reel tossing data generated by in-situ reel tossing sensors. In other examples, the in-situ sensor data can include in-situ shatter data generated by in-situ shatter sensors. In other examples, the in-situ sensor data can include in-situ reel parameter data generated by one or more in-situ reel parameter sensors, such as in-situ reel speed data generated by in-situ reel speed sensors, in-situ reel height data generated by in-situ reel height sensors, in-situ reel fore-to-aft position data generated by in-situ reel fore-to-aft position sensors, and in-situ reel finger position data generated by in-situ reel finger position sensors. The various in-situ data is derived from various in-situ sensors on the mobile machine, as will be described in further detail herein. These are merely some examples of the in-situ data and in-situ sensors contemplated herein.

The present discussion proceeds, in some examples, with respect to systems that obtain one or more maps of a field and also use an in-situ sensor to detect a variable indicative of an agricultural characteristic value, such as missed crop values, control input values, reel wrapping values, reel carryover values, reel tossing values, or shatter values. The systems generate a model that models a relationship between the values on the obtained map(s) and the output values from the in-situ sensor. The model is used to generate a predictive map that predicts agricultural characteristic values, such as such as missed crop values, control input values, reel wrapping values, reel carryover values, reel tossing values, or shatter values. The predictive map, generated during an operation, can be presented to an operator or other user or used in automatically controlling a mobile agricultural machine during an operation or both. In some examples, the predictive map can be used to control one or more of a position of a reel (e.g., height of the reel, fore-to-aft position of the reel, etc.), a speed of rotation of the reel, a position of reel fingers, as well as various other parameters.

The present discussion proceeds, in some examples, with respect to systems that obtain one or more maps of a field and also use an in-situ sensor to detect a variable indicative of an agricultural characteristic value, such as missed crop values, control input values, reel wrapping values, reel carryover values, reel tossing values, or shatter values as well as detect variable(s) indicative of one or more reel parameters, such as reel speed, reel height, and reel fore-to-aft position. The systems generate a model that models a relationship between the values on the obtained map(s), the reel parameter values, and the agricultural characteristic values from the in-situ sensor. The model is used to generate a predictive map that predicts agricultural characteristic values, such as such as missed crop values, control input values, reel wrapping values, reel carryover values, reel tossing values, or shatter values. The predictive map, generated during an operation, can be presented to an operator or other user or used in automatically controlling a mobile agricultural machine during an operation or both. In some examples, the predictive map can be used to control one or more of a position of a reel (e.g., height of the reel, fore-to-aft position of the reel, etc.), a speed of rotation of the reel, a position of reel fingers, as well as various other parameters.

FIG. 1 is a partial pictorial, partial schematic illustration of a self-propelled agricultural harvester 100. In the illustrated example, agricultural harvester 100 is a combine harvester. Further, although combine harvesters are provided as examples throughout the present disclosure, it will be appreciated that the present description is also applicable to other types of harvesters, such as windrowers. Consequently, the present disclosure is intended to encompass other types of harvesters, such as windrowers, and is, thus, not limited to combine harvesters.

As shown in FIG. 1, agricultural harvester 100 illustratively includes an operator compartment 101, which can have a variety of different operator interface mechanisms 218 for controlling agricultural harvester 100. Agricultural harvester 100 can also include a control system 314 for generating various control signals to control items of agricultural harvester 100. Agricultural harvester 100 includes front-end equipment, such as a header 102, and a cutter (cutter bar) generally indicated at 104. In the illustrated example, the cutter 104 is included on the header 102. Cutter 104 extends across a width of the header 102. Agricultural harvester 100 also includes a feeder house 106, a feed accelerator 108, and a thresher generally indicated at 110. Agricultural harvester 100 also includes cross conveyor 121, such as a cross auger or a conveyor belt, that transfer crop material cut by the cutter 104 to the middle of header 102 and towards feeder house 106. Header 102 is pivotally coupled to a frame 103 of agricultural harvester 100 along pivot axis 105. One or more actuators 107 drive movement of header 102 about axis 105 in the directions generally indicated by arrow 109. Thus, a vertical position of header 102 (the header height) above ground 111 over which the header 102 travels is controllable by actuating actuator 107. While not shown in FIG. 1, agricultural harvester 100 may also include one or more actuators 187 that operate to apply a tilt angle, a roll angle, or both to the header 102 or portions of header 102. Tilt refers to an angle at which the cutter 104 engages the crop. The tilt angle is increased, for example, by controlling header 102 to point a distal edge 113 of cutter 104 more toward the ground 111. The tilt angle is decreased by controlling header 102 to point the distal edge 113 of cutter 104 more away from the ground 111. The roll angle refers to the orientation of header 102 about the front-to-back longitudinal axis of agricultural harvester 100. Additionally, agricultural harvester 100 also includes a cutter actuator 161 that can be controlled to actuate movement of the cutter to control a depth of the cutting platform, that is, the fore-to-aft position of the cutter relative frame 172 of header 102.

A reel 164 is coupled to the header 102 and extends over a width of the header. The reel 164 is coupled to header 102 and rotatably supported by arms 145, each arm (only one shown in FIG. 1) is coupled to an end of reel 164. A respective reel height actuator 147 is pivotally coupled to each arm 145 and frame 172. The reel height actuators 147 can be a variety of different types of actuators, such a hydraulic cylinder, a pneumatic actuator, an electric actuator, as well as various other actuators. The reel height actuators 147 can be controllably actuated (e.g., extended and retracted), to raise and lower reel 164 (e.g., raise and lower the height of reel 164, such as the height of reel relative to cutter 104), as generally indicated by arrow 197. The reel 164 includes a center frame member 177 which can be rotated (e.g., counterclockwise in FIG. 1) around a rotational axis 175 by a controllable reel speed actuator 176, which may be in the form of various drives, such as a hydraulic motor, a pneumatic motor, an electric motor, as well as various other drives. Header 102 also includes reel fore-to-aft actuator(s) 183 which can be controllably actuated (e.g., extended and retracted) to control the fore-to-aft position of reel 164 by moving a support bearing of the center frame member 177 along each of the arms 145. Thus, fore-to-aft position actuators 183 can be controllably actuated to drive movement of reel 164 fore or aft, as indicated generally by arrow 199. The reel fore-to-aft actuator(s) 183 can be a variety of different types of actuators, such as a hydraulic cylinder, a pneumatic actuator, an electric actuator, as well as various other actuators.

Reel 164 includes a number of reel finger carriers 119 which extend radially relative to center frame member 177 and are supported by reel arm 123. The reel finger carriers 119 extend over a width of the header 102. A plurality of reel fingers 117 are coupled to and spaced apart along each reel carrier 119. The reel finger carriers 119 and thus the reel fingers 117 are rotatably mounted relative to the reel arms 123. Thus, the reel fingers 117 can be kept in a desired orientation as they rotate around center frame member 117 with rotation of reel 164. The orientation of the reel finger carriers 119, and thus the orientation of the reel fingers 117, can be controlled via a reel finger orientation member 179 (e.g., a lever), which, in one example, sets the position of a cam track about the central axis 175 of center frame member 177. A reel finger position actuator 181 can be controllably actuated (e.g., extended and retracted), to adjust the reel finger orientation member 179. Thus, the reel finger position actuator 181 can be actuated to control the orientation of reel finger carriers 119, and thus the orientation of reel fingers 117.

Thresher 110 illustratively includes a threshing rotor 112 and a set of concaves 114. Further, agricultural harvester 100 also includes a separator 116. Agricultural harvester 100 also includes a cleaning subsystem or cleaning shoe that includes a cleaning fan 120, chaffer 122, and sieve 124. Agricultural harvester 100 also includes discharge beater 126, a tailing elevator, clean grain elevator 130, a clean grain auger 127, as well as unloading auger 134 and chute 136. The clean grain elevator moves clean grain into clean grain tank 132. Agricultural harvester 100 also includes a residue subsystem that can include chopper 140 and a spreader. Agricultural harvester 100 also includes a propulsion subsystem that includes an engine that drives ground engaging components 144, such as wheels or tracks. In some examples, a combine harvester within the scope of the present disclosure may have more than one of any of the subsystems mentioned above. In some examples, agricultural harvester 100 may have left and right cleaning subsystems, separators, etc., which are not shown in FIG. 1.

In operation, and by way of overview, agricultural harvester 100 illustratively moves through a field in the direction indicated by arrow 147. As agricultural harvester 100 moves, header 102 (and the associated reel 164) engages the crop 206 (e.g., grain or other threshable crop) to be harvested and gathers the crop toward cutter 104. An operator of agricultural harvester 100 can be a local human operator, a remote human operator, or an automated system. An operator command is a command by an operator. The operator of agricultural harvester 100 may determine one or more of a header height setting, a header tilt angle setting, or a header roll angle setting for header 102. Additionally, the operator of agricultural harvester may determine one or more of a reel height setting, a reel fore-to-aft position setting, a reel speed setting, and a reel fingers position setting. For example, the operator inputs (e.g., operator interface mechanisms 218) a setting or settings to a control system 314, described in more detail below, that controls, among other things, the various actuators. The actuators maintain the various items at their settings based on the settings input by the operator and control by the control system 314. Each of the settings may be implemented independently of the others. The control system 314 may respond to error (e.g., the difference between the setting and a measured parameter of the items being controlled) with a responsiveness that is determined based on a selected sensitivity level. If the sensitivity level is set at a greater level of sensitivity, the control system responds to smaller errors, and attempts to reduce the detected errors more quickly than when the sensitivity is at a lower level of sensitivity. In other examples, the control system 314 may control the various settings automatically, such as based on various inputs as will be described in greater detail below. Thus, in some examples, no operator input is needed other than to perhaps merely activate the automatic control of the control system 314.

Returning to the description of the operation of agricultural harvester 100, after crops are cut by cutter 104, the severed crop material is moved by conveyer 121 to a conveyer in feeder house which conveys the crop material through feeder house 106 toward feed accelerator 108, which accelerates the crop material into thresher 110. The crop material is threshed by rotor 112 rotating the crop against concaves 114. The threshed crop material is moved by a separator rotor in separator 116 where a portion of the residue is moved by discharge beater 126 toward the residue subsystem. The portion of residue transferred to the residue subsystem is chopped by residue chopper 140 and may be spread on the field by a spreader. In other configurations, the residue is released from the agricultural harvester 100 in a windrow. In other examples, the residue subsystem can include weed seed eliminators (not shown) such as seed baggers or other seed collectors, or seed crushers or other seed destroyers.

Grain falls to a cleaning subsystem. Chaffer 122 separates some larger pieces of material from the grain, and sieve 124 separates some of finer pieces of material from the clean grain. Clean grain falls to an auger 127 that moves the grain to an inlet end of clean grain elevator 130, and the clean grain elevator 130 moves the clean grain upwards, depositing the clean grain in clean grain tank 132. Residue is removed from the cleaning subsystem by airflow generated by cleaning fan 120. Cleaning fan 120 directs air along an airflow path upwardly through the sieves and chaffers. The airflow carries residue rearwardly in agricultural harvester 100 toward the residue handling subsystem.

In some examples, a tailings elevator (not shown) returns tailings to thresher 110 where the tailings are re-threshed. Alternatively, the tailings also may be passed to a separate re-threshing mechanism by a tailings elevator or another transport device where the tailings are re-threshed as well.

FIG. 1 also shows that, in one example, agricultural harvester 100 includes one or more geographic position sensors 304, one or more machine speed sensors 146, one or more separator loss sensors 148, a clean grain camera 150, one or more observation sensor systems 151, and one or more loss sensors 152 provided in the cleaning subsystem.

Geographic position sensors 304 illustratively sense or detect the geographic position or location of agricultural harvester 100. Geographic position sensors 304 can include, but are not limited to, a global navigation satellite system (GNSS) receiver that receives signals from a GNSS satellite transmitter. Geographic position sensors 304 can also include a real-time kinematic (RTK) component that is configured to enhance the precision of position data derived from the GNSS signal. Geographic position sensors 304 can include a dead reckoning system, a cellular triangulation system, or any of a variety of other geographic position sensors.

Machine speed sensor 146 senses the travel speed of agricultural harvester 100 over the ground. Machine speed sensor 146 may sense the travel speed of the agricultural harvester 100 by sensing the speed of rotation of the ground engaging components (such as wheels or tracks), a drive shaft, an axel, or other components. In some instances, the travel speed may be sensed using a positioning system, such as geographic position sensors 304, a global positioning system (GPS), a dead reckoning system, a long range navigation (LORAN) system, or a wide variety of other systems or sensors that provide an indication of travel speed.

Loss sensors 152 illustratively provide an output signal indicative of the quantity of grain loss occurring in both the right and left sides of the cleaning subsystem. In some examples, sensors 152 are strike sensors which count grain strikes per unit of time or per unit of distance traveled to provide an indication of the grain loss occurring at the cleaning subsystem. The strike sensors for the right and left sides of the cleaning subsystem 118 may provide individual signals or a combined or aggregated signal. In some examples, sensors 152 may include a single sensor as opposed to separate sensors provided for each cleaning subsystem.

Separator loss sensor 148 provides a signal indicative of grain loss in the left and right separators, not separately shown in FIG. 1. The separator loss sensors 148 may be associated with the left and right separators and may provide separate grain loss signals or a combined or aggregate signal. In some instances, sensing grain loss in the separators may also be performed using a wide variety of different types of sensors as well.

Observation sensor systems 151 are configured to sense various characteristics, including, but not limited to, missed crop, reel wrapping, reel carryover, reel tossing, and shatter, as will be discussed in greater detail below. Observation sensor systems 151 may be in the form of or include one or more of an imaging system, such as a mono or stereo camera, optical sensors, radar, lidar, an ultrasonic sensor, as well as various other sensors, such as sensors that detect one or more bands of electromagnetic radiation reflected by the crop or crop material. In some examples, more than one characteristic can be detected by observation sensor systems 151, such as two or more of missed crop, reel wrapping, reel wrapping, reel carryover, reel tossing, and shatter. An observation sensor system 151, for instance a first observation sensor system, may observe (or have a field of view that includes) one or more of header 102 and/or reel 164, an area ahead of header 102 and/or reel 164, an area behind header 102 and/or reel 164. An observation sensor system 151, for instance a second observation sensor system, may observe (or have a field of view that includes) an area behind agricultural harvester 100. For example, as shown in FIG. 1, agricultural harvester 100 includes an observation sensor system 151 disposed to look forward and an observation sensor system 151 disposed to look rearward. In other examples, agricultural harvester 100 may include an observation sensor system 151 that looks to the sides of agricultural harvester 100. Additionally, while a certain number of observation sensor systems 151 are shown, in other examples, agricultural harvester 100 may include more or less observation sensor systems. Additionally, while the observation sensor systems 151 are shown being disposed at certain locations, it will be understood that in other examples observation sensor systems 151 may be disposed at various location on agricultural harvester 100.

Agricultural harvester 100 may also include other sensors and measurement mechanisms. For instance, agricultural harvester 100 may include one or more of the following sensors: a header height sensor that senses a height of header 102 above ground 111; a reel height sensor that senses the height of reel 164; a reel speed sensor that senses the rotational speed of reel 164, a reel fore-to-aft sensor that sense the fore-to-aft position of reel 164; a reel finger position sensor that senses the position (e.g., angular position or orientation) of reel fingers 117 or reel finger carriers 119, or both; stability sensors that sense oscillation or bouncing motion (and amplitude) of agricultural harvester 100; a residue setting sensor that is configured to sense whether agricultural harvester 100 is configured to chop the residue, produce a windrow, etc.; a cleaning shoe fan speed sensor to sense the speed of fan 120; a concave clearance sensor that senses clearance between the rotor 112 and concaves 114; a threshing rotor speed sensor that senses a rotor speed of rotor 112; a chaffer clearance sensor that senses the size of openings in chaffer 122; a sieve clearance sensor that senses the size of openings in sieve 124; a material other than grain (MOG) moisture sensor that senses a moisture level of the MOG passing through agricultural harvester 100; one or more machine setting sensors configured to sense various configurable settings of agricultural harvester 100; a machine orientation sensor that senses the orientation of agricultural harvester 100; and crop property sensors that sense a variety of different types of crop properties, such as crop type, crop moisture, and other crop properties. Crop property sensors may also be configured to sense characteristics of the severed crop material as the crop material is being processed by agricultural harvester 100. For example, in some instances, the crop property sensors may sense grain quality such as broken grain, MOG levels; grain constituents such as starches and protein; and grain feed rate as the grain travels through the feeder house 106, clean grain elevator 130, or elsewhere in the agricultural harvester 100. The crop property sensors may also sense the feed rate of biomass through feeder house 106, through the separator 116 or elsewhere in agricultural harvester 100. The crop property sensors may also sense the feed rate as a mass flow rate of grain through elevator 130 or through other portions of the agricultural harvester 100 or provide other output signals indicative of other sensed variables. These are merely examples.

Figure 2:
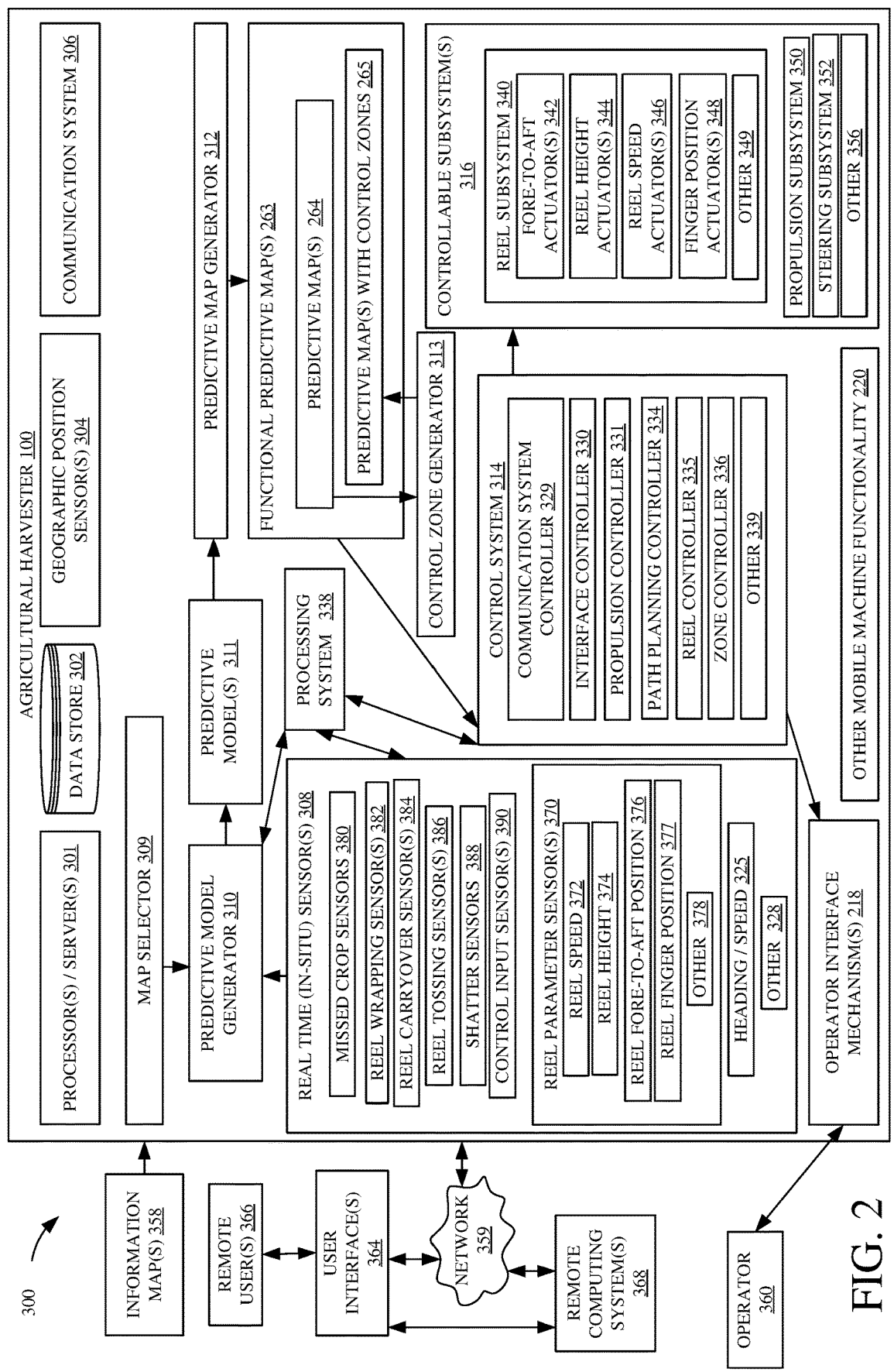
FIG. 2 is a block diagram shown some portions of an agricultural system, including an agricultural harvester, in more detail, according to some examples of the present disclosure.

FIG. 2 is a block diagram showing some portions of an agricultural harvesting system architecture 300. FIG. 2 shows that agricultural harvesting system architecture 300 includes agricultural harvester 100, one or more remote computing systems 368, an operator 360, one or more remote users 366, one or more remote user interfaces 364, network 359, and one or more information maps 358. Agricultural harvester 100, itself, illustratively includes one or more processors or servers 301, data store 302, one or more geographic position sensors 304, communication system 306, one or more in-situ sensors 308 that sense one or more characteristics at a worksite concurrent with an operation, and a processing system 338 that processes the sensor data (e.g., sensor signals, images, etc.) generated by in-situ sensors 308 to generate processed sensor data. The in-situ sensors 308 generate values corresponding to the sensed characteristics. Mobile machine 100 also includes a predictive model or relationship generator (collectively referred to hereinafter as "predictive model generator 310"), predictive model or relationship (collectively referred to hereinafter as "predictive model 311"), predictive map generator 312, control zone generator 313, control system 314, one or more controllable subsystems 316, and operator interface mechanisms 218. The mobile machine can also include a wide variety of other machine functionality 320.

The in-situ sensors 308 can be on-board mobile machine 100, remote from mobile machine, such as deployed at fixed locations on the worksite or on another machine operating in concert with mobile machine 100, such as an aerial vehicle, and other types of sensors, or a combination thereof. In-situ sensors 308 sense characteristics at a worksite during the course of an operation. In-situ sensors 308 illustratively include one or more missed crop sensors 380, one or more reel wrapping sensors 382, one or more reel carryover sensors 384, one or more reel tossing sensors 386, one or more shatter sensors 388, one or more control input sensors 390, reel parameter sensors 370, heading/speed sensors 325, and can include various other sensors 328. Reel parameter sensors 370, themselves, include one or more reel speed sensors 372, one or more reel height sensors 374, one or more reel-to-aft sensors 376, one or more reel finger position sensors 377, and can include other sensors 377 to sense other reel parameters.

Reel parameter sensors 370 illustratively detect parameters of reel 164, such as the speed of reel 164, the height of reel 164, the fore-to-aft position of reel 164, and the position of fingers of reel 164.

Reel speed sensors 372 illustratively detect the speed at which reel 164 is operating. Reel speed sensors can include load or power sensors that detect a power used to drive reel 164 (e.g., a power used to drive or actuate reel speed actuator 346 or 176), such as a voltage sensor, a current sensor, a hydraulic pressure sensor, an air pressure sensor, or a torque sensor. Reel speed sensor 372 can also include an input sensor that detects a control input that controls a speed setting of reel 164. Reel speed sensor 164 can include sensors that detect the movement of components of reel 164, such as a sensor system that includes revolutions per minute (RPM) sensor and a tachometer. These are merely some examples.

Reel height sensors 374 illustratively detect a height of reel 164, such as height of reel 164. Reel height sensors 374 can include actuator parameter sensors that sense a parameter of the reel height actuator 344 or 147, such as a hydraulic pressure, an air pressure, a position or displacement, as well as various other parameters. Reel height sensors 374 can include observation sensor systems (e.g., 151 or another observation sensor system similar to 151) that detects the height of reel relative to another component of agricultural harvester 100 (e.g., cutter 104) or to the field 111. As described above, observation sensor systems may include imaging systems (e.g., mono or stereo cameras), optical sensors, lidar, radar, ultrasonic sensors, as well as a variety of other sensors. These are merely some examples.

Reel fore-to-aft position sensors 376 illustratively detect a fore-to-aft position of reel 164. Reel fore-to-aft position sensors 376 can include actuator parameter sensors that sense a parameter of the reel fore-to-aft actuators 342 or 183, such as a hydraulic pressure, an air pressure, a position or displacement, as well as various other parameters. Reel fore-to-aft position sensors 376 can include observation sensor systems (e.g., 151 or another observation sensor system similar to 151) that detects the fore-to-aft position of reel 164. As described above, observation sensor systems may include imaging systems (e.g., mono or stereo cameras), optical sensors, lidar, radar, ultrasonic sensors, as well as a variety of other sensors. These are merely some examples.

Reel finger position sensors 377 illustratively detect a position (e.g., orientation) of reel fingers 117 of reel 164. Reel finger position sensors 376 can include actuator parameter sensors that sense a parameter of the reel finger position actuator 181, such as a hydraulic pressure, an air pressure, a position or displacement, as well as various other parameters. Reel finger position sensors 376 can include observation sensor systems (e.g., 151 or another observation system similar to 151) that detects the position of fingers 117. As described above, observation sensor systems may include imaging systems (e.g., mono or stereo cameras), optical sensors, lidar, radar, ultrasonic sensors, as well as a variety of other sensors.

Missed crop sensors 380 illustratively detect missed crop, that is, crop that was not cut by header 102. Missed crop sensors 380 can include imaging systems, such as cameras (e.g., stereo camera, mono camera, etc.), optical sensors, radar, lidar, ultrasonic sensors, as well as various other sensors, including but not limited to, sensors that detect one or more wavelengths of electromagnetic radiation emitted (or reflected) from the crops. In some examples, observation sensor systems 151 are or include missed crop sensors 380. In some examples, missed crop sensors 382 observe (or have a field of view that includes) the header 102 and/or reel 164, and area(s) around the header 102 (e.g., one or more of area(s) adjacent to the header 102, such as behind header 102). In some examples, one missed crop sensor may observe behind one end of the header 102 of while another missed crop sensor observes behind the opposite side of the header 102. Additionally, or alternatively, a missed crop sensor 380 may be disposed to look rearward of agricultural harvester 100, relative to its direction of travel, to sensed missed crops within the travel path of header 102.

Reel wrapping sensors 382 illustratively detect wrapping of plant material (e.g., crop material, weed material, etc.) around reel 164. As the reel 164 rotates it may be that plant material may not be guided further into the agricultural harvester 100 and instead becomes wrapped around reel 164 (or components thereof). Such wrapping can not only affect the performance of reel 164 (e.g., affect rotation speed, power requirements, etc.), but also can have a deleterious effect on the harvesting operation, such as by deleteriously affecting the ability of the reel 164 to engage and gather crops. Reel wrapping sensors 386 can include imaging systems, such as cameras (e.g., stereo camera, mono camera, etc.), optical sensors, radar, lidar, ultrasonic sensors, as well as various other sensors, including but not limited to, sensors that detect one or more wavelengths of electromagnetic radiation emitted (or reflected) from plant material on reel 164. In some examples, observation sensor systems 151 are or include reel wrapping sensors 382. In some examples, reel wrapping sensors 382 observe (or have a field of view that includes) the header 102 and/or reel 164. In some examples, one reel wrapping sensor may observe one portion of the header 102 and/or reel 164 of agricultural harvester 100 while another reel wrapping sensor observes a different portion of the header 102 and/or reel 164 of agricultural harvester 100.

In some examples, reel wrapping sensors 382 may detect a load or a power requirement to drive movement (e.g., rotation, change of position, etc.) of reel 164, for instance, pressure sensors that sense a fluid pressure used to actuate actuators, torque sensors, current or voltage sensors. Additional load or power requirement may indicate the occurrence of reel wrapping.

Reel carryover sensors 384 illustratively detect carryover of plant material (e.g., crop material, weed material, etc.). In some instances, plant material may become hung up on the reel 164 such that it rotates with the reel 164 rather than being delivered further into the agricultural harvester 100 (e.g., to conveyor 121). Carryover material does not wrap around reel 164 but rather rotates around with the reel 164 and eventually comes off of the reel 164 and, in some instances, drops onto the field and results in crop loss or is again picked up by reel 164 where it may create flow problems or become wrapped. Reel carryover sensors 384 can include imaging systems, such as cameras (e.g., stereo camera, mono camera, etc.), optical sensors, radar, lidar, ultrasonic sensors, as well as various other sensors, including but not limited to, sensors that detect one or more wavelengths of electromagnetic radiation emitted (or reflected) from plant material on reel 164. In some examples, observation sensor systems 151 are or include reel carryover sensors 384. In some examples, reel carryover sensors 384 observe (or have a field of view that includes) the header 102 and/or reel 164. In some examples, one reel carryover sensor may observe one portion of the header 102 and/or reel 164 of agricultural harvester 100 while another reel carryover sensor observes a different portion of the header 102 and/or reel 164 of agricultural harvester 100. Additionally, or alternatively, reel carryover sensors 384 may observe the field, such as a portion of the field adjacent to (e.g., to the side of, behind, and/or ahead of) header 102 and/or the field behind agricultural harvester 100 to detect plant material laying on the field. In some examples, reel carryover sensors 384 may detect a load or a power requirement to drive movement (e.g., rotation, change of position, etc.) of reel 164, for instance, pressure sensors that sense a fluid pressure used to actuate actuators, torque sensors, current or voltage sensors. Additional load or power requirements may indicate reel carryover.

Reel tossing sensors 386 illustratively detect tossing of plant material (e.g., crop material, weed material, etc.) over the back and/or sides of header 102. In some instances, rather than being delivered further into agricultural harvester 100 (e.g., to conveyor 121) plant material may be tossed by reel 164 over the sides and/or the back of header 102. Such tossing may result in crop loss. Reel tossing sensors 386 can include imaging systems, such as cameras (e.g., stereo camera, mono camera, etc.), optical sensors, radar, lidar, ultrasonic sensors, as well as various other sensors, including but not limited to, sensors that detect one or more wavelengths of electromagnetic radiation emitted (or reflected) from plant material on reel 164. In some examples, observation sensor systems 151 are or include reel tossing sensors 386. In some examples, reel tossing sensors 386 observe (or have a field of view that includes) the header 102 and/or reel 164. In some examples, one reel tossing sensor may observe one portion of the header 102 and/or reel of agricultural harvester 100 while another reel tossing sensor observes a different portion of the header 102 and/or reel 164 of agricultural harvester 100. Additionally, or alternatively, reel tossing sensors 386 may observe the field, such as a portion of the field adjacent to (e.g., to the side of, behind, and/or ahead of) header 102 and/or the field behind agricultural harvester 100 to detect plant material laying on the field. In some examples, reel carryover sensors 384 may detect a load or a power requirement to drive movement (e.g., rotation, change of position, etc.) of reel 164, for instance, pressure sensors that sense a fluid pressure used to actuate actuators, torque sensors, current or voltage sensors. Additional load or power requirements may indicate reel tossing.

Shatter sensors 388 illustratively detect crop shattering at the header 102 or reel 164. In some scenarios, the reel 164, in engaging crop, will shatter the crop (e.g., will disperse the grain/seed/fruit, etc.) at the header 102 such that the crop, to be harvested, will be lost, thus reducing yield. As an illustrative example, reel 164 may shatter soybean pods when agricultural harvester 100 is harvesting soybeans, and thus the soybeans will spill onto the field (or elsewhere) and will not be collected by agricultural harvester 100. Shatter sensors 388 can include imaging systems, such as cameras (e.g., stereo camera, mono camera, etc.), optical sensors, radar, lidar, ultrasonic sensors, as well as various other sensors, including but not limited to, sensors that detect one or more wavelengths of electromagnetic radiation emitted (or reflected) from plant material. In some examples, observation sensor systems 151 are or include shatter sensors 388. In some examples, shatter sensors 388 observe (or have a field of view that includes) the header 102 and/or reel 164. In some examples, one shatter sensor may observe one portion of the header 102 and/or reel 164 of agricultural harvester 100 while another shatter sensor observes a different portion of the header 102 and/or reel 164 of agricultural harvester. Additionally, or alternatively, shatter sensors 388 may observe the field, such as a portion of the field adjacent to (e.g., to the side of, behind, and/or ahead of) header 102 and/or the field behind agricultural harvester 100 to detect plant material, such as shattered crop, lying on the field.

As described above, observation sensor systems 151 may include or comprise one or more of missed crop sensors 380, reel wrapping sensors 382, reel carryover sensors 384, reel tossing sensors 386, and shatter sensors 388. It will be noted that one or more of missed crop, reel wrapping, reel carryover, reel tossing, and shatter can be detected by one or more of the same type of sensor. For instance, an imaging system, such as a camera, or an optical sensor, may generate sensor data (e.g., image) that is indicative of one or more of missed crop, reel wrapping, reel carryover, reel tossing, and shatter. For example, an image (or a set of images) captured by an imaging system may show one or more of missed crop, reel wrapping, reel carryover, reel tossing, and shatter. Thus, it will be understood that each of missed crop, reel wrapping, reel carryover, reel tossing, and shatter may be detected by respective sensors or may be detected by one or more of the same type of sensor.

Control input sensors 390 illustratively detect control inputs that are used to control one or more items of agricultural harvester 100, such as one or more controllable subsystems 316. Control input sensors 390 may detect, as a control input, an operator input into an operator input mechanism 218. For example, agricultural harvester 100 may include one or more input mechanisms, actuatable/interactable by the operator 360, to control operation of a controllable subsystem. Control input sensors 390 may detect, as a control input, a user input into a user interface mechanism 364. For example, user interface mechanisms 364 may include one or more input mechanisms, actuatable/interactable by a user 366, to control operation of a controllable subsystem. Control input sensors 390 may detect, as a control input, a control signal generated by control system 314. For example, control system 314 may generate control signals to control one or more controllable subsystems. The control inputs may command an operation setting of a controllable subsystem, such as positions (e.g., height, fore-to-aft, etc.) of reel 164, positions (e.g., height, pitch, roll, yaw, etc.) of header 102, speed of reel 164, positions (e.g., angular position or orientation) of reel fingers 117, as well as various other operation settings. Control input sensors 390 thus generate control input values indicative of the operation settings commanded by the control inputs.

Heading/speed sensors 325 detect a heading and speed at which agricultural harvester 100 is traversing the worksite during the operation. This can include sensors that sense the movement of ground-engaging elements (e.g., wheels or tracks of agricultural harvester 100), such as sensors 146, or can utilize signals received from other sources, such as geographic position sensors 304. Thus, while heading/speed sensors 325 as described herein are shown as separate from geographic position sensors 304, in some examples, machine heading/speed is derived from signals received from geographic positions sensors 304 and subsequent processing. In other examples, heading/speed sensors 325 are separate sensors, such as sensors 146, and do not utilize signals received from other sources.

Other in-situ sensors 328 may be any of a wide variety of other sensors, including, but not limited, sensors that detect various other characteristics at the field, such as characteristics of the field, characteristics of the plants at the field, and characteristics of the agricultural harvester 100, such as operating parameters. Other in-situ sensors 328 can include, but are not limited to, the sensors described above with regard to FIG. 1. Other in-situ sensors 328 can be on-board agricultural harvester 100 or can be remote from agricultural harvester 100, such as other in-situ sensors 328 on-board another mobile machine that capture in-situ data of the worksite or sensors at fixed locations throughout the worksite. The remote data from remote sensors can be obtained by agricultural harvester 100 via communication system 206 over network 359.

In-situ data includes data taken from a sensor on-board the agricultural harvester 100 or taken by any sensor where the data are detected during the operation of agricultural harvester 100 at a worksite.

Processing system 338 processes the sensor data (e.g., sensor signals, images, etc.) generated by in-situ sensors 308 to generate processed sensor data indicative of one or more characteristics. For example, processing system generates processed sensor data indicative of characteristic values based on the sensor data generated by in-situ sensors 308, such as one or more of miss crop values based on sensor data generated by missed crop sensors 380, reel wrapping values based on sensor data generated by reel wrapping sensors 382, reel carryover values based on sensor data generated by reel carryover sensors 384, reel tossing values based on sensor data generated by reel tossing sensors 386, shatter values based on sensor data generated by shatter sensors 388, and control input values based on sensor data generated by control input sensors 390. Processing system 338 also processes sensor data generated by other in-situ sensors 308 to generate processed sensor data indicative of other characteristic values, for instance one or more of machine speed (travel speed, acceleration, deceleration, etc.) values based on sensor data generated by heading/speed sensors 325, machine heading values based on sensor data generated by heading/speed sensors 325, as well as various other values based on sensor data generated by various other in-situ sensors 328.

It will be understood that processing system 338 can be implemented by one or more processers or servers, such as processors or servers 301. Additionally, processing system 338 can utilize various filtering techniques, noise filtering techniques, sensor signal categorization, aggregation, normalization, as well as various other processing functionality. Similarly, processing system 338 can utilize various image processing techniques such as, sequential image comparison, RGB, edge detection, black/white analysis, machine learning, neural networks, pixel testing, pixel clustering, shape detection, as well any number of other suitable image processing and data extraction functionality.

FIG. 2 also shows remote users 366 interacting with agricultural harvester 100 or remote computing systems 368, or both, through user interfaces mechanisms 364 over network 359. In some examples, user interface mechanisms 364 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, a user 366 may interact with user interface mechanisms 364 using touch gestures.

These examples described above are provided as illustrative examples and are not intended to limit the scope of the present disclosure. Consequently, other types of user interface mechanisms 364 may be used and are within the scope of the present disclosure.

Remote computing systems 368 can be a wide variety of different types of systems, or combinations thereof. For example, remote computing systems 368 can be in a remote server environment. Further, remote computing systems 368 can be remote computing systems, such as mobile devices, a remote network, a farm manager system, a vendor system, or a wide variety of other remote systems. In one example, agricultural harvester 100 can be controlled remotely by remote computing systems 368 or by remote users 366, or both. As will be described below, in some examples, one or more of the components shown being disposed on agricultural harvester 100 can be located elsewhere, such as at remote computing systems 368.

FIG. 2 also shows that an operator 360 may operate agricultural harvester 100. The operator 360 interacts with operator interface mechanisms 218. In some examples, operator interface mechanisms 218 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, operator 360 may interact with operator interface mechanisms 218 using touch gestures. These examples described above are provided as illustrative examples and are not intended to limit the scope of the present disclosure. Consequently, other types of operator interface mechanisms 218 may be used and are within the scope of the present disclosure. Operator 360 may be local to agricultural harvester 100, such as in an operator compartment 101 or may be remote from agricultural harvester 100.

FIG. 2 also shows that agricultural harvester 100 can obtain one or more information maps 358. As described herein, the information maps 358 include, for example, an optical characteristics map, a crop state map, a crop height map, a vegetative index map, a yield map, a weeds map, a crop moisture map, a genotype map, as well as various other maps. However, information maps 358 may also encompass other types of data, such as other types of data that were obtained prior to a harvesting operation or a map from a prior operation. In other examples, information maps 358 can be generated during a current operation, such a map generated by predictive map generator 312 based on a predictive model 311 generated by predictive model generator 310 or a map generated based on sensor data generated during the current operation.

Information maps 358 may be downloaded onto mobile machine 100 over network 359 and stored in data store 302, using communication system 306 or in other ways. In some examples, communication system 306 may be a cellular communication system, a system for communicating over a wide area network or a local area network, a system for communicating over a near field communication network, or a communication system configured to communicate over any of a variety of other networks or combinations of networks. Network 359 illustratively represents any or a combination of any of the variety of networks. Communication system 306 may also include a system that facilitates downloads or transfers of information to and from a secure digital (SD) card or a universal serial bus (USB) card or both.

Predictive model generator 310 generates a model that is indicative of a relationship between the values sensed by the in-situ sensors 308 and values mapped to the field by the information maps 358. For example, if the information map 358 maps crop height values to different locations in the worksite, and the in-situ sensors 308 are sensing values indicative of missed crop, then model generator 310 generates a predictive missed crop model that models the relationship between the crop height values and the missed crop values. In another example, if the information map 358 maps crop moisture values to different locations in the worksite, and the in-situ sensors 308 are sensing values indicative of shatter, then model generator 310 generates a predictive shatter model that models the relationship between the crop moisture values and the shatter values. These are merely some examples.

In some examples, the predictive map generator 312 uses the predictive models generated by predictive model generator 310 to generate functional predictive maps 263 that predict the value of a characteristic, sensed by the in-situ sensors 308, such as missed crop, reel wrapping, reel carryover, reel tossing, shatter, or control input, at different locations in the field based upon one or more of the information maps 358. For example, where the predictive model is a predictive missed model that models a relationship between missed crop values and one or more of optical characteristic values from an optical characteristic map, crop state values from a crop state map, and crop height values from a crop height map, then predictive map generator 312 generates a functional predictive missed crop map that predicts missed crop values at different locations at the field based on one or more of the mapped values at those locations and the predictive missed crop model. This is merely an example.

In some examples, the type of values in the functional predictive map 263 may be the same as the in-situ data type sensed by the in-situ sensors 308. In some instances, the type of values in the functional predictive map 263 may have different units from the data sensed by the in-situ sensors 308. In some examples, the type of values in the functional predictive map 263 may be different from the data type sensed by the in-situ sensors 308 but have a relationship to the type of data type sensed by the in-situ sensors 308. For example, in some examples, the data type sensed by the in-situ sensors 308 may be indicative of the type of values in the functional predictive map 263. In some examples, the type of data in the functional predictive map 263 may be different than the data type in the information maps 358. In some instances, the type of data in the functional predictive map 263 may have different units from the data in the information maps 358. In some examples, the type of data in the functional predictive map 263 may be different from the data type in the information maps 358 but has a relationship to the data type in the information maps 358. For example, in some examples, the data type in the information maps 358 may be indicative of the type of data in the functional predictive map 263. In some examples, the type of data in the functional predictive map 263 is different than one of, or both of, the in-situ data type sensed by the in-situ sensors 308 and the data type in the information maps 358. In some examples, the type of data in the functional predictive map 263 is the same as one of, or both of, of the in-situ data type sensed by the in-situ sensors 308 and the data type in information maps 358. In some examples, the type of data in the functional predictive map 263 is the same as one of the in-situ data type sensed by the in-situ sensors 308 or the data type in the information maps 358, and different than the other.

As shown in FIG. 2, predictive map 264 predicts the value of a sensed characteristic (sensed by in-situ sensors 308), or a characteristic related to the sensed characteristic, at various locations across the worksite based upon one or more information values in one or more information maps 358 at those locations and using the predictive model 311. For example, if predictive model generator 310 has generated a predictive model indicative of a relationship between vegetative index values and reel wrapping values, then, given the vegetative index value at different locations across the field, predictive map generator 312 generates a predictive map 264 that predicts reel wrapping values at different locations across the worksite. The vegetative index value, obtained from the vegetative index map, at those locations and the relationship between vegetative index values and the reel wrapping values, obtained from the predictive model 311, are used to generate the predictive map 264. This is merely one example.

Some variations in the data types that are mapped in the information maps 358, the data types sensed by in-situ sensors 308, and the data types predicted on the predictive map 264 will now be described.

In some examples, the data type in one or more information maps 358 is different from the data type sensed by in-situ sensors 308, yet the data type in the predictive map 264 is the same as the data type sensed by the in-situ sensors 308. For instance, the information map 358 may be a yield map, and the variable sensed by the in-situ sensors 308 may be reel tossing. The predictive map 264 may then be a predictive reel tossing map that maps predictive reel tossing values to different geographic locations in the in the worksite. This is merely an example.

Also, in some examples, the data type in the information map 358 is different from the data type sensed by in-situ sensors 308, and the data type in the predictive map 264 is different from both the data type in the information map 358 and the data type sensed by the in-situ sensors 308.

In some examples, the information map 358 is from a prior pass through the field during a prior operation and the data type is different from the data type sensed by in-situ sensors 308, yet the data type in the predictive map 264 is the same as the data type sensed by the in-situ sensors 308. For instance, the information map 358 may be a genotype map generated during a previous planting/seeding operation on the field, and the variable sensed by the in-situ sensors 308 may be shatter. The predictive map 264 may then be a predictive shatter map that maps predictive shatter values to different geographic locations in the worksite. This is merely an example.

In some examples, the information map 358 is from a prior pass through the field during a prior operation and the data type is the same as the data type sensed by in-situ sensors 308, and the data type in the predictive map 264 is also the same as the data type sensed by the in-situ sensors 308. For instance, the information map 358 may be a shatter map generated during a previous year, and the variable sensed by the in-situ sensors 308 may be shatter. The predictive map 264 may then be a predictive shatter map that maps predictive values of shatter to different geographic locations in the field. In such an example, the relative shatter differences in the georeferenced information map 358 from the prior year can be used by predictive model generator to generate a predictive model that models a relationship between the relative shatter differences on the information map 358 and the shatter values sensed by in-situ sensors 308 during the current operation. The predictive model is then used by predictive map generator 310 to generate a predictive shatter map. This is merely an example.

In another example, the information map 358 may be a crop state map generated during a prior operation in the same year, such as a spraying operation performed by a spraying machine, and the variable sensed by the in-situ sensors 308 during the current harvesting operation may be missed crop. The predictive map 264 may then be a predictive missed crop map that maps predictive missed crop values to different geographic locations in the worksite. In such an example, a map of the crop state values at time of the spraying operation is geo-referenced, recorded, and provided to agricultural harvester 100 as an information map 358 of crop state values. In-situ sensors 308 during a current operation can detect missed crop at geographic locations in the field and predictive model generator 310 may then build a predictive model that models a relationship between the missed crop at time of the current operation and crop state values at the time of the spraying operation. This is because the crop state values at the time of the spraying operation may be likely to be the same as at the time of the current operation or may be more accurate or otherwise may be more reliable than crop state values obtained in other ways. This is merely an example.

In some examples, predictive map 264 can be provided to the control zone generator 313. Control zone generator 313 groups adjacent portions of an area into one or more control zones based on data values of predictive map 264 that are associated with those adjacent portions. A control zone may include two or more contiguous portions of a worksite, such as a field, for which a control parameter corresponding to the control zone for controlling a controllable subsystem is constant. For example, a response time to alter a setting of controllable subsystems 316 may be inadequate to satisfactorily respond to changes in values contained in a map, such as predictive map 264. In that case, control zone generator 313 parses the map and identifies control zones that are of a defined size to accommodate the response time of the controllable subsystems 316. In another example, control zones may be sized to reduce wear from excessive actuator movement resulting from continuous adjustment. In some examples, there may be a different set of control zones for each controllable subsystem 316 or for groups of controllable subsystems 316. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265.

It will also be appreciated that control zone generator 313 can cluster values to generate control zones and the control zones can be added to predictive control zone map 265, or a separate map, showing only the control zones that are generated. In some examples, the control zones may be used for controlling or calibrating agricultural harvester 100 or both. In other examples, the control zones may be presented to the operator 360 and used to control or calibrate agricultural harvester 100, and, in other examples, the control zones may be presented to the operator 360 or another user, such as a remote user 366, or stored for later use.

Predictive map 264 or predictive control zone map 265, or both, are provided to control system 314, which generates control signals based upon the predictive map 264 or predictive control zone map 265 or both. In some examples, communication system controller 329 controls communication system 306 to communicate the predictive map 264 or predictive control zone map 265 or control signals based on the predictive map 264 or predictive control zone map 265 to other mobile machines that are operating at the same field or in the same operation. In some examples, communication system controller 329 controls the communication system 306 to send the predictive map 264, predictive control zone map 265, or both to other remote systems, such as remote computing systems 368.

Control system 314 includes communication system controller 329, interface controller 330, propulsion controller 331, path planning controller 334, reel controller 335, zone controller 336, and control system 314 can include other items 339. Controllable subsystems 316 include reel subsystem 340, propulsion subsystem 350, steering subsystem 352, and subsystems 316 can include a wide variety of other controllable subsystems 356. Reel subsystem 340, itself, includes one or more fore-to-aft actuators 342, one or more reel height actuators 344, one or more reel speed actuators 346, one or more finger position actuators 348, and can include various other items 349 as well.

Interface controller 330 is operable to generate control signals to control interface mechanisms, such as operator interface mechanisms 218 or user interfaces 364, or both. The interface controller 330 is also operable to present the predictive map 264 or predictive control zone map 265 or other information derived from or based on the predictive map 264, predictive control zone map 265, or both to operator 360 or a remote user 366, or both. As an example, interface controller 330 generates control signals to control a display mechanism to display one or both of predictive map 264 and predictive control zone map 265 for the operator 360 or a remote user 366, or both. Interface controller 330 may generate operator or user actuatable mechanisms that are displayed and can be actuated by the operator or user to interact with the displayed map. The operator or user can edit the map by, for example, correcting a value displayed on the map, based on the operator's or the user's observation.

Path planning controller 334 illustratively generates control signals to control steering subsystem 352 to steer agricultural harvester 100 according to a desired path or according to desired parameters, such as desired steering angles. Path planning controller 334 can control a path planning system to generate a route for mobile machine 100 and can control propulsion subsystem 350 and steering subsystem 352 to steer mobile machine 100 along that route. Path planning controller 334 can generate control signals based on one or more of predictive map 264, predictive map with control zones 265, information maps 365, or control inputs, such as by an operator or user.

Propulsion controller 331 illustratively generates control signals to control propulsion subsystem 350 to control a speed characteristic of mobile machine 100, such as one or more of travel speed, acceleration, and deceleration. Propulsion subsystem 350 may include various power train components of mobile machine 100, such as, but not limited to, an engine or motor, and a transmission (or gear box). Propulsion controller 331 can generate control signals based on one or more of predictive map 264, predictive map with control zones 265, information maps 365, or control inputs, such as by an operator or user.

Reel controller 335 illustratively generates control signals to control one or more operating parameters of the reel 164, such as one or more positions of the reel (e.g., the reel height or the reel fore-to-aft position, or both), the reel speed, and the position of reel fingers 117. For example, reel controller 335 can generate control signals to control the one or more fore-to-aft actuators 342 to control a fore-to-aft position of reel 164. Fore-to-aft actuators 342 can be similar to fore-to-aft actuators 183 or can be another type of fore-to-aft actuator. In another example, reel controller 335 can generate control signals to control the one or more reel height actuators 344 to control a height of reel 164 (e.g., a height relative to the field or to another component of header 102, such as cutter 104). Reel height actuators 344 can be similar to reel height actuators 147 or can be another type of reel height actuator. In another example, reel controller 335 can generate control signals to control the one or more reel speed actuators 346 to control a speed of rotation of reel 164. Reel speed actuators 346 can be similar to reel speed actuators 176 or can be another type of reel speed actuator. In another example, reel controller 335 can generate control signals to control the one or more reel finger position actuators 348 to control a position (e.g., angular position or orientation) of reel fingers 117. Reel finger position actuators 348 can be similar to reel finger position actuators 181 or can be another type of reel finger position actuator. Reel controller 335 can generate control signals based on one or more of predictive map 264, predictive map with control zones 265, information maps 365, or control inputs, such as by an operator or user.

Zone controller 336 illustratively generates control signals to control one or more controllable subsystems 316 to control operation of the one or more controllable subsystems 316 based on the predictive control zone map 265.

Other controllers 339 included on the mobile machine 100, or at other locations in agricultural system 300, can control other subsystems 316 based on one or more of predictive map 264, predictive map with control zones 265, information maps 365, or control inputs, such as by an operator or user.

While the illustrated example of FIG. 2 shows that various components of agricultural harvesting system architecture 300 are located on agricultural harvester 100, it will be understood that in other examples one or more of the components illustrated on agricultural harvester 100 in FIG. 2 can be located at other locations, such as one or more remote computing systems 368. For instance, one or more of data stores 302, map selector 309, predictive model generator 310, predictive model 311, predictive map generator 312, functional predictive maps 263 (e.g., 264 and 265), control zone generator 313, and control system 314 can be located remotely from mobile machine 100 but can communicate with (or be communicated to) agricultural harvester 100 via communication system 306 and network 359. Thus, the predictive models 311 and functional predictive maps 263 may be generated at remote locations away from agricultural harvester 100 and communicated to mobile machine 100 over network 302, for instance, communication system 306 can download the predictive models 311 and functional predictive maps 263 from the remote locations and store them in data store 302. In other examples, agricultural harvester 100 may access the predictive models 311 and functional predictive maps 263 at the remote locations without downloading the predictive models 311 and functional predictive maps 263. The information used in the generation of the predictive models 311 and functional predictive maps 263 may be provided to the predictive model generator 310 and the predictive map generator 312 at those remote locations over network 359, for example in-situ sensor data generator by in-situ sensors 308 can be provided over network 359 to the remote locations. Similarly, information maps 358 can be provided to the remote locations.

Similarly, where various components are located remotely from agricultural harvester 100, those components can receive data from components of agricultural harvester 100 over network 359. For example, where predictive model generator 310 and predictive map generator 312 are located remotely from agricultural harvester 100, such as at remote computing systems 368, data generated by in-situ sensors 308 and geographic position sensors 304, for instance, can be communicated to the remote computing systems 368 over network 359. Additionally, information maps 358 can be obtained by remote computing systems 368 over network 359 or over another network.

Similarly, the remote systems may include a respective control system or control signal generator that generates control output (e.g., control signals) that are communicated to agricultural harvester 100 and used by the local control system 314 for the control of agricultural harvester 100.

Figure 3A:
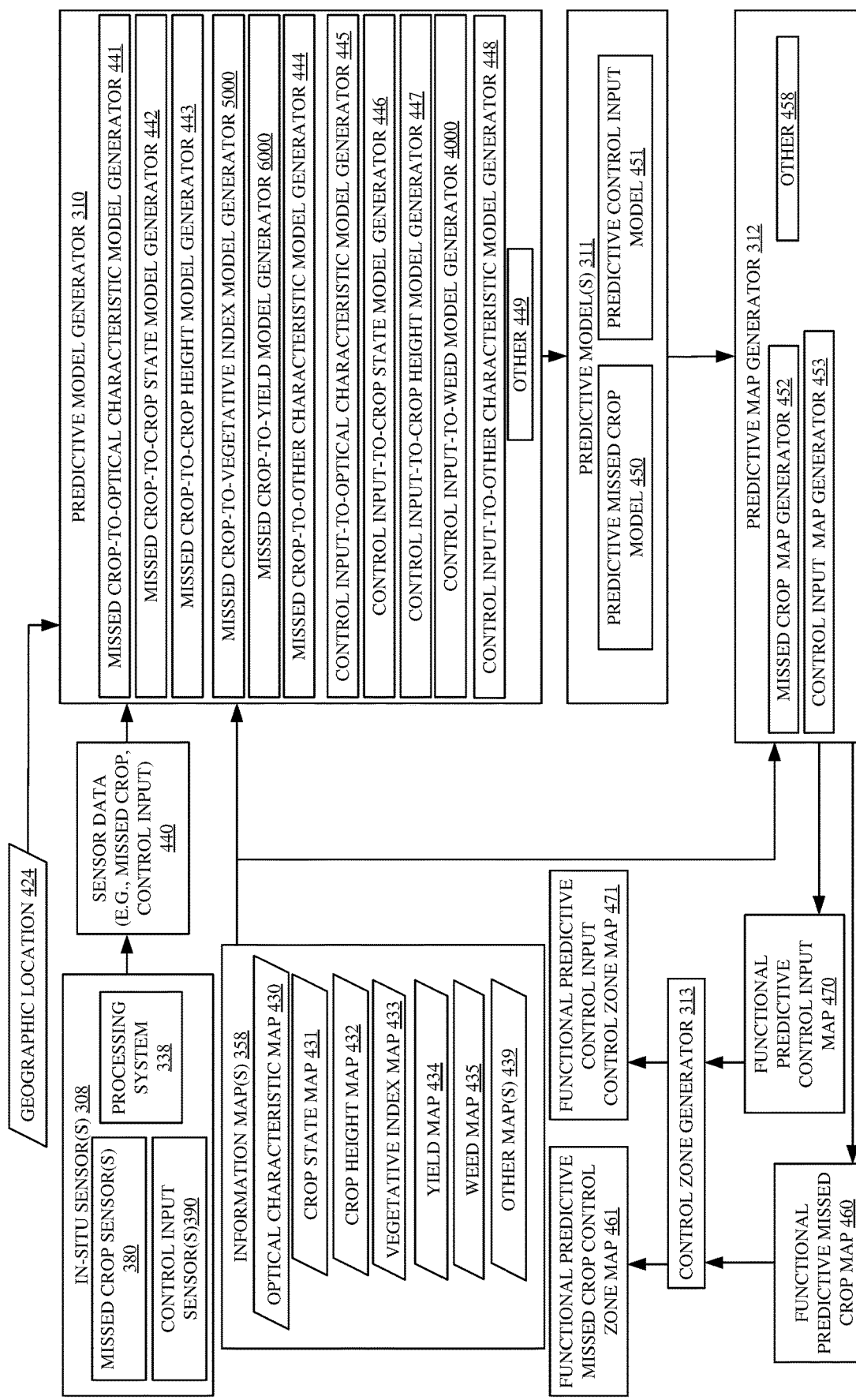
FIGS. 3A-3B are block diagrams showing some examples of a predictive model generator and predictive map generator.
Figure 3B:
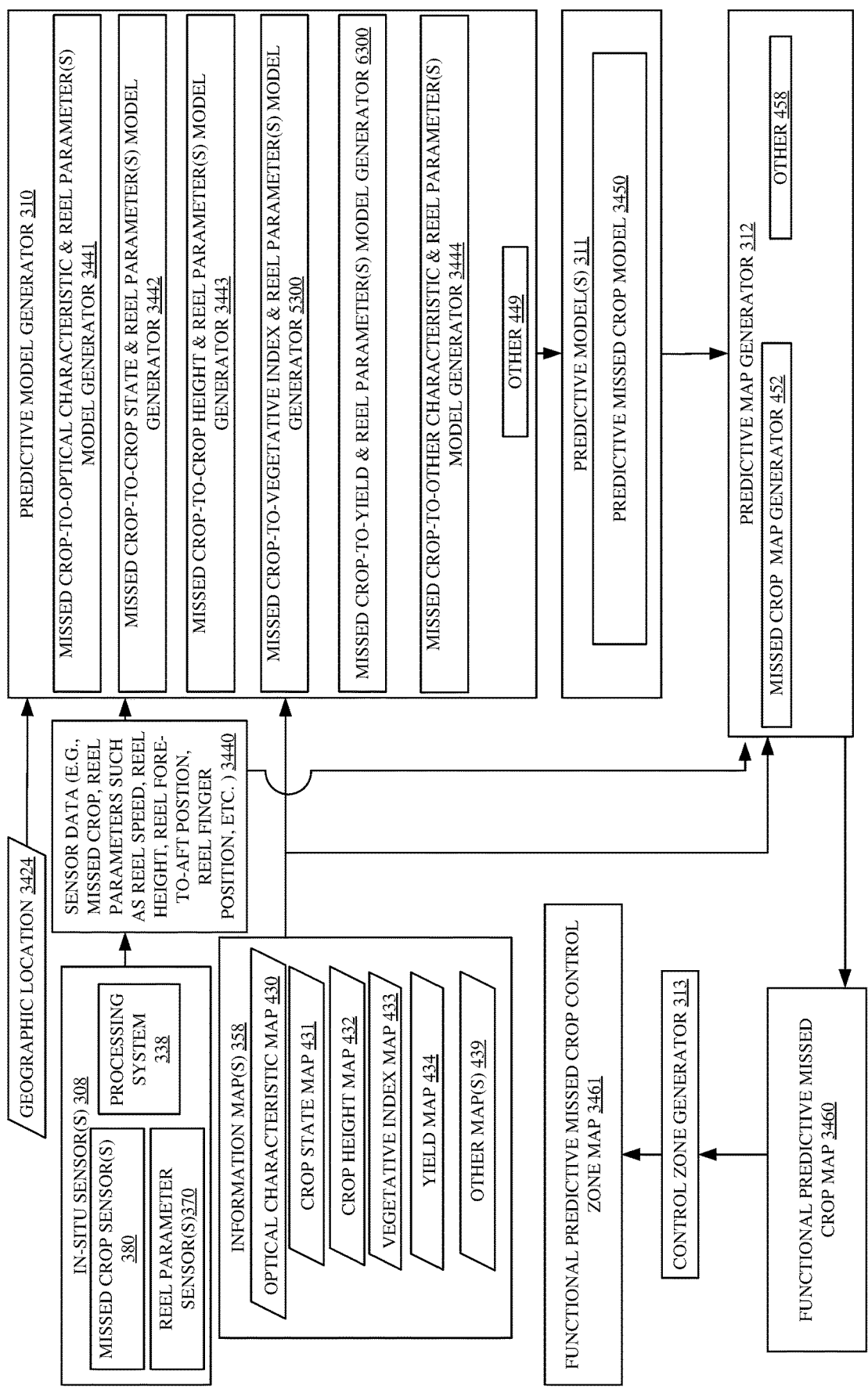

FIGS. 3A-3B are block diagrams of a portion of the agricultural system architecture 300 shown in FIG. 2. Particularly, FIG. 3A shows, among other things, examples of the predictive model generator 310 and the predictive map generator 312 in more detail. FIG. 3A also illustrates information flow among the various components shown. The predictive model generator 310 receives one or more of an optical characteristic map 430, a crop state map 431, a crop height map 432, a vegetative index map 433, a yield map 434, a weed map 435, and other map(s) 439. Predictive model generator 310 also receives a geographic location 424, or an indication of a geographic location, such as from geographic position sensors 304. Geographic location 424 illustratively represents the geographic location of a value detected by in-situ sensors 308. In some examples, the geographic position of the agricultural harvester 100, as detected by geographic position sensors 304, will not be the same as the geographic position on the field to which a value detected by in-situ sensors 308 corresponds. For example, missed crop sensors 380 may detect missed crop behind agricultural harvester 100. Thus, the geographic position of agricultural harvester 100 at the time the missed crop is detected may not be the geographic location of the missed crop. It will be appreciated, that the geographic position indicated by geographic position sensor 304, along with timing, machine speed and heading, machine dimensions, and sensor position (e.g., relative to geographic position sensor), sensor parameters (e.g., field of view), can be used to derive a geographic location at the field to which a value a detected by an in-situ sensor 308 corresponds.

In-situ sensors 308 illustratively include missed crop sensors 380, control input sensors 390, as well as processing system 338. In some examples, processing system 338 is separate from in-situ sensors 308 (such as the example shown in FIG. 2). In some instances, missed crop sensors 380 or control input sensors 390, or both, may be located on-board agricultural harvester 100. The processing system 338 processes sensor data generated from missed crop sensors 380 to generate processed sensor data 440 indicative of missed crop values. The processing system 338 processes sensor data generated from control input sensors 390 to generate processed sensor data 440 indicative of control input values.

As shown in FIG. 3A, the example predictive model generator 310 includes a missed crop-to-optical characteristic model generator 441, a missed crop-to-crop state model generator 442, a missed crop-to-crop height model generator 443, a missed crop-to-other characteristic model generator 444, a missed crop-to-vegetative index model generator 5000, a missed crop-to-yield model generator 6000, a control input-to-optical characteristic model generator 445, a control input-to-crop state model generator 446, a control input-to-crop height model generator 447, a control input-to-other characteristic model generator 448, a control input-to-weed model generator 400. In other examples, the predictive model generator 310 may include additional, fewer, or different components than those shown in the example of FIG. 3A. Consequently, in some examples, the predictive model generator 310 may include other items 449 as well, which may include other types of predictive model generators to generate other types of models.

Missed crop-to-optical characteristic model generator 441 identifies a relationship between missed crop value(s) detected in in-situ sensor data 440, at geographic location(s) to which the missed crop value(s), detected in the in-situ sensor data 440, correspond, and optical characteristic value(s) from the optical characteristic map 430 corresponding to the same geographic location(s) to which the detected missed crop value(s) correspond. Based on this relationship established by missed crop-to-optical characteristic model generator 441, missed crop-to-optical characteristic model generator 441 generates a predictive missed crop model. The predictive missed crop model is used by missed crop map generator 452 to predict missed crop at different locations in the field based upon the georeferenced optical characteristic values contained in the optical characteristic map 430 at the same locations in the field. Thus, for a given location in the field, a missed crop value can be predicted at the given location based on the predictive missed crop model and the optical characteristic value, from the optical characteristic map 430, at that given location.

Missed crop-to-crop state model generator 442 identifies a relationship between missed crop value(s) detected in in-situ sensor data 440, at geographic location(s) to which the missed crop value(s), detected in the in-situ sensor data 440, correspond, and crop state value(s) from the crop state map 431 corresponding to the same geographic location(s) to which the detected missed crop value(s) correspond. Based on this relationship established by missed crop-to-crop state model generator 442, missed crop-to-crop state model generator 442 generates a predictive missed crop model. The predictive missed crop model is used by missed crop map generator 452 to predict missed crop at different locations in the field based upon the georeferenced crop state values contained in the crop state map 431 at the same locations in the field. Thus, for a given location in the field, a missed crop value can be predicted at the given location based on the predictive missed crop model and the crop state value, from the crop state map 431, at that given location.

Missed crop-to-crop height model generator 443 identifies a relationship between missed crop value(s) detected in in-situ sensor data 440, at geographic location(s) to which the missed crop value(s), detected in the in-situ sensor data 440, correspond, and crop height value(s) from the crop height map 432 corresponding to the same geographic location(s) to which the detected missed crop value(s) correspond. Based on this relationship established by missed crop-to-crop height model generator 443, missed crop-to-crop height model generator 443 generates a predictive missed crop model. The predictive missed crop model is used by missed crop map generator 452 to predict missed crop at different locations in the field based upon the georeferenced crop height values contained in the crop height map 432 at the same locations in the field. Thus, for a given location in the field, a missed crop value can be predicted at the given location based on the predictive missed crop model and the crop height value, from the crop height map 432, at that given location.

Missed crop-to-vegetative index model generator 5000 identifies a relationship between missed crop value(s) detected in in-situ sensor data 440, at geographic location(s) to which the missed crop value(s), detected in the in-situ sensor data 440, correspond, and vegetative index value(s) from the vegetative index map 433 corresponding to the same geographic location(s) to which the detected missed crop value(s) correspond. Based on this relationship established by missed crop-to-vegetative index model generator 5000, missed crop-to-vegetative index model generator 5000 generates a predictive missed crop model. The predictive missed crop model is used by missed crop map generator 452 to predict missed crop at different locations in the field based upon the georeferenced vegetative index values contained in the vegetative index map 433 at the same locations in the field. Thus, for a given location in the field, a missed crop value can be predicted at the given location based on the predictive missed crop model and the vegetative index value, from the vegetative index map 433, at that given location.

Missed crop-to-yield model generator 6000 identifies a relationship between missed crop value(s) detected in in-situ sensor data 440, at geographic location(s) to which the missed crop value(s), detected in the in-situ sensor data 440, correspond, and yield value(s) from the yield map 434 corresponding to the same geographic location(s) to which the detected missed crop value(s) correspond. Based on this relationship established by missed crop-to-yield model generator 6000, missed crop-to-yield model generator 6000 generates a predictive missed crop model. The predictive missed crop model is used by missed crop map generator 452 to predict missed crop at different locations in the field based upon the georeferenced yield values contained in the yield map 434 at the same locations in the field. Thus, for a given location in the field, a missed crop value can be predicted at the given location based on the predictive missed crop model and the yield value, from the yield map 434, at that given location.

Missed crop-to-other characteristic model generator 444 identifies a relationship between missed crop value(s) detected in in-situ sensor data 440, at geographic location(s) to which the missed crop value(s), detected in the in-situ sensor data 440, correspond, and other characteristic value(s) from an other map 439 corresponding to the same geographic location(s) to which the detected missed crop value(s) correspond. Based on this relationship established by missed crop-to-other characteristic model generator 444, missed crop-to-other characteristic model generator 444 generates a predictive missed crop model. The predictive missed crop model is used by missed crop map generator 452 to predict missed crop at different locations in the field based upon the georeferenced other characteristic values contained in the other map 439 at the same locations in the field. Thus, for a given location in the field, a missed crop value can be predicted at the given location based on the predictive missed crop model and the other characteristic value, from the other map 439, at that given location.

In light of the above, the predictive model generator 310 is operable to produce a plurality of predictive missed crop models, such as one or more of the predictive missed crop models generated by model generators 441, 442, 443, 444, 5000, 6000, and 449. In another example, two or more of the predictive models described above may be combined into a single predictive missed crop model, such as a predictive missed crop model that predicts missed crop based upon two or more of the optical characteristic value, the crop state value, the crop height value, the vegetative index value, the yield value, and the other characteristic value at different locations in the field. Any of these missed crop models, or combinations thereof, are represented collectively by predictive missed crop model 450 in FIG. 3A.

The predictive missed crop model 450 is provided to predictive map generator 312. In the example of FIG. 3A, predictive map generator 312 includes missed crop map generator 452. In other examples, predictive map generator 312 may include additional or different map generators. Thus, in some examples, predictive map generator 312 may include other items 458 which may include other types of map generators to generate other types of maps.

Missed crop map generator 452 receives one or more of the optical characteristic map 430, the crop state map 431, the crop height map 432, the vegetative index map 433, the yield map 434, and an other map 439, along with the predictive missed crop model 450 which predicts missed crop based upon one or more of an optical characteristic value, a crop state value, a crop height value, a vegetative index value, a yield value, and an other characteristic value, and generates a predictive map that predicts missed crop at different locations in the field, such as functional predictive missed crop map 460.

Map generator 312 thus outputs a functional predictive missed crop map 460 that is predictive of missed crop. Functional predictive missed crop map 460 is a predictive map 264. The functional predictive missed crop map 460, in one example, predicts missed crop at different locations in a field. The functional predictive missed crop map 460 may be provided to control zone generator 313, control system 314, or both. Control zone generator 313 generates control zones and incorporates those control zones into the functional predictive missed crop map 460 to produce a predictive control zone map 265, that is a functional predictive missed crop control zone map 461.

One or both of functional predictive missed crop map 460 and functional predictive missed crop control zone map 461 may be provided to control system 314, which generates control signals to control one or more of the controllable subsystems 316 based upon the functional predictive missed crop map 460, the functional predictive missed crop control zone map 461, or both.

Control input-to-optical characteristic model generator 445 identifies a relationship between control input value(s) detected in in-situ sensor data 440, at geographic location(s) to which the control input value(s), detected in the in-situ sensor data 440, correspond, and optical characteristic value(s) from the optical characteristic map 430 corresponding to the same geographic location(s) to which the detected control input value(s) correspond. Based on this relationship established by control input-to-optical characteristic model generator 445, control input-to-optical characteristic model generator 445 generates a predictive control input model. The predictive control input model is used by control input map generator 453 to predict control input at different locations in the field based upon the georeferenced optical characteristic values contained in the optical characteristic map 430 at the same locations in the field. Thus, for a given location in the field, a control input value can be predicted at the given location based on the predictive control input model and the optical characteristic value, from the optical characteristic map 430, at that given location.

Control input-to-crop state model generator 446 identifies a relationship between control input value(s) detected in in-situ sensor data 440, at geographic location(s) to which the control input value(s), detected in the in-situ sensor data 440, correspond, and crop state value(s) from the crop state map 431 corresponding to the same geographic location(s) to which the detected control input value(s) correspond. Based on this relationship established by control input-to-crop state model generator 446, control input-to-crop state model generator 446 generates a predictive control input model. The predictive control input model is used by control input map generator 453 to predict control input at different locations in the field based upon the georeferenced crop state values contained in the crop state map 431 at the same locations in the field. Thus, for a given location in the field, a control input value can be predicted at the given location based on the predictive control input model and the crop state value, from the crop state map 431, at that given location.

Control input-to-crop height model generator 447 identifies a relationship between control input value(s) detected in in-situ sensor data 440, at geographic location(s) to which the control input value(s), detected in the in-situ sensor data 440, correspond, and crop height value(s) from the crop height map 432 corresponding to the same geographic location(s) to which the detected control input value(s) correspond. Based on this relationship established by control input-to-crop height model generator 446, control input-to-crop height model generator 446 generates a predictive control input model. The predictive control input model is used by control input map generator 453 to predict control input at different locations in the field based upon the georeferenced crop height values contained in the crop height map 432 at the same locations in the field. Thus, for a given location in the field, a control input value can be predicted at the given location based on the predictive control input model and the crop height value, from the crop height map 432, at that given location.

Control input-to-weed model generator 4000 identifies a relationship between control input value(s) detected in in-situ sensor data 440, at geographic location(s) to which the control input value(s), detected in the in-situ sensor data 440, correspond, and weed value(s) from the weed map 435 corresponding to the same geographic location(s) to which the detected control input value(s) correspond. Based on this relationship established by control input-to-weed model generator 4000, control input-to-weed model generator 4000 generates a predictive control input model. The predictive control input model is used by control input map generator 453 to predict control input at different locations in the field based upon the georeferenced weed values contained in the weed map 435 at the same locations in the field. Thus, for a given location in the field, a control input value can be predicted at the given location based on the predictive control input model and the weed value, from the weed map 435, at that given location.

Control input-to-other characteristic model generator 448 identifies a relationship between control input value(s) detected in in-situ sensor data 440, at geographic location(s) to which the control input value(s), detected in the in-situ sensor data 440, correspond, and other characteristic value(s) from an other map 439 corresponding to the same geographic location(s) to which the detected control input value(s) correspond. Based on this relationship established by control input-to-other characteristic model generator 448, control input-to-other characteristic model generator 448 generates a predictive control input model. The predictive control input model is used by control input map generator 453 to predict control input at different locations in the field based upon the georeferenced other characteristic values contained in the other map 439 at the same locations in the field. Thus, for a given location in the field, a control input value can be predicted at the given location based on the predictive missed crop model and the other characteristic value, from the other map 439, at that given location.

In light of the above, the predictive model generator 310 is operable to produce a plurality of predictive control input models, such as one or more of the predictive control input models generated by model generators 445, 446, 447, 448, 4000, and 449. In another example, two or more of the predictive models described above may be combined into a single predictive control input model, such as a predictive control input model that predicts control input based upon two or more of the optical characteristic value, the crop state value, the crop height value, the weed value, and the other characteristic value at different locations in the field. Any of these control input models, or combinations thereof, are represented collectively by predictive control input model 451 in FIG. 3A.

The predictive control input model 451 is provided to predictive map generator 312. In the example of FIG. 3A, predictive map generator 312 includes control input map generator 453. In other examples, predictive map generator 312 may include additional or different map generators. Thus, in some examples, predictive map generator 312 may include other items 458 which may include other types of map generators to generate other types of maps.

Control input map generator 453 receives one or more of the optical characteristic map 430, the crop state map 431, the crop height map 432, the weed map 435, and an other map 439, along with the predictive control input model 451 which predicts control input based upon one or more of an optical characteristic value, a crop state value, a crop height value, a weed value, and an other characteristic value, and generates a predictive map that predicts control input at different locations in the field, such as functional predictive control input map 470.

Map generator 312 thus outputs a functional predictive control input map 470 that is predictive of control input. Functional predictive control input map 470 is a predictive map 264. The functional predictive control input map 470, in one example, predicts control input at different locations in a field. The functional predictive control input map 470 may be provided to control zone generator 313, control system 314, or both. Control zone generator 313 generates control zones and incorporates those control zones into the functional predictive control input map 470 to produce a predictive control zone map 265, that is a functional predictive control input control zone map 471.

One or both of functional predictive control input map 470 and functional predictive control input control zone map 471 may be provided to control system 314, which generates control signals to control one or more of the controllable subsystems 316 based upon the functional predictive control input map 470, the functional predictive control input control zone map 471, or both.

FIG. 3B shows, among other things, examples of the predictive model generator 310 and the predictive map generator 312 in more detail. FIG. 3B also illustrates information flow among the various components shown. The predictive model generator 310 receives one or more of an optical characteristic map 430, a crop state map 431, a crop height map 432, a vegetative index map 433, a yield map 434, and other map(s) 439. Predictive model generator 310 also receives a geographic location 3424, or an indication of a geographic location, such as from geographic position sensors 304. Geographic location 3424 illustratively represents the geographic location of a value detected by in-situ sensors 308. In some examples, the geographic position of the agricultural harvester 100, as detected by geographic position sensors 304, will not be the same as the geographic position on the field to which a value detected by in-situ sensors 308 corresponds. For example, missed crop sensors 380 may detect missed crop behind agricultural harvester 100. Thus, the geographic position of agricultural harvester 100 at the time the missed crop is detected may not be the geographic location of the missed crop. It will be appreciated, that the geographic position indicated by geographic position sensor 304, along with timing, machine speed and heading, machine dimensions, and sensor position (e.g., relative to geographic position sensor), sensor parameters (e.g., field of view), can be used to derive a geographic location at the field to which a value a detected by an in-situ sensor 308 corresponds.

In-situ sensors 308 illustratively include missed crop sensors 380, reel parameter sensors 370, as well as processing system 338. In some examples, processing system 338 is separate from in-situ sensors 308 (such as the example shown in FIG. 2). In some instances, missed crop sensors 380 or reel parameter sensors 370, or both, may be located on-board agricultural harvester 100. The processing system 338 processes sensor data generated from missed crop sensors 380 to generate processed sensor data 3440 indicative of missed crop values. The processing system 338 processes sensor data generated from reel parameter sensors 370 to generate processed sensor data 3440 indicative of reel parameter values, such as one or more of reel speed values, reel height values, reel fore-to-aft position values, and reel finger position values.

As shown in FIG. 3B, the example predictive model generator 310 includes a missed crop-to-optical characteristic and reel parameter(s) model generator 3441, a missed crop-to-crop state and reel parameter(s) model generator 3442, a missed crop-to-crop height and reel parameter(s) model generator 3443, a missed crop-to-other characteristic and reel parameter(s) model generator 3444, a missed crop-to-vegetative index and reel parameter(s) model generator 5300, and a missed crop-to-yield and reel parameter(s) model generator 6300. In other examples, the predictive model generator 310 may include additional, fewer, or different components than those shown in the example of FIG. 3A. Consequently, in some examples, the predictive model generator 310 may include other items 449 as well, which may include other types of predictive model generators to generate other types of models.

Missed crop-to-optical characteristic and reel parameter(s) model generator 3441 identifies a relationship between missed crop value(s) detected in in-situ sensor data 3440, at geographic location(s) to which the missed crop value(s), detected in the in-situ sensor data 3440, correspond, and optical characteristic value(s) from the optical characteristic map 430 corresponding to the same geographic location(s) to which the detected missed crop value(s) correspond, and value(s) of one or more reel parameters (e.g., one or more of reel speed value(s), reel height value(s), reel fore-to-aft position value(s), and reel finger position value(s)) detected in in-situ sensor data 3440 corresponding to the same geographic location(s) to which the detected missed crop value(s) correspond. Based on this relationship established by missed crop-to-optical characteristic and reel parameter(s) model generator 3441, missed crop-to-optical characteristic and reel parameter(s) model generator 3441 generates a predictive missed crop model. The predictive missed crop model is used by missed crop map generator 452 to predict missed crop at different locations in the field based upon the georeferenced optical characteristic values contained in the optical characteristic map 430 at the same locations in the field and the reel parameter values (e.g., one or more of the reel speed values, reel height values, reel fore-to-aft position values, and reel finger position values) corresponding to the same locations in the field. In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict missed crop. In some examples, the expected reel parameter values can be prescribed or predicted reel parameter values, such as from a prescribed reel parameter map or a predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a missed crop value can be predicted at the given location based on the predictive missed crop model, the optical characteristic value, from the optical characteristic map 430, at that given location, and reel parameter value(s) (e.g., one or more of an expected reel speed value, an expected reel height value, an expected reel fore-to-aft position value, and an expected reel finger position value) corresponding to that given location.

Missed crop-to-crop state and reel parameter(s) model generator 3442 identifies a relationship between missed crop value(s) detected in in-situ sensor data 3440, at geographic location(s) to which the missed crop value(s), detected in the in-situ sensor data 3440, correspond, and crop state value(s) from the crop state map 431 corresponding to the same geographic location(s) to which the detected missed crop value(s) correspond, and value(s) of one or more reel parameters (e.g., one or more of reel speed value(s), reel height value(s), reel fore-to-aft position value(s), and reel finger position value(s)) detected in in-situ sensor data 3440 corresponding to the same geographic location(s) to which the detected missed crop value(s) correspond. Based on this relationship established by missed crop-to-crop state and reel parameter(s) model generator 3442, missed crop-to-crop state and reel parameter(s) model generator 3442 generates a predictive missed crop model. The predictive missed crop model is used by missed crop map generator 452 to predict missed crop at different locations in the field based upon the georeferenced crop state values contained in the crop state map 431 at the same locations in the field and the reel parameter values (e.g., one or more of the reel speed values, the reel height values, the reel fore-to-aft position values, and reel finger position values) corresponding to the same locations in the field. In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict missed crop. In some examples, the expected reel parameter values can be prescribed or predicted reel parameter values, such as from a prescribed or predictive reel parameter map. In some examples, the expected reel parameter values may be output by a control system, or provided by an operator or user. In some examples, when the reel parameter values are changed (either by operator or user input or by a control system, or learning trigger criteria) the map (and perhaps the model) can be made new (or modified or revised).

Thus, for a given location in the field, a missed crop value can be predicted at the given location based on the predictive missed crop model, the crop state value, from the crop state map 431, at that given location, and the reel parameter value(s) (e.g., one or more of an expected reel speed value, an expected reel height value, an expected reel fore-to-aft position value, and an expected reel finger position value) corresponding to that given location.

Missed crop-to-crop height and reel parameter(s) model generator 3443 identifies a relationship between missed crop value(s) detected in in-situ sensor data 3440, at geographic location(s) to which the missed crop value(s), detected in the in-situ sensor data 3440, correspond, and crop height value(s) from the crop height map 432 corresponding to the same geographic location(s) to which the detected missed crop value(s) correspond, and value(s) of one or more reel parameters (e.g., one or more of reel speed value(s), reel height value(s), reel fore-to-aft position value(s), and reel finger position value(s)) detected in in-situ sensor data 3440 corresponding to the same geographic location(s) to which the detected missed crop value(s) correspond. Based on this relationship established by missed crop-to-crop height and reel parameter(s) model generator 3443, missed crop-to-crop height and reel parameter(s) model generator 3443 generates a predictive missed crop model. The predictive missed crop model is used by missed crop map generator 452 to predict missed crop at different locations in the field based upon the georeferenced crop height values contained in the crop height map 432 at the same locations in the field and the reel parameter values (e.g., one or more of the reel speed values, the reel height values, the reel fore-to-aft position values, and the reel finger position values) corresponding to the same locations in the field. In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict missed crop. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a missed crop value can be predicted at the given location based on the predictive missed crop model, the crop height value, from the crop height map 432, at that given location, and the reel parameter value(s) (e.g., one or more of an expected reel speed value, an expected reel height value, an expected reel fore-to-aft position value, an expected reel finger position value) corresponding to that given location.

Missed crop-to-vegetative index and reel parameter(s) model generator 5300 identifies a relationship between missed crop value(s) detected in in-situ sensor data 3440, at geographic location(s) to which the missed crop value(s), detected in the in-situ sensor data 3440, correspond, and vegetative index value(s) from the vegetative index map 433 corresponding to the same geographic location(s) to which the detected missed crop value(s) correspond, and value(s) of one or more reel parameters (e.g., one or more of reel speed value(s), reel height value(s), reel fore-to-aft position value(s), and reel finger position value(s)) detected in in-situ sensor data 3440 corresponding to the same geographic location(s) to which the detected missed crop value(s) correspond. Based on this relationship established by missed crop-to-vegetative index and reel parameter(s) model generator 5300, missed crop-to-vegetative index and reel parameter(s) model generator 5300 generates a predictive missed crop model. The predictive missed crop model is used by missed crop map generator 452 to predict missed crop at different locations in the field based upon the georeferenced vegetative index values contained in the vegetative index map 433 at the same locations in the field and the reel parameter values (e.g., one or more of the reel speed values, the reel height values, the reel fore-to-aft position values, and the reel finger position value(s)) corresponding to the same locations in the field. In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict missed crop. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a missed crop value can be predicted at the given location based on the predictive missed crop model, the vegetative index value, from the vegetative index map 433, at that given location, and the reel parameter value(s) (e.g., one or more of an expected reel speed value, an expected reel height value, an expected reel fore-to-aft position value, and an expected reel finger position value) corresponding to that given location.

Missed crop-to-yield and reel parameter(s) model generator 6300 identifies a relationship between missed crop value(s) detected in in-situ sensor data 3440, at geographic location(s) to which the missed crop value(s), detected in the in-situ sensor data 3440, correspond, and yield value(s) from the yield map 434 corresponding to the same geographic location(s) to which the detected missed crop value(s) correspond, and value(s) of one or more reel parameters (e.g., one or more of reel speed value(s), reel height value(s), reel fore-to-aft position value(s), and reel finger position value(s)) detected in in-situ sensor data 3440 corresponding to the same geographic location(s) to which the detected missed crop value(s) correspond. Based on this relationship established by missed crop-to-yield and reel parameter(s) model generator 6300, missed crop-to-yield and reel parameter(s) model generator 6300 generates a predictive missed crop model. The predictive missed crop model is used by missed crop map generator 452 to predict missed crop at different locations in the field based upon the georeferenced yield values contained in the yield map 434 at the same locations in the field and the reel parameter values (e.g., one or more of the reel speed values, the reel height values, the reel fore-to-aft position values, and the reel finger position value(s)) corresponding to the same locations in the field. In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict missed crop. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a missed crop value can be predicted at the given location based on the predictive missed crop model, the yield value, from the yield map 434, at that given location, and the reel parameter value(s) (e.g., one or more of a reel speed value, a reel height value, a reel fore-to-aft position value, and a reel finger position value) corresponding to that given location.

Missed crop-to-other characteristic and reel parameter(s) model generator 3444 identifies a relationship between missed crop value(s) detected in in-situ sensor data 3440, at geographic location(s) to which the missed crop value(s), detected in the in-situ sensor data 3440, correspond, and other characteristic value(s) from an other map 439 corresponding to the same geographic location(s) to which the detected missed crop value(s) correspond, and value(s) of one or more reel parameters (e.g., one or more of reel speed value(s), reel height value(s), reel fore-to-aft position value(s), and reel finger position value(s)) detected in in-situ sensor data 3440 corresponding to the same geographic location(s) to which the detected missed crop value(s) correspond. Based on this relationship established by missed crop-to-other characteristic and reel parameter(s) model generator 3444, missed crop-to-other characteristic and reel parameter(s) model generator 3444 generates a predictive missed crop model. The predictive missed crop model is used by missed crop map generator 452 to predict missed crop at different locations in the field based upon the georeferenced other characteristic values contained in the other map 439 at the same locations in the field and the reel parameter values (e.g., one or more of the reel speed values, the reel height values, the reel fore-to-aft position values, and the reel finger position values) corresponding to the same locations in the field. In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict missed crop. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a missed crop value can be predicted at the given location based on the predictive missed crop model, the other characteristic value, from the other map 439, at that given location, and the reel parameter value(s) (e.g., one or more of an expected reel speed value, an expected reel height value, an expected reel fore-to-aft position value, and an expected reel finger position value) corresponding to that given location.

In light of the above, the predictive model generator 310 is operable to produce a plurality of predictive missed crop models, such as one or more of the predictive missed crop models generated by model generators 3441, 3442, 3443, 3444, 5300, 6300, and 449. In another example, two or more of the predictive models described above may be combined into a single predictive missed crop model, such as a predictive missed crop model that predicts missed crop based upon two or more of the optical characteristic value and a value of one or more reel parameters, the crop state value and a value of one or more reel parameters, the crop height value and a value of one or more reel parameters, the vegetative index value and a value of one or more reel parameters, the yield value and a value of one or more reel parameters, and the other characteristic value and a value of one or more reel parameters corresponding to different locations in the field. Any of these missed crop models, or combinations thereof, are represented collectively by predictive missed crop model 3450 in FIG. 3B.

The predictive missed crop model 3450 is provided to predictive map generator 312. In the example of FIG. 3B, predictive map generator 312 includes missed crop map generator 452. In other examples, predictive map generator 312 may include additional or different map generators. Thus, in some examples, predictive map generator 312 may include other items 458 which may include other types of map generators to generate other types of maps.

Missed crop map generator 452 receives one or more of the optical characteristic map 430, the crop state map 431, the crop height map 432, the vegetative index map 433, the yield map 434, and an other map 439, value(s) of one or more reel parameters, along with the predictive missed crop model 3450 which predicts missed crop based upon one or more of an optical characteristic value and a value of one or more reel parameters, a crop state value and a value of one or more reel parameters, a crop height value and a value of one or more reel parameters, a vegetative index value and a value of one or more reel parameters, a yield value and a value of one or more reel parameters, and an other characteristic value and a value of one or more reel parameters, and generates a predictive map that predicts missed crop at different locations in the field, such as functional predictive missed crop map 3460.

Map generator 312 thus outputs a functional predictive missed crop map 3460 that is predictive of missed crop. Functional predictive missed crop map 3460 is a predictive map 264. The functional predictive missed crop map 3460, in one example, predicts missed crop at different locations in a field. The functional predictive missed crop map 3460 may be provided to control zone generator 313, control system 314, or both. Control zone generator 313 generates control zones and incorporates those control zones into the functional predictive missed crop map 3460 to produce a predictive control zone map 265, that is a functional predictive missed crop control zone map 3461.

One or both of functional predictive missed crop map 3460 and functional predictive missed crop control zone map 3461 may be provided to control system 314, which generates control signals to control one or more of the controllable subsystems 316 based upon the functional predictive missed crop map 3460, the functional predictive missed crop control zone map 3461, or both.

Figure 4A:
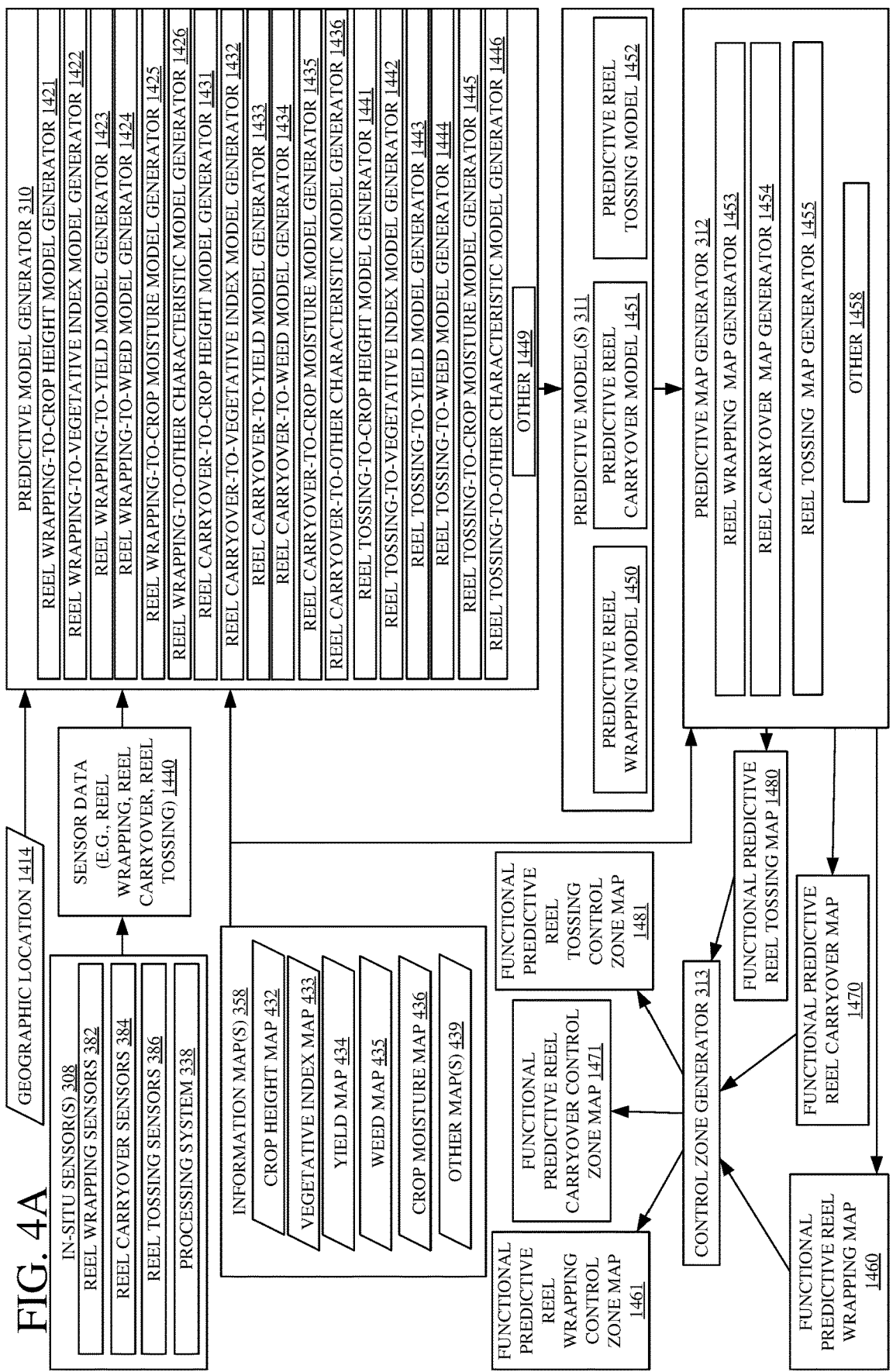
FIGS. 4A-4B are block diagrams showing some examples of a predictive model generator and predictive map generator.
Figure 4B:
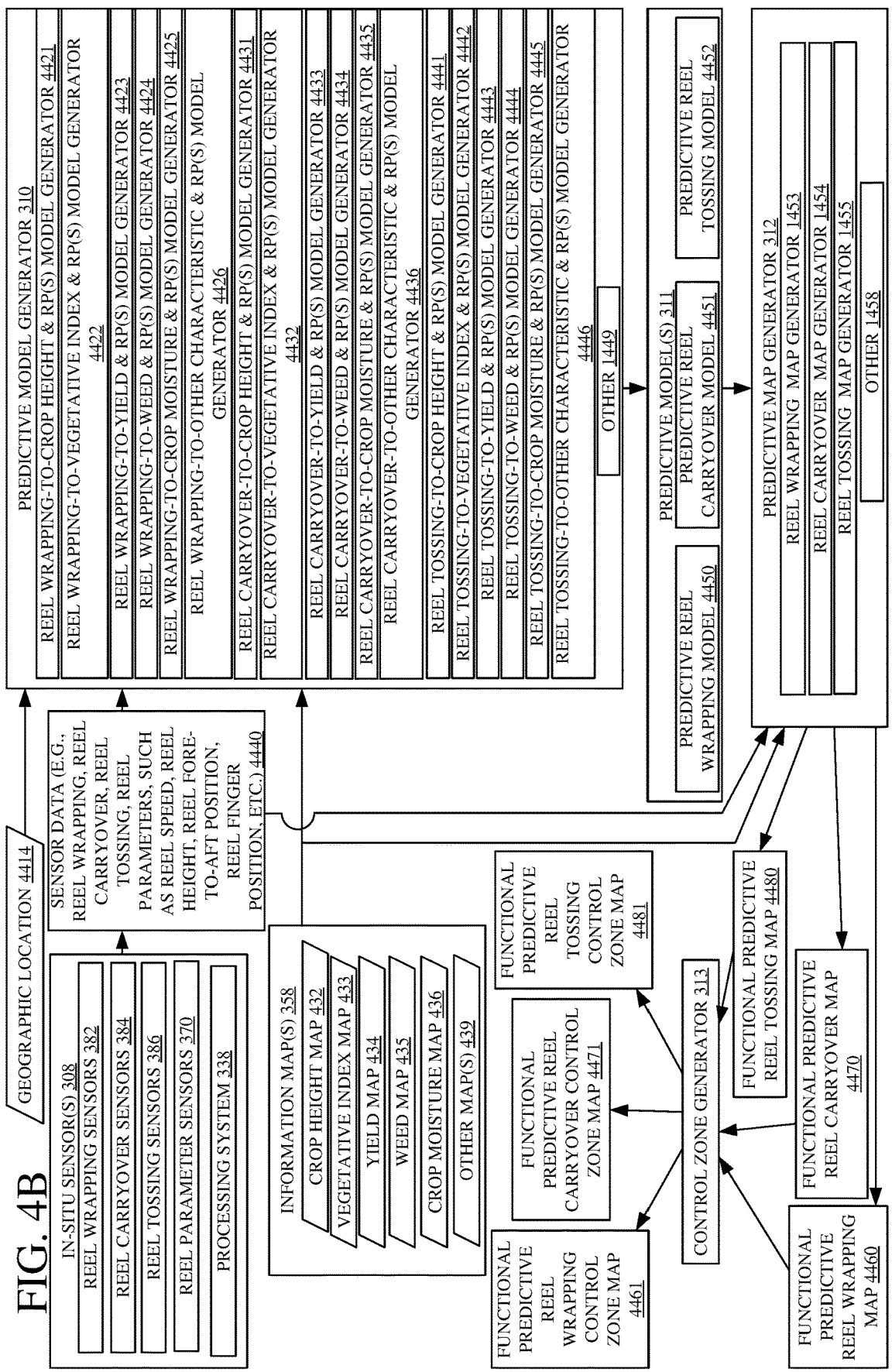

FIGS. 4A-4B are block diagrams of a portion of the agricultural system architecture 300 shown in FIG. 2. Particularly, FIG. 4A shows, among other things, examples of the predictive model generator 310 and the predictive map generator 312 in more detail. FIG. 4A also illustrates information flow among the various components shown. The predictive model generator 310 receives one or more of a crop height map 432, a vegetative index map 433, a yield map 434, a weed map 435, a crop moisture map 436, and other map(s) 439. Predictive model generator 310 also receives a geographic location 1414, or an indication of a geographic location, such as from geographic position sensors 304. Geographic location 1414 illustratively represents the geographic location of a value detected by in-situ sensors 308. In some examples, the geographic position of the agricultural harvester 100, as detected by geographic position sensors 304, will not be the same as the geographic position on the field to which a value detected by in-situ sensors 308 corresponds. For example, reel tossing sensors 386 may detect carryover of crop by detecting crop material on the field behind agricultural harvester 100. Thus, the geographic position of agricultural harvester 100 at the time the reel tossing is detected may not be the geographic location of the reel tossing. It will be appreciated, that the geographic position indicated by geographic position sensor 304, along with timing, machine speed and heading, machine dimensions, and sensor position (e.g., relative to geographic position sensor), sensor parameters (e.g., field of view), can be used to derive a geographic location at the field to which a value a detected by an in-situ sensor 308 corresponds.

In-situ sensors 308 illustratively reel wrapping sensors 382, reel carryover sensors 384, reel tossing sensors 386, as well as processing system 338. In some examples, processing system 338 is separate from in-situ sensors 308 (such as the example shown in FIG. 2). In some instances, one or more of reel wrapping sensors 382, reel carryover sensors 384, and reel tossing sensors 386 may be located on-board agricultural harvester 100. The processing system 338 processes sensor data generated from reel wrapping sensors 382, reel carryover sensors 384, and reel tossing sensors 386 to generate processed sensor data 1440 indicative of reel wrapping values, reel carryover values, and reel tossing values, respectively.

As shown in FIG. 4A, the example predictive model generator 310 includes a reel wrapping-to-crop height model generator 1421, a reel wrapping-to-vegetative index model generator 1422, a reel wrapping-to-yield model generator 1423, a reel wrapping-to-weed model generator 1424, a reel wrapping-to-crop moisture model generator 1425, a reel wrapping-to-other characteristic model generator 1426, a reel carryover-to-crop height model generator 1431, a reel carryover-to-vegetative index model generator 1432, a reel carryover-to-yield model generator 1433, a reel carryover-to-weed model generator 1434, a reel carryover-to-crop moisture model generator 1435, a reel carryover-to-other characteristic model generator 1436, a reel tossing-to-crop height model generator 1441, a reel tossing-to-vegetative index model generator 1442, a reel tossing-to-yield model generator 1443, a reel tossing-to-weed model generator 1444, a reel tossing-to-crop moisture model generator 1445, and a reel tossing-to-other characteristic model generator 1446. In other examples, the predictive model generator 310 may include additional, fewer, or different components than those shown in the example of FIG. 4A. Consequently, in some examples, the predictive model generator 310 may include other items 1449 as well, which may include other types of predictive model generators to generate other types of models.

Reel wrapping-to-crop height model generator 1421 identifies a relationship between reel wrapping value(s) detected in in-situ sensor data 1440, at geographic location(s) to which the reel wrapping value(s), detected in the in-situ sensor data 1440, correspond, and crop height value(s) from the crop height map 432 corresponding to the same geographic location(s) to which the detected reel wrapping value(s) correspond. Based on this relationship established by reel wrapping-to-crop height model generator 1421, reel wrapping-to-crop height model generator generates a predictive reel wrapping model. The predictive reel wrapping model is used by reel wrapping map generator 1453 to predict reel wrapping at different locations in the field based upon the georeferenced crop height values contained in the crop height map 432 at the same locations in the field. Thus, for a given location in the field, a reel wrapping value can be predicted at the given location based on the predictive reel wrapping model and the crop height value, from the crop height map 432, at that given location.

Reel wrapping-to-vegetative index model generator 1422 identifies a relationship between reel wrapping value(s) detected in in-situ sensor data 1440, at geographic location(s) to which the reel wrapping value(s), detected in the in-situ sensor data 1440, correspond, and vegetative index value(s) from the vegetative index map 433 corresponding to the same geographic location(s) to which the detected reel wrapping value(s) correspond. Based on this relationship established by reel wrapping-to-vegetative index model generator 1422, reel wrapping-to-vegetative index model generator 1422 generates a predictive reel wrapping model. The predictive reel wrapping model is used by reel wrapping map generator 1453 to predict reel wrapping at different locations in the field based upon the georeferenced vegetative index values contained in the vegetative index map 433 at the same locations in the field. Thus, for a given location in the field, a reel wrapping value can be predicted at the given location based on the predictive reel wrapping model and the vegetative index value, from the vegetative index map 433, at that given location.

Reel wrapping-to-yield model generator 1423 identifies a relationship between reel wrapping value(s) detected in in-situ sensor data 1440, at geographic location(s) to which the reel wrapping value(s), detected in the in-situ sensor data 1440, correspond, and yield value(s) from the yield map 434 corresponding to the same geographic location(s) to which the detected reel wrapping value(s) correspond. Based on this relationship established by reel wrapping-to-yield model generator 1423, reel wrapping-to-yield model generator 1423 generates a predictive reel wrapping model. The predictive reel wrapping model is used by reel wrapping map generator to predict reel wrapping at different locations in the field based upon the georeferenced yield values contained in the yield map 434 at the same locations in the field. Thus, for a given location in the field, a reel wrapping value can be predicted at the given location based on the predictive reel wrapping model and the yield value, from the yield map 434, at that given location.

Reel wrapping-to-weed model generator 1424 identifies a relationship between reel wrapping value(s) detected in in-situ sensor data 1440, at geographic location(s) to which the reel wrapping value(s), detected in the in-situ sensor data 1440, correspond, and weed value(s) from the weed map 435 corresponding to the same geographic location(s) to which the detected reel wrapping value(s) correspond. Based on this relationship established by reel wrapping-to-weed model generator 1424, reel wrapping-to-weed model generator 1424 generates a predictive reel wrapping model. The predictive reel wrapping model is used by reel wrapping map generator 1453 to predict reel wrapping at different locations in the field based upon the georeferenced weed values contained in the weed map 435 at the same locations in the field. Thus, for a given location in the field, a reel wrapping value can be predicted at the given location based on the predictive reel wrapping model and the weed value, from the weed map 435, at that given location.

Reel wrapping-to-crop moisture model generator 1425 identifies a relationship between reel wrapping value(s) detected in in-situ sensor data 1440, at geographic location(s) to which the reel wrapping value(s), detected in the in-situ sensor data 1440, correspond, and crop moisture value(s) from the crop moisture map 436 corresponding to the same geographic location(s) to which the detected reel wrapping value(s) correspond. Based on this relationship established by reel wrapping-to-crop moisture model generator 1425, reel wrapping-to-crop moisture model generator 1425 generates a predictive reel wrapping model. The predictive reel wrapping model is used by reel wrapping map generator 1453 to predict reel wrapping at different locations in the field based upon the georeferenced crop moisture values contained in the crop moisture map 436 at the same locations in the field. Thus, for a given location in the field, a reel wrapping value can be predicted at the given location based on the predictive reel wrapping model and the crop moisture value, from the crop moisture map 436, at that given location.

Reel wrapping-to-other characteristic model generator 1426 identifies a relationship between reel wrapping value(s) detected in in-situ sensor data 1440, at geographic location(s) to which the reel wrapping value(s), detected in the in-situ sensor data 1440, correspond, and other characteristic value(s) from an other map 439 corresponding to the same geographic location(s) to which the detected reel wrapping value(s) correspond. Based on this relationship established by reel wrapping-to-other characteristic model generator 1426, reel wrapping-to-other characteristic model generator 1426 generates a predictive reel wrapping model. The predictive reel wrapping model is used by reel wrapping map generator 1453 to predict reel wrapping at different locations in the field based upon the georeferenced other characteristic values contained in the other map 439 at the same locations in the field. Thus, for a given location in the field, a reel wrapping value can be predicted at the given location based on the predictive reel wrapping model and the other characteristic value, from the other map 439, at that given location.

In light of the above, the predictive model generator 310 is operable to produce a plurality of predictive reel wrapping models, such as one or more of the predictive reel wrapping models generated by model generators 1421, 1422, 1423, 1424, 1425, 1426, and 1449. In another example, two or more of the predictive models described above may be combined into a single predictive reel wrapping model, such as a predictive reel wrapping model that predicts reel wrapping based upon two or more of the crop height value, the vegetative index value, the yield value, the weed value, the crop moisture value, and the other characteristic value at different locations in the field. Any of these reel wrapping models, or combinations thereof, are represented collectively by predictive reel wrapping model 1450 in FIG. 4A.

The predictive reel wrapping model 1450 is provided to predictive map generator 312. In the example of FIG. 4A, predictive map generator 312 includes reel wrapping map generator 1453. In other examples, predictive map generator 312 may include additional or different map generators. Thus, in some examples, predictive map generator 312 may include other items 1458 which may include other types of map generators to generate other types of maps.

Reel wrapping map generator 1453 receives one or more of the crop height map 432, the vegetative index map 433, the yield map 434, the weed map 435, the crop moisture map 436, and an other map 439, along with the predictive reel wrapping model 1450 which predicts reel wrapping based upon one or more of an a crop height value, a vegetative index value, a yield value, a weed value, a crop moisture value, and an other characteristic value, and generates a predictive map that predicts reel wrapping at different locations in the field, such as functional predictive reel wrapping map 1460.

Map generator 312 thus outputs a functional predictive reel wrapping map 1460 that is predictive of reel wrapping. Functional predictive reel wrapping map 1460 is a predictive map 264. The functional predictive reel wrapping map 1460, in one example, predicts reel wrapping at different locations in a field. The functional predictive reel wrapping map 1460 may be provided to control zone generator 313, control system 314, or both. Control zone generator 313 generates control zones and incorporates those control zones into the functional predictive reel wrapping map 1460 to produce a predictive control zone map 265, that is a functional predictive reel wrapping control zone map 1461.

One or both of functional predictive reel wrapping map 1460 and functional predictive reel wrapping control zone map 1461 may be provided to control system 314, which generates control signals to control one or more of the controllable subsystems 316 based upon the functional predictive reel wrapping map 1460, the functional predictive reel wrapping control zone map 1461, or both.

Reel carryover-to-crop height model generator 1431 identifies a relationship between reel carryover value(s) detected in in-situ sensor data 1440, at geographic location(s) to which the reel carryover value(s), detected in the in-situ sensor data 1440, correspond, and crop height value(s) from the crop height map 432 corresponding to the same geographic location(s) to which the detected reel carryover value(s) correspond. Based on this relationship established by reel carryover-to-crop height model generator 1431, reel carryover-to-crop height model generator 1431 generates a predictive reel carryover model. The predictive reel carryover model is used by reel carryover map generator 1454 to predict reel carryover at different locations in the field based upon the georeferenced crop height values contained in the crop height map 432 at the same locations in the field. Thus, for a given location in the field, a reel carryover value can be predicted at the given location based on the predictive reel carryover model and the crop height value, from the crop height map 432, at that given location.

Reel carryover-to-vegetative index model generator 1432 identifies a relationship between reel carryover value(s) detected in in-situ sensor data 1440, at geographic location(s) to which the reel carryover value(s), detected in the in-situ sensor data 1440, correspond, and vegetative index value(s) from the vegetative index map 433 corresponding to the same geographic location(s) to which the detected reel carryover value(s) correspond. Based on this relationship established by reel carryover-to-vegetative index model generator 1432, reel carryover-to-vegetative index model generator 1432 generates a predictive reel carryover model. The predictive reel carryover model is used by reel carryover map generator 1454 to predict reel carryover at different locations in the field based upon the georeferenced vegetative index values contained in the vegetative index map 433 at the same locations in the field. Thus, for a given location in the field, a reel carryover value can be predicted at the given location based on the predictive reel carryover model and the vegetative index value, from the vegetative index map 433, at that given location.

Reel carryover-to-yield model generator 1433 identifies a relationship between reel carryover value(s) detected in in-situ sensor data 1440, at geographic location(s) to which the reel carryover value(s), detected in the in-situ sensor data 1440, correspond, and yield value(s) from the yield map 434 corresponding to the same geographic location(s) to which the detected reel carryover value(s) correspond. Based on this relationship established by reel carryover-to-yield model generator 1433, reel carryover-to-yield model generator 1433 generates a predictive reel carryover model. The predictive reel carryover model is used by reel carryover map generator 1454 to predict reel carryover at different locations in the field based upon the georeferenced yield values contained in the yield map 434 at the same locations in the field. Thus, for a given location in the field, a reel carryover value can be predicted at the given location based on the predictive reel carryover model and the yield value, from the yield map 434, at that given location.

Reel carryover-to-weed model generator 1434 identifies a relationship between reel carryover value(s) detected in in-situ sensor data 1440, at geographic location(s) to which the reel carryover value(s), detected in the in-situ sensor data 1440, correspond, and weed value(s) from the weed map 435 corresponding to the same geographic location(s) to which the detected reel carryover value(s) correspond. Based on this relationship established by reel carryover-to-weed model generator 1434, reel carryover-to-weed model generator 1434 generates a predictive reel carryover model. The predictive reel carryover model is used by reel carryover map generator 1454 to predict reel carryover at different locations in the field based upon the georeferenced weed values contained in the weed map 435 at the same locations in the field. Thus, for a given location in the field, a reel carryover value can be predicted at the given location based on the predictive reel carryover model and the weed value, from the weed map 435, at that given location.

Reel carryover-to-crop moisture model generator 1435 identifies a relationship between reel carryover value(s) detected in in-situ sensor data 1440, at geographic location(s) to which the reel carryover value(s), detected in the in-situ sensor data 1440, correspond, and crop moisture value(s) from the crop moisture map 436 corresponding to the same geographic location(s) to which the detected reel carryover value(s) correspond. Based on this relationship established by reel carryover-to-crop moisture model generator 1435, reel carryover-to-crop moisture model generator 1435 generates a predictive reel carryover model. The predictive reel carryover model is used by reel carryover map generator 1454 to predict reel carryover at different locations in the field based upon the georeferenced crop moisture values contained in the crop moisture map 436 at the same locations in the field. Thus, for a given location in the field, a reel carryover value can be predicted at the given location based on the predictive reel carryover model and the crop moisture value, from the crop moisture map 436, at that given location.

Reel carryover-to-other characteristic model generator 1436 identifies a relationship between reel carryover value(s) detected in in-situ sensor data 1440, at geographic location(s) to which the reel carryover value(s), detected in the in-situ sensor data 1440, correspond, and other characteristic value(s) from an other map 439 corresponding to the same geographic location(s) to which the detected reel carryover value(s) correspond. Based on this relationship established by reel carryover-to-other characteristic model generator 1436, reel carryover-to-other characteristic model generator 1436 generates a predictive reel carryover model. The predictive reel carryover model is used by reel carryover map generator 1454 to predict reel carryover at different locations in the field based upon the georeferenced other characteristic values contained in the other map 439 at the same locations in the field. Thus, for a given location in the field, a reel carryover value can be predicted at the given location based on the predictive reel carryover model and the other characteristic value, from the other map 439, at that given location.

In light of the above, the predictive model generator 310 is operable to produce a plurality of predictive reel carryover models, such as one or more of the predictive reel carryover models generated by model generators 1431, 1432, 1433, 1434, 1435, 1436, and 1449. In another example, two or more of the predictive models described above may be combined into a single predictive reel carryover model, such as a predictive reel carryover model that predicts reel carryover based upon two or more of the crop height value, the vegetative index value, the yield value, the weed value, the crop moisture value, and the other characteristic value at different locations in the field. Any of these reel carryover models, or combinations thereof, are represented collectively by predictive reel carryover model 1451 in FIG. 4A.

The predictive reel carryover model 1451 is provided to predictive map generator 312. In the example of FIG. 4A, predictive map generator 312 includes reel carryover map generator 1454. In other examples, predictive map generator 312 may include additional or different map generators. Thus, in some examples, predictive map generator 312 may include other items 1458 which may include other types of map generators to generate other types of maps.

Reel carryover map generator 1454 receives one or more of the crop height map 432, the vegetative index map 433, the yield map 434, the weed map 435, the crop moisture map 436, and an other map 439, along with the predictive reel carryover model 1451 which predicts reel carryover based upon one or more of an a crop height value, a vegetative index value, a yield value, a weed value, a crop moisture value, and an other characteristic value, and generates a predictive map that predicts reel carryover at different locations in the field, such as functional predictive reel carryover map 1470.

Map generator 312 thus outputs a functional predictive reel carryover map 1470 that is predictive of reel carryover. Functional predictive reel carryover map 1470 is a predictive map 264. The functional predictive reel carryover map 1470, in one example, predicts reel carryover at different locations in a field. The functional predictive reel carryover map 1470 may be provided to control zone generator 313, control system 314, or both. Control zone generator 313 generates control zones and incorporates those control zones into the functional predictive reel carryover map 1470 to produce a predictive control zone map 265, that is a functional predictive reel carryover control zone map 1471.

One or both of functional predictive reel carryover map 1470 and functional predictive reel carryover control zone map 1471 may be provided to control system 314, which generates control signals to control one or more of the controllable subsystems 316 based upon the functional predictive reel carryover map 1470, the functional predictive reel carryover control zone map 1471, or both.

Reel tossing-to-crop height model generator 1441 identifies a relationship between reel tossing value(s) detected in in-situ sensor data 1440, at geographic location(s) to which the reel tossing value(s), detected in the in-situ sensor data 1440, correspond, and crop height value(s) from the crop height map 432 corresponding to the same geographic location(s) to which the detected reel tossing value(s) correspond. Based on this relationship established by reel tossing-to-crop height model generator 1441, reel tossing-to-crop height model generator 1441 generates a predictive reel tossing model. The predictive reel tossing model is used by reel tossing map generator 1455 to predict reel tossing at different locations in the field based upon the georeferenced crop height values contained in the crop height map 432 at the same locations in the field. Thus, for a given location in the field, a reel tossing value can be predicted at the given location based on the predictive reel tossing model and the crop height value, from the crop height map 432, at that given location.

Reel tossing-to-vegetative index model generator 1442 identifies a relationship between reel tossing value(s) detected in in-situ sensor data 1440, at geographic location(s) to which the reel tossing value(s), detected in the in-situ sensor data 1440, correspond, and vegetative index value(s) from the vegetative index map 433 corresponding to the same geographic location(s) to which the detected reel tossing value(s) correspond. Based on this relationship established by reel tossing-to-vegetative index model generator 1442, reel tossing-to-vegetative index model generator 1442 generates a predictive reel tossing model. The predictive reel tossing model is used by reel tossing map generator 1455 to predict reel tossing at different locations in the field based upon the georeferenced vegetative index values contained in the vegetative index map 433 at the same locations in the field. Thus, for a given location in the field, a reel tossing value can be predicted at the given location based on the predictive reel tossing model and the vegetative index value, from the vegetative index map 433, at that given location.

Reel tossing-to-yield model generator 1443 identifies a relationship between reel tossing value(s) detected in in-situ sensor data 1440, at geographic location(s) to which the reel tossing value(s), detected in the in-situ sensor data 1440, correspond, and yield value(s) from the yield map 434 corresponding to the same geographic location(s) to which the detected reel tossing value(s) correspond. Based on this relationship established by reel tossing-to-yield model generator 1443, reel tossing-to-yield model generator 1443 generates a predictive reel tossing model. The predictive reel tossing model is used by reel tossing map generator 1455 to predict reel tossing at different locations in the field based upon the georeferenced yield values contained in the yield map 434 at the same locations in the field. Thus, for a given location in the field, a reel tossing value can be predicted at the given location based on the predictive reel tossing model and the yield value, from the yield map 434, at that given location.

Reel tossing-to-weed model generator 1444 identifies a relationship between reel tossing value(s) detected in in-situ sensor data 1440, at geographic location(s) to which the reel tossing value(s), detected in the in-situ sensor data 1440, correspond, and weed value(s) from the weed map 435 corresponding to the same geographic location(s) to which the detected reel tossing value(s) correspond. Based on this relationship established by reel tossing-to-weed model generator 1444, reel tossing-to-weed model generator 1444 generates a predictive reel tossing model. The predictive reel tossing model is used by reel tossing map generator 1455 to predict reel tossing at different locations in the field based upon the georeferenced weed values contained in the weed map 435 at the same locations in the field. Thus, for a given location in the field, a reel tossing value can be predicted at the given location based on the predictive reel tossing model and the weed value, from the weed map 435, at that given location.

Reel tossing-to-crop moisture model generator 1445 identifies a relationship between reel tossing value(s) detected in in-situ sensor data 1440, at geographic location(s) to which the reel tossing value(s), detected in the in-situ sensor data 1440, correspond, and crop moisture value(s) from the crop moisture map 436 corresponding to the same geographic location(s) to which the detected reel tossing value(s) correspond. Based on this relationship established by reel tossing-to-crop moisture model generator 1445, reel tossing-to-crop moisture model generator 1445 generates a predictive reel tossing model. The predictive reel tossing model is used by reel tossing map generator 1455 to predict reel tossing at different locations in the field based upon the georeferenced crop moisture values contained in the crop moisture map 436 at the same locations in the field. Thus, for a given location in the field, a reel tossing value can be predicted at the given location based on the predictive reel tossing model and the crop moisture value, from the crop moisture map 436, at that given location.

Reel tossing-to-other characteristic model generator 1446 identifies a relationship between reel tossing value(s) detected in in-situ sensor data 1440, at geographic location(s) to which the reel tossing value(s), detected in the in-situ sensor data 1440, correspond, and other characteristic value(s) from an other map 439 corresponding to the same geographic location(s) to which the detected reel tossing value(s) correspond. Based on this relationship established by reel tossing-to-other characteristic model generator 1446, reel tossing-to-other characteristic model generator 1446 generates a predictive reel tossing model. The predictive reel tossing model is used by reel tossing map generator 1455 to predict reel tossing at different locations in the field based upon the georeferenced other characteristic values contained in the other map 439 at the same locations in the field. Thus, for a given location in the field, a reel tossing value can be predicted at the given location based on the predictive reel tossing model and the other characteristic value, from the other map 439, at that given location.

In light of the above, the predictive model generator 310 is operable to produce a plurality of predictive reel tossing models, such as one or more of the predictive reel tossing models generated by model generators 1441, 1442, 1443, 1444, 1445, 1446, and 1449. In another example, two or more of the predictive models described above may be combined into a single predictive reel tossing model, such as a predictive reel tossing model that predicts reel tossing based upon two or more of the crop height value, the vegetative index value, the yield value, the weed value, the crop moisture value, and the other characteristic value at different locations in the field. Any of these reel tossing models, or combinations thereof, are represented collectively by predictive reel tossing model 1452 in FIG. 4A.

The predictive reel tossing model 1452 is provided to predictive map generator 312. In the example of FIG. 4A, predictive map generator 312 includes reel tossing map generator 1455. In other examples, predictive map generator 312 may include additional or different map generators. Thus, in some examples, predictive map generator 312 may include other items 1458 which may include other types of map generators to generate other types of maps.

Reel tossing map generator 1455 receives one or more of the crop height map 432, the vegetative index map 433, the yield map 434, the weed map 435, the crop moisture map 436, and an other map 439, along with the predictive reel tossing model 1452 which predicts reel tossing based upon one or more of an a crop height value, a vegetative index value, a yield value, a weed value, a crop moisture value, and an other characteristic value, and generates a predictive map that predicts reel tossing at different locations in the field, such as functional predictive reel tossing map 1480.

Map generator 312 thus outputs a functional predictive reel tossing map 1480 that is predictive of reel tossing. Functional predictive reel tossing map 1480 is a predictive map 264. The functional predictive reel tossing map 1480, in one example, predicts reel tossing at different locations in a field. The functional predictive reel tossing map 1480 may be provided to control zone generator 313, control system 314, or both. Control zone generator 313 generates control zones and incorporates those control zones into the functional predictive reel tossing map 1480 to produce a predictive control zone map 265, that is a functional predictive reel tossing control zone map 1481.

One or both of functional predictive reel tossing map 1480 and functional predictive reel tossing control zone map 1481 may be provided to control system 314, which generates control signals to control one or more of the controllable subsystems 316 based upon the functional predictive reel tossing map 1480, the functional predictive reel tossing control zone map 1481, or both.

FIG. 4B shows, among other things, examples of the predictive model generator 310 and the predictive map generator 312 in more detail. FIG. 4B also illustrates information flow among the various components shown. The predictive model generator 310 receives one or more of a crop height map 432, a vegetative index map 433, a yield map 434, a weed map 435, a crop moisture map 436, and other map(s) 439. Predictive model generator 310 also receives a geographic location 4414, or an indication of a geographic location, such as from geographic position sensors 304. Geographic location 4414 illustratively represents the geographic location of a value detected by in-situ sensors 308. In some examples, the geographic position of the agricultural harvester 100, as detected by geographic position sensors 304, will not be the same as the geographic position on the field to which a value detected by in-situ sensors 308 corresponds. For example, reel tossing sensors 386 may detect carryover of crop by detecting crop material on the field behind agricultural harvester 100. Thus, the geographic position of agricultural harvester 100 at the time the reel tossing is detected may not be the geographic location of the reel tossing. It will be appreciated, that the geographic position indicated by geographic position sensor 304, along with timing, machine speed and heading, machine dimensions, and sensor position (e.g., relative to geographic position sensor), sensor parameters (e.g., field of view), can be used to derive a geographic location at the field to which a value a detected by an in-situ sensor 308 corresponds.

In-situ sensors 308 illustratively reel wrapping sensors 382, reel carryover sensors 384, reel tossing sensors 386, reel parameter sensors 370, as well as processing system 338. In some examples, processing system 338 is separate from in-situ sensors 308 (such as the example shown in FIG. 2). In some instances, one or more of reel wrapping sensors 382, reel carryover sensors 384, reel tossing sensors 386, and reel parameter sensors 370 may be located on-board agricultural harvester 100. The processing system 338 processes sensor data generated from reel wrapping sensors 382, reel carryover sensors 384, and reel tossing sensors 386 to generate processed sensor data 1440 indicative of reel wrapping values, reel carryover values, and reel tossing values, respectively. The processing system 338 processes sensor data generated from reel parameter sensors 370 to generate processed sensor data 3440 indicative of reel parameter values, such as one or more of reel speed values, reel height values, reel fore-to-aft position values, and reel finger position values.

As shown in FIG. 4B, the example predictive model generator 310 includes a reel wrapping-to-crop height and reel parameter(s) (RP(S)) model generator 4421, a reel wrapping-to-vegetative index and reel parameter(s) model generator 4422, a reel wrapping-to-yield and reel parameter(s) model generator 4423, a reel wrapping-to-weed and reel parameter(s) model generator 4424, a reel wrapping-to-crop moisture and reel parameter(s) model generator 4425, a reel wrapping-to-other characteristic and reel parameter(s) model generator 4426, a reel carryover-to-crop height and reel parameter(s) model generator 4431, a reel carryover-to-vegetative index and reel parameter(s) model generator 4432, a reel carryover-to-yield and reel parameter(s) model generator 4433, a reel carryover-to-weed and reel parameter(s) model generator 4434, a reel carryover-to-crop moisture and reel parameter(s) model generator 4435, a reel carryover-to-other characteristic and reel parameter(s) model generator 4436, a reel tossing-to-crop height and reel parameter(s) model generator 4441, a reel tossing-to-vegetative index and reel parameter(s) model generator 4442, a reel tossing-to-yield and reel parameter(s) model generator 4443, a reel tossing-to-weed and reel parameter(s) model generator 4444, a reel tossing-to-crop moisture and reel parameter(s) model generator 4445, and a reel tossing-to-other characteristic and reel parameter(s) model generator 4446. In other examples, the predictive model generator 310 may include additional, fewer, or different components than those shown in the example of FIG. 4B. Consequently, in some examples, the predictive model generator 310 may include other items 1449 as well, which may include other types of predictive model generators to generate other types of models.

Reel wrapping-to-crop height and reel parameter(s) model generator 4421 identifies a relationship between reel wrapping value(s) detected in in-situ sensor data 4440, at geographic location(s) to which the reel wrapping value(s), detected in the in-situ sensor data 4440, correspond, and crop height value(s) from the crop height map 432 corresponding to the same geographic location(s) to which the detected reel wrapping value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel wrapping value(s) correspond. Based on this relationship established by reel wrapping-to-crop height and reel parameter(s) model generator 4421, reel wrapping-to-crop height and reel parameter(s) model generator 4421 generates a predictive reel wrapping model. The predictive reel wrapping model is used by reel wrapping map generator 1453 to predict reel wrapping at different locations in the field based upon the georeferenced crop height values contained in the crop height map 432 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel wrapping. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel wrapping value can be predicted at the given location based on the predictive reel wrapping model, the crop height value, from the crop height map 432, at that given location, and the reel parameter value(s) (e.g., one or more of an expected reel speed value, an expected reel height value, an expected reel fore-to-aft position value, and an expected reel finger position value) corresponding to that given location.

Reel wrapping-to-vegetative index and reel parameter(s) model generator 4422 identifies a relationship between reel wrapping value(s) detected in in-situ sensor data 4440, at geographic location(s) to which the reel wrapping value(s), detected in the in-situ sensor data 4440, correspond, and vegetative index value(s) from the vegetative index map 433 corresponding to the same geographic location(s) to which the detected reel wrapping value(s) correspond, and value(s) of one or more reel parameters (e.g., one or more of reel speed value(s), reel height value(s), reel fore-to-aft position value(s), and reel finger position value(s), and reel finger position value(s)) detected in in-situ sensor data 4440 corresponding to the same geographic location(s) to which the detected reel wrapping value(s) correspond. Based on this relationship established by reel wrapping-to-vegetative index and reel parameter(s) model generator 4422, reel wrapping-to-vegetative index and reel parameter(s) model generator 4422 generates a predictive reel wrapping model. The predictive reel wrapping model is used by reel wrapping map generator 1453 to predict reel wrapping at different locations in the field based upon the georeferenced vegetative index values contained in the vegetative index map 433 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel wrapping. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel wrapping value can be predicted at the given location based on the predictive reel wrapping model, the vegetative index value, from the vegetative index map 433, at that given location, and the reel parameter value(s) (e.g., one or more of an expected reel speed value, an expected reel height value, an expected reel fore-to-aft position value, and an expected reel finger position value) corresponding to that given location.

Reel wrapping-to-yield and reel parameter(s) model generator 4423 identifies a relationship between reel wrapping value(s) detected in in-situ sensor data 4440, at geographic location(s) to which the reel wrapping value(s), detected in the in-situ sensor data 4440, correspond, and yield value(s) from the yield map 434 corresponding to the same geographic location(s) to which the detected reel wrapping value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel wrapping value(s) correspond. Based on this relationship established by reel wrapping-to-yield and reel parameter(s) model generator 4423, reel wrapping-to-yield and reel parameter(s) model generator 4423 generates a predictive reel wrapping model. The predictive reel wrapping model is used by reel wrapping map generator 1453 to predict reel wrapping at different locations in the field based upon the georeferenced yield values contained in the yield map 434 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel wrapping. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel wrapping value can be predicted at the given location based on the predictive reel wrapping model, the yield value, from the yield map 434, at that given location, and the reel parameter value(s) (e.g., one or more of an expected reel speed value, an expected reel height value, an expected reel fore-to-aft position value, and an expected reel finger position value) corresponding to that given location.

Reel wrapping-to-weed and reel parameter(s) model generator 4424 identifies a relationship between reel wrapping value(s) detected in in-situ sensor data 4440, at geographic location(s) to which the reel wrapping value(s), detected in the in-situ sensor data 4440, correspond, and weed value(s) from the weed map 435 corresponding to the same geographic location(s) to which the detected reel wrapping value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel wrapping value(s) correspond. Based on this relationship established by reel wrapping-to-weed and reel parameter(s) model generator 4424, reel wrapping-to-weed and reel parameter(s) model generator 4424 generates a predictive reel wrapping model. The predictive reel wrapping model is used by reel wrapping map generator 1453 to predict reel wrapping at different locations in the field based upon the georeferenced weed values contained in the weed map 435 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel wrapping. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel wrapping value can be predicted at the given location based on the predictive reel wrapping model, the weed value, from the weed map 435, at that given location, and the reel parameter value(s) (e.g., one or more of an expected reel speed value, an expected reel height value, an expected reel fore-to-aft position value, and an expected reel finger position value) corresponding to that given location.

Reel wrapping-to-crop moisture and reel parameter(s) model generator 4425 identifies a relationship between reel wrapping value(s) detected in in-situ sensor data 4440, at geographic location(s) to which the reel wrapping value(s), detected in the in-situ sensor data 4440, correspond, and crop moisture value(s) from the crop moisture map 436 corresponding to the same geographic location(s) to which the detected reel wrapping value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel wrapping value(s) correspond. Based on this relationship established by reel wrapping-to-crop moisture and reel parameter(s) model generator 4425, reel wrapping-to-crop moisture and reel parameter(s) model generator 4425 generates a predictive reel wrapping model. The predictive reel wrapping model is used by reel wrapping map generator 1453 to predict reel wrapping at different locations in the field based upon the georeferenced crop moisture values contained in the crop moisture map 436 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel wrapping. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel wrapping value can be predicted at the given location based on the predictive reel wrapping model, the crop moisture value, from the crop moisture map 436, at that given location, and the reel parameter value(s) (e.g., one or more of an expected reel speed value, an expected reel height value, an expected reel fore-to-aft position value, and an expected reel finger position value) corresponding to that given location.

Reel wrapping-to-other characteristic and reel parameter(s) model generator 4426 identifies a relationship between reel wrapping value(s) detected in in-situ sensor data 4440, at geographic location(s) to which the reel wrapping value(s), detected in the in-situ sensor data 4440, correspond, and other characteristic value(s) from an other map 439 corresponding to the same geographic location(s) to which the detected reel wrapping value(s) correspond, and value(s) of one or more reel parameters (e.g., one or more of reel speed value(s), reel height value(s), reel fore-to-aft position value(s), and reel finger position value(s0) detected in in-situ sensor data 4440 corresponding to the same geographic location(s) to which the detected reel wrapping value(s) correspond. Based on this relationship established by reel wrapping-to-other characteristic and reel parameter(s) model generator 4426, reel wrapping-to-other characteristic and reel parameter(s) model generator 4426 generates a predictive reel wrapping model. The predictive reel wrapping model is used by reel wrapping map generator 1453 to predict reel wrapping at different locations in the field based upon the georeferenced other characteristic values contained in the other map 439 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel wrapping. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel wrapping value can be predicted at the given location based on the predictive reel wrapping model, the other characteristic value, from the other map 439, at that given location, and the reel parameter value(s) (e.g., one or more of an expected reel speed value, an expected reel height value, an expected reel fore-to-aft position value, and an expected reel finger position value) corresponding to that given location.

In light of the above, the predictive model generator 310 is operable to produce a plurality of predictive reel wrapping models, such as one or more of the predictive reel wrapping models generated by model generators 4421, 4422, 4423, 4424, 4425, 4426, and 1449. In another example, two or more of the predictive models described above may be combined into a single predictive reel wrapping model, such as a predictive reel wrapping model that predicts reel wrapping based upon two or more of the crop height value and a value of one or more reel parameters, the vegetative index value and a value of one or more reel parameters, the yield value and a value of one or more reel parameters, the weed value and a value of one or more reel parameters, the crop moisture value and a value of one or more reel parameters, and the other characteristic value and a value of one or more reel parameters corresponding different locations in the field. Any of these reel wrapping models, or combinations thereof, are represented collectively by predictive reel wrapping model 4450 in FIG. 4B.

The predictive reel wrapping model 4450 is provided to predictive map generator 312. In the example of FIG. 4B, predictive map generator 312 includes reel wrapping map generator 1453. In other examples, predictive map generator 312 may include additional or different map generators. Thus, in some examples, predictive map generator 312 may include other items 1458 which may include other types of map generators to generate other types of maps.

Reel wrapping map generator 1453 receives one or more of the crop height map 432, the vegetative index map 433, the yield map 434, the weed map 435, the crop moisture map 436, and an other map 439, value(s) of one or more reel parameters, along with the predictive reel wrapping model 4450 which predicts reel wrapping based upon one or more of a crop height value and a value of one or more reel parameters, a vegetative index value and a value of one or more reel parameters, a yield value and a value of one or more reel parameters, a weed value and a value of one or more reel parameters, a crop moisture value and a value of one or more reel parameters, and an other characteristic value and a value of one or more reel parameters, and generates a predictive map that predicts reel wrapping at different locations in the field, such as functional predictive reel wrapping map 4460.

Map generator 312 thus outputs a functional predictive reel wrapping map 4460 that is predictive of reel wrapping. Functional predictive reel wrapping map 4460 is a predictive map 264. The functional predictive reel wrapping map 4460, in one example, predicts reel wrapping at different locations in a field. The functional predictive reel wrapping map 4460 may be provided to control zone generator 313, control system 314, or both. Control zone generator 313 generates control zones and incorporates those control zones into the functional predictive reel wrapping map 4460 to produce a predictive control zone map 265, that is a functional predictive reel wrapping control zone map 4461.

One or both of functional predictive reel wrapping map 4460 and functional predictive reel wrapping control zone map 4461 may be provided to control system 314, which generates control signals to control one or more of the controllable subsystems 316 based upon the functional predictive reel wrapping map 4460, the functional predictive reel wrapping control zone map 4461, or both.

Reel carryover-to-crop height and reel parameter(s) model generator 4431 identifies a relationship between reel carryover value(s) detected in in-situ sensor data 4440, at geographic location(s) to which the reel carryover value(s), detected in the in-situ sensor data 4440, correspond, and crop height value(s) from the crop height map 432 corresponding to the same geographic location(s) to which the detected reel carryover value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel carryover value(s) correspond. Based on this relationship established by reel carryover-to-crop height and reel parameter(s) model generator 4431, reel carryover-to-crop height and reel parameter(s) model generator 4431 generates a predictive reel carryover model. The predictive reel carryover model is used by reel carryover map generator 1454 to predict reel carryover at different locations in the field based upon the georeferenced crop height values contained in the crop height map 432 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel carryover. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel carryover value can be predicted at the given location based on the predictive reel carryover model, the crop height value, from the crop height map 432, at that given location, and the reel parameter value(s) (e.g., one or more of an expected reel speed value, an expected reel height value, an expected reel fore-to-aft position value, and an expected reel finger position value) corresponding to that given location.

Reel carryover-to-vegetative index and reel parameter(s) model generator 4432 identifies a relationship between reel carryover value(s) detected in in-situ sensor data 4440, at geographic location(s) to which the reel carryover value(s), detected in the in-situ sensor data 4440, correspond, and vegetative index value(s) from the vegetative index map 433 corresponding to the same geographic location(s) to which the detected reel carryover value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel carryover value(s) correspond. Based on this relationship established by reel carryover-to-vegetative index and reel parameter(s) model generator 4432, reel carryover-to-vegetative index and reel parameter(s) model generator 4432 generates a predictive reel carryover model. The predictive reel carryover model is used by reel carryover map generator 1454 to predict reel carryover at different locations in the field based upon the georeferenced vegetative index values contained in the vegetative index map 433 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel carryover. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel carryover value can be predicted at the given location based on the predictive reel carryover model, the vegetative index value, from the vegetative index map 433, at that given location, and the reel parameter value(s) (e.g., one or more of an expected reel speed value, an expected reel height value, an expected reel fore-to-aft position value, and an expected reel finger position value) corresponding to that given location.

Reel carryover-to-yield and reel parameter(s) model generator 4433 identifies a relationship between reel carryover value(s) detected in in-situ sensor data 4440, at geographic location(s) to which the reel carryover value(s), detected in the in-situ sensor data 4440, correspond, and yield value(s) from the yield map 434 corresponding to the same geographic location(s) to which the detected reel carryover value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel carryover value(s) correspond. Based on this relationship established by reel carryover-to-yield and reel parameter(s) model generator 4433, reel carryover-to-yield and reel parameter(s) model generator 4433 generates a predictive reel carryover model. The predictive reel carryover model is used by reel carryover map generator 1454 to predict reel carryover at different locations in the field based upon the georeferenced yield values contained in the yield map 434 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors and provided to map generator 312 as an input (along with the mapped values) to predict reel carryover. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel carryover value can be predicted at the given location based on the predictive reel carryover model, the yield value, from the yield map 434, at that given location, and the reel parameter value(s) (e.g., one or more of an expected reel speed value, an expected reel height value, an expected reel fore-to-aft position value, and an expected reel finger position value) corresponding to that given location.

Reel carryover-to-weed and reel parameter(s) model generator 4434 identifies a relationship between reel carryover value(s) detected in in-situ sensor data 4440, at geographic location(s) to which the reel carryover value(s), detected in the in-situ sensor data 4440, correspond, and weed value(s) from the weed map 435 corresponding to the same geographic location(s) to which the detected reel carryover value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel carryover value(s) correspond. Based on this relationship established by reel carryover-to-weed and reel parameter(s) model generator 4434, reel carryover-to-weed and reel parameter(s) model generator 4434 generates a predictive reel carryover model. The predictive reel carryover model is used by reel carryover map generator 1454 to predict reel carryover at different locations in the field based upon the georeferenced weed values contained in the weed map 435 at the same locations in the field and the reel parameter values (e.g., one or more of the reel speed values, the reel height values, the reel fore-to-aft position values, and the reel finger position value(s)) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel carryover. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel carryover value can be predicted at the given location based on the predictive reel carryover model, the weed value, from the weed map 435, at that given location, and the reel parameter value(s) (e.g., one or more of an expected reel speed value, an expected reel height value, an expected reel fore-to-aft position value, and an expected reel finger position value) corresponding to that given location.

Reel carryover-to-crop moisture and reel parameter(s) model generator 4435 identifies a relationship between reel carryover value(s) detected in in-situ sensor data 4440, at geographic location(s) to which the reel carryover value(s), detected in the in-situ sensor data 4440, correspond, and crop moisture value(s) from the crop moisture map 436 corresponding to the same geographic location(s) to which the detected reel carryover value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel carryover value(s) correspond. Based on this relationship established by reel carryover-to-crop moisture and reel parameter(s) model generator 4435, reel carryover-to-crop moisture and reel parameter(s) model generator 4435 generates a predictive reel carryover model. The predictive reel carryover model is used by reel carryover map generator 1454 to predict reel carryover at different locations in the field based upon the georeferenced crop moisture values contained in the crop moisture 436 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel carryover. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel carryover value can be predicted at the given location based on the predictive reel carryover model, the crop moisture value, from the crop moisture map 436, at that given location, and the reel parameter value(s) (e.g., one or more of an expected reel speed value, an expected reel height value, an expected reel fore-to-aft position value, and an expected reel finger position value) corresponding to that given location.

Reel carryover-to-other characteristic and reel parameter(s) model generator 4436 identifies a relationship between reel carryover value(s) detected in in-situ sensor data 4440, at geographic location(s) to which the reel carryover value(s), detected in the in-situ sensor data 4440, correspond, and other characteristic value(s) from an other map 439 corresponding to the same geographic location(s) to which the detected reel carryover value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel carryover value(s) correspond. Based on this relationship established by reel carryover-to-other characteristic and reel parameter(s) model generator 4436, reel carryover-to-other characteristic and reel parameter(s) model generator 4436 generates a predictive reel carryover model. The predictive reel carryover model is used by reel carryover map generator 1454 to predict reel carryover at different locations in the field based upon the georeferenced other characteristic values contained in the other map 439 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel carryover. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel carryover value can be predicted at the given location based on the predictive reel carryover model, the other characteristic value, from the other map 439, at that given location, and the reel parameter value(s) (e.g., one or more of an expected reel speed value, an expected reel height value, an expected reel fore-to-aft position value, and an expected reel finger position value) corresponding to that given location.

In light of the above, the predictive model generator 310 is operable to produce a plurality of predictive reel carryover models, such as one or more of the predictive reel carryover models generated by model generators 4431, 4432, 4433, 4434, 4435, 4436, and 1449. In another example, two or more of the predictive models described above may be combined into a single predictive reel carryover model, such as a predictive reel carryover model that predicts reel carryover based upon two or more of the crop height value and a value of one or more reel parameters, the vegetative index value and a value of one or more reel parameters, the yield value and a value of one or more reel parameters, the weed value and a value of one or more reel parameters, the crop moisture value and a value of one or more reel parameters, and the other characteristic value and a value of one or more reel parameters corresponding different locations in the field. Any of these reel carryover models, or combinations thereof, are represented collectively by predictive reel carryover model 4451 in FIG. 4B.

The predictive reel carryover model 4451 is provided to predictive map generator 312. In the example of FIG. 4B, predictive map generator 312 includes reel carryover map generator 1454. In other examples, predictive map generator 312 may include additional or different map generators. Thus, in some examples, predictive map generator 312 may include other items 1458 which may include other types of map generators to generate other types of maps.

Reel carryover map generator 1454 receives one or more of the crop height map 432, the vegetative index map 433, the yield map 434, the weed map 435, the crop moisture map 436, and an other map 439, value(s) of one or more reel parameters, along with the predictive reel carryover model 4451 which predicts reel carryover based upon one or more of a crop height value and a value of one or more reel parameters, a vegetative index value and a value of one or more reel parameters, a yield value and a value of one or more reel parameters, a weed value and a value of one or more reel parameters, a crop moisture value and a value of one or more reel parameters, and an other characteristic value and a value of one or more reel parameters, and generates a predictive map that predicts reel carryover at different locations in the field, such as functional predictive reel carryover map 4470.

Map generator 312 thus outputs a functional predictive reel carryover map 4470 that is predictive of reel carryover. Functional predictive reel carryover map 4470 is a predictive map 264. The functional predictive reel carryover map 4470, in one example, predicts reel carryover at different locations in a field. The functional predictive reel carryover map 4470 may be provided to control zone generator 313, control system 314, or both. Control zone generator 313 generates control zones and incorporates those control zones into the functional predictive reel carryover map 4470 to produce a predictive control zone map 265, that is a functional predictive reel carryover control zone map 4471.

One or both of functional predictive reel carryover map 4470 and functional predictive reel carryover control zone map 4471 may be provided to control system 314, which generates control signals to control one or more of the controllable subsystems 316 based upon the functional predictive reel carryover map 4470, the functional predictive reel wrapping control zone map 4471, or both.

Reel tossing-to-crop height and reel parameter(s) model generator 4441 identifies a relationship between reel tossing value(s) detected in in-situ sensor data 4440, at geographic location(s) to which the reel tossing value(s), detected in the in-situ sensor data 4440, correspond, and crop height value(s) from the crop height map 432 corresponding to the same geographic location(s) to which the detected reel tossing value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel tossing value(s) correspond. Based on this relationship established by reel tossing-to-crop height and reel parameter(s) model generator 4441, reel tossing-to-crop height and reel parameter(s) model generator 4441 generates a predictive reel tossing model. The predictive reel tossing model is used by reel tossing map generator 1455 to predict reel tossing at different locations in the field based upon the georeferenced crop height values contained in the crop height map 432 at the same locations in the field and the reel parameter values (e.g., one or more of the reel speed values, the reel height values, the reel fore-to-aft position values, and the reel finger position value(s)) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel tossing. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel tossing value can be predicted at the given location based on the predictive reel tossing model, the crop height value, from the crop height map 432, at that given location, and the reel parameter value(s) (e.g., one or more of an expected reel speed value, an expected reel height value, an expected reel fore-to-aft position value, and an expected reel finger position value) corresponding to that given location.

Reel tossing-to-vegetative index and reel parameter(s) model generator 4442 identifies a relationship between reel tossing value(s) detected in in-situ sensor data 4440, at geographic location(s) to which the reel tossing value(s), detected in the in-situ sensor data 4440, correspond, and vegetative index value(s) from the vegetative index map 433 corresponding to the same geographic location(s) to which the detected reel tossing value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel tossing value(s) correspond. Based on this relationship established by reel tossing-to-vegetative index and reel parameter(s) model generator 4442, reel tossing-to-vegetative index and reel parameter(s) model generator 4442 generates a predictive reel tossing model. The predictive reel tossing model is used by reel tossing map generator 1455 to predict reel tossing at different locations in the field based upon the georeferenced vegetative index values contained in the vegetative index map 433 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel tossing. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel tossing value can be predicted at the given location based on the predictive reel tossing model, the vegetative index value, from the vegetative index map 433, at that given location, and the reel parameter value(s) (e.g., one or more of an expected reel speed value, an expected reel height value, an expected reel fore-to-aft position value, and an expected reel finger position value) corresponding to that given location.

Reel tossing-to-yield and reel parameter(s) model generator 4443 identifies a relationship between reel tossing value(s) detected in in-situ sensor data 4440, at geographic location(s) to which the reel tossing value(s), detected in the in-situ sensor data 4440, correspond, and yield value(s) from the yield map 434 corresponding to the same geographic location(s) to which the detected reel tossing value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel tossing value(s) correspond. Based on this relationship established by reel tossing-to-yield and reel parameter(s) model generator 4443, reel tossing-to-yield and reel parameter(s) model generator 4443 generates a predictive reel tossing model. The predictive reel tossing model is used by reel tossing map generator 1455 to predict reel tossing at different locations in the field based upon the georeferenced yield values contained in the yield map 434 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel tossing. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel tossing value can be predicted at the given location based on the predictive reel tossing model, the yield value, from the yield map 434, at that given location, and the reel parameter value(s) (e.g., one or more of an expected reel speed value, an expected reel height value, an expected reel fore-to-aft position value, and an expected reel finger position value) corresponding to that given location.

Reel tossing-to-weed and reel parameter(s) model generator 4444 identifies a relationship between reel tossing value(s) detected in in-situ sensor data 4440, at geographic location(s) to which the reel tossing value(s), detected in the in-situ sensor data 4440, correspond, and weed value(s) from the weed map 435 corresponding to the same geographic location(s) to which the detected reel tossing value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel tossing value(s) correspond. Based on this relationship established by reel tossing-to-weed and reel parameter(s) model generator 4444, reel tossing-to-weed and reel parameter(s) model generator 4444 generates a predictive reel tossing model. The predictive reel tossing model is used by reel tossing map generator 1455 to predict reel tossing at different locations in the field based upon the georeferenced weed values contained in the weed map 435 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel tossing. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel tossing value can be predicted at the given location based on the predictive reel tossing model, the weed value, from the weed map 435, at that given location, and the reel parameter value(s) (e.g., one or more of an expected reel speed value, an expected reel height value, an expected reel fore-to-aft position value, and an expected reel finger position value) corresponding to that given location.

Reel tossing-to-crop moisture and reel parameter(s) model generator 4445 identifies a relationship between reel tossing value(s) detected in in-situ sensor data 4440, at geographic location(s) to which the reel tossing value(s), detected in the in-situ sensor data 4440, correspond, and crop moisture value(s) from the crop moisture map 436 corresponding to the same geographic location(s) to which the detected reel tossing value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel tossing value(s) correspond. Based on this relationship established by reel tossing-to-crop moisture and reel parameter(s) model generator 4435, reel tossing-to-crop moisture and reel parameter(s) model generator 4445 generates a predictive reel tossing model. The predictive reel tossing model is used by reel tossing map generator 1455 to predict reel tossing at different locations in the field based upon the georeferenced crop moisture values contained in the crop moisture 436 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel tossing. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel tossing value can be predicted at the given location based on the predictive reel tossing model, the crop moisture value, from the crop moisture map 436, at that given location, and the reel parameter value(s) (e.g., one or more of an expected reel speed value, an expected reel height value, an expected reel fore-to-aft position value, and an expected reel finger position value) corresponding to that given location.

Reel tossing-to-other characteristic and reel parameter(s) model generator 4446 identifies a relationship between reel tossing value(s) detected in in-situ sensor data 4440, at geographic location(s) to which the reel tossing value(s), detected in the in-situ sensor data 4440, correspond, and other characteristic value(s) from an other map 439 corresponding to the same geographic location(s) to which the detected reel tossing value(s) correspond, and value(s) of one or more reel parameters (e.g., one or more of reel speed value(s), reel height value(s), reel fore-to-aft position value(s), and reel finger position value(s)) detected in in-situ sensor data 4440 corresponding to the same geographic location(s) to which the detected reel tossing value(s) correspond. Based on this relationship established by reel tossing-to-other characteristic and reel parameter(s) model generator 4446, reel tossing-to-other characteristic and reel parameter(s) model generator 4446 generates a predictive reel tossing model. The predictive reel tossing model is used by reel tossing map generator 1455 to predict reel tossing at different locations in the field based upon the georeferenced other characteristic values contained in the other map 439 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict reel tossing. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a reel tossing value can be predicted at the given location based on the predictive reel tossing model, the other characteristic value, from the other map 439, at that given location, and the reel parameter value(s) (e.g., one or more of an expected reel speed value, an expected reel height value, an expected reel fore-to-aft position value, and an expected reel finger position value) corresponding to that given location.

In light of the above, the predictive model generator 310 is operable to produce a plurality of predictive reel tossing models, such as one or more of the predictive reel tossing models generated by model generators 4441, 4442, 4443, 4444, 4445, 4446, and 1449. In another example, two or more of the predictive models described above may be combined into a single predictive reel tossing model, such as a predictive reel tossing model that predicts reel tossing based upon two or more of the crop height value and a value of one or more reel parameters, the vegetative index value and a value of one or more reel parameters, the yield value and a value of one or more reel parameters, the weed value and a value of one or more reel parameters, the crop moisture value and a value of one or more reel parameters, and the other characteristic value and a value of one or more reel parameters corresponding different locations in the field. Any of these reel tossing models, or combinations thereof, are represented collectively by predictive reel tossing model 4452 in FIG. 4B.

The predictive reel tossing model 4452 is provided to predictive map generator 312. In the example of FIG. 4B, predictive map generator 312 includes reel tossing map generator 1455. In other examples, predictive map generator 312 may include additional or different map generators. Thus, in some examples, predictive map generator 312 may include other items 1458 which may include other types of map generators to generate other types of maps.

Reel tossing map generator 1455 receives one or more of the crop height map 432, the vegetative index map 433, the yield map 434, the weed map 435, the crop moisture map 436, and an other map 439, value(s) of one or more reel parameters, along with the predictive reel tossing model 4452 which predicts reel tossing based upon one or more of a crop height value and a value of one or more reel parameters, a vegetative index value and a value of one or more reel parameters, a yield value and a value of one or more reel parameters, a weed value and a value of one or more reel parameters, a crop moisture value and a value of one or more reel parameters, and an other characteristic value and a value of one or more reel parameters, and generates a predictive map that predicts reel tossing at different locations in the field, such as functional predictive reel carryover map 4480.

Map generator 312 thus outputs a functional predictive reel tossing map 4480 that is predictive of reel tossing. Functional predictive reel tossing map 4480 is a predictive map 264. The functional predictive reel tossing map 4480, in one example, predicts reel tossing at different locations in a field. The functional predictive reel tossing map 4480 may be provided to control zone generator 313, control system 314, or both. Control zone generator 313 generates control zones and incorporates those control zones into the functional predictive reel tossing map 4480 to produce a predictive control zone map 265, that is a functional predictive reel tossing control zone map 4481.

One or both of functional predictive reel tossing map 4480 and functional predictive reel tossing control zone map 4481 may be provided to control system 314, which generates control signals to control one or more of the controllable subsystems 316 based upon the functional predictive reel tossing map 4480, the functional predictive reel tossing control zone map 4481, or both.

Figure 5A:
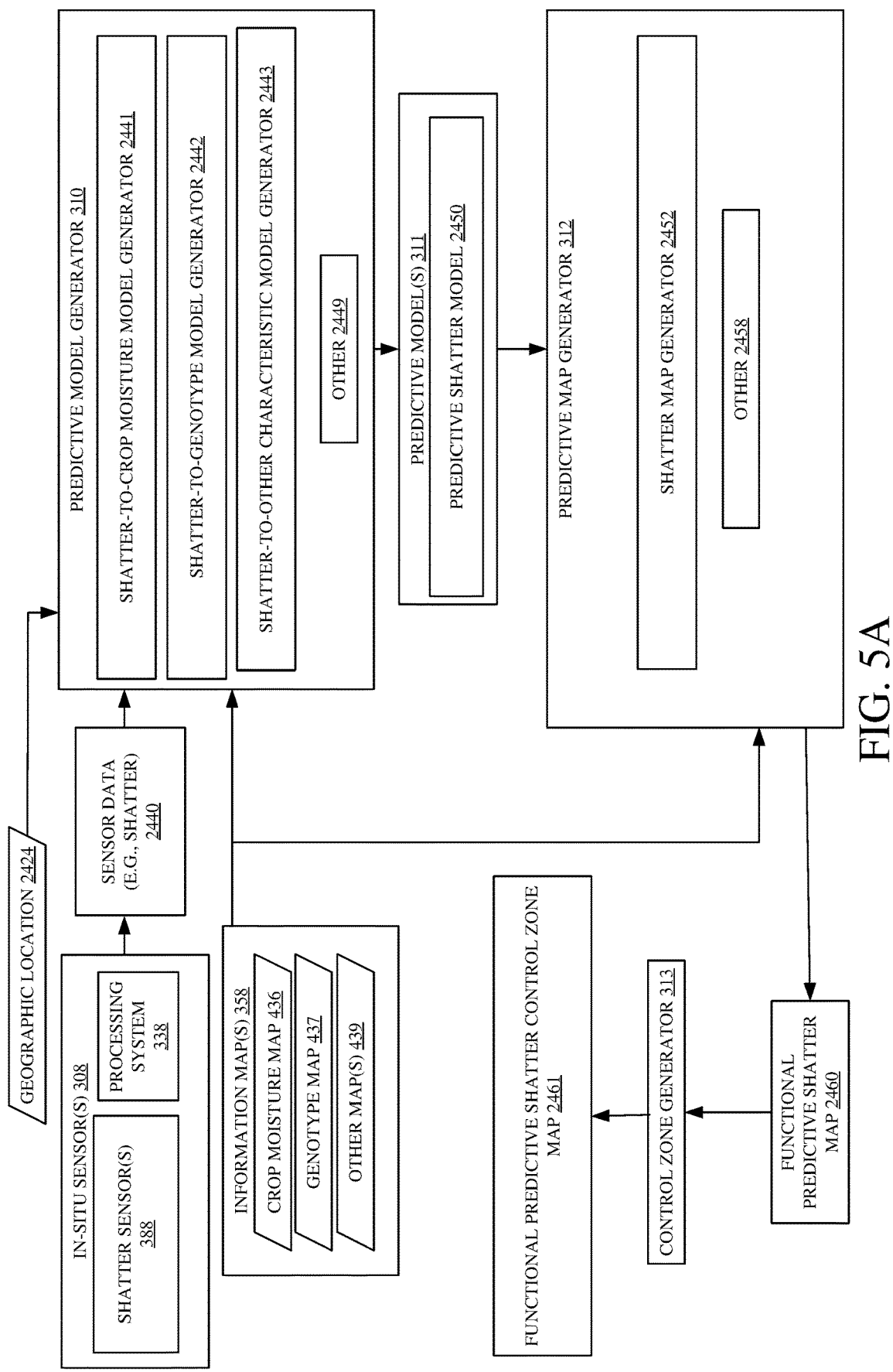
FIGS. 5A-5B are block diagrams showing some examples of a predictive model generator and predictive map generator.
Figure 5B:
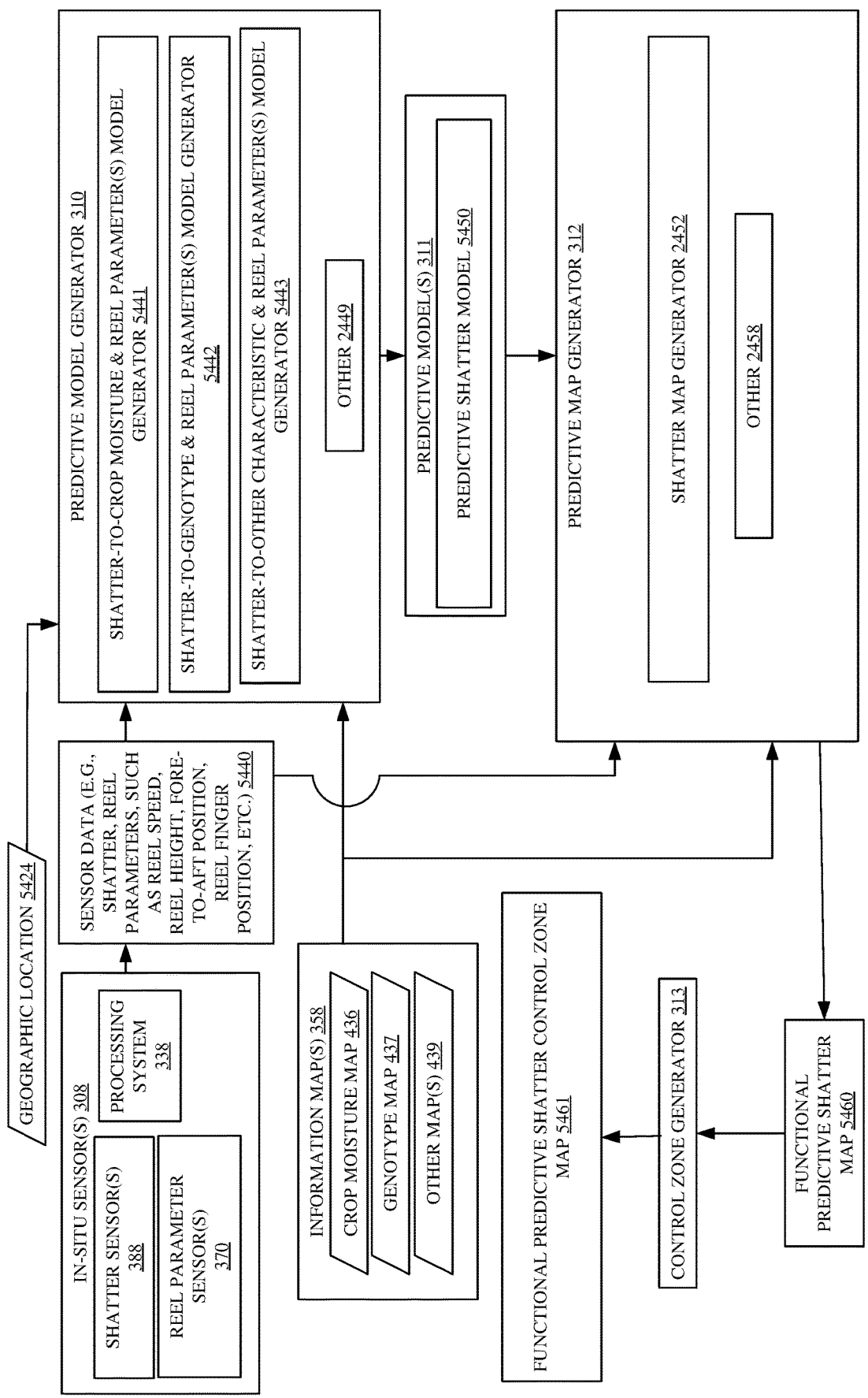

FIGS. 5A-5B are block diagrams of a portion of the agricultural system architecture 300 shown in FIG. 2. Particularly, FIG. 5A shows, among other things, examples of the predictive model generator 310 and the predictive map generator 312 in more detail. FIG. 5A also illustrates information flow among the various components shown. The predictive model generator 310 receives one or more of crop moisture map 436, a genotype map 437, and other map(s) 439. Predictive model generator 310 also receives a geographic location 2424, or an indication of a geographic location, such as from geographic position sensors 304. Geographic location 2424 illustratively represents the geographic location of a value detected by in-situ sensors 308. In some examples, the geographic position of the agricultural harvester 100, as detected by geographic position sensors 304, will not be the same as the geographic position on the field to which a value detected by in-situ sensors 308 corresponds. For example, shatter sensors 388 may detect shatter of crop by detecting crop material on the field behind agricultural harvester 100. Thus, the geographic position of agricultural harvester 100 at the time the shatter is detected may not be the geographic location of the shatter. It will be appreciated, that the geographic position indicated by geographic position sensor 304, along with timing, machine speed and heading, machine dimensions, and sensor position (e.g., relative to geographic position sensor), sensor parameters (e.g., field of view), can be used to derive a geographic location at the field to which a value a detected by an in-situ sensor 308 corresponds.

In-situ sensors 308 illustratively include shatter sensors 388, as well as processing system 338. In some examples, processing system 338 is separate from in-situ sensors 308 (such as the example shown in FIG. 2). In some instances, shatter sensors 388 may be located on-board agricultural harvester 100. The processing system 338 processes sensor data generated from shatter sensors 388 to generate processed sensor data 2440 indicative of shatter values.

As shown in FIG. 5A, the example predictive model generator 310 includes a shatter-to-crop moisture model generator 2441, a shatter-to-genotype model generator 2442, and a shatter-to-other characteristic model generator 2443. In other examples, the predictive model generator 310 may include additional, fewer, or different components than those shown in the example of FIG. 5. Consequently, in some examples, the predictive model generator 310 may include other items 2449 as well, which may include other types of predictive model generators to generate other types of models.

Shatter-to-crop moisture model generator 2441 identifies a relationship between shatter value(s) detected in in-situ sensor data 2440, at geographic location(s) to which the shatter value(s), detected in the in-situ sensor data 2440, correspond, and crop moisture value(s) from the crop moisture map 436 corresponding to the same geographic location(s) to which the detected shatter value(s) correspond. Based on this relationship established by shatter-to-crop moisture model generator 2441, shatter-to-crop moisture model generator 2441 generates a predictive shatter model. The predictive shatter model is used by shatter map generator 2452 to predict shatter at different locations in the field based upon the georeferenced crop moisture values contained in the crop moisture map 436 at the same locations in the field. Thus, for a given location in the field, a shatter value can be predicted at the given location based on the predictive shatter model and the crop moisture value, from the crop moisture map 436, at that given location.

Shatter-to-genotype model generator 2442 identifies a relationship between shatter value(s) detected in in-situ sensor data 2440, at geographic location(s) to which the shatter value(s), detected in the in-situ sensor data 2440, correspond, and genotype value(s) from the genotype map 437 corresponding to the same geographic location(s) to which the detected shatter value(s) correspond. Based on this relationship established by shatter-to-genotype model generator 2442, shatter-to-genotype model generator 2442 generates a predictive shatter model. The predictive shatter model is used by shatter map generator 2452 to predict shatter at different locations in the field based upon the georeferenced genotype values contained in the genotype map 437 at the same locations in the field. Thus, for a given location in the field, a shatter value can be predicted at the given location based on the predictive shatter model and the genotype value, from the genotype map 437, at that given location.

Shatter-to-other characteristic model generator 2443 identifies a relationship between shatter value(s) detected in in-situ sensor data 2440, at geographic location(s) to which the shatter value(s), detected in the in-situ sensor data 2440, correspond, and other characteristic value(s) from an other map 439 corresponding to the same geographic location(s) to which the detected shatter value(s) correspond. Based on this relationship established by shatter-to-other characteristic model generator 2443, shatter-to-other characteristic model generator 2443 generates a predictive shatter model. The predictive shatter model is used by shatter map generator 2452 to predict shatter at different locations in the field based upon the georeferenced other characteristic values contained in the other map 439 at the same locations in the field. Thus, for a given location in the field, a shatter value can be predicted at the given location based on the predictive shatter model and the other characteristic value, from the other map 439, at that given location.

In light of the above, the predictive model generator 310 is operable to produce a plurality of predictive shatter models, such as one or more of the predictive shatter models generated by model generators 2441, 2442, 2443, and 2449. In another example, two or more of the predictive models described above may be combined into a single predictive shatter model, such as a predictive shatter model that predicts shatter based upon two or more of the crop moisture value, the genotype value, and the other characteristic value at different locations in the field. Any of these shatter models, or combinations thereof, are represented collectively by predictive shatter model 2450 in FIG. 5A.

The predictive shatter model 2450 is provided to predictive map generator 312. In the example of FIG. 5A, predictive map generator 312 includes shatter map generator 2452. In other examples, predictive map generator 312 may include additional or different map generators. Thus, in some examples, predictive map generator 312 may include other items 2458 which may include other types of map generators to generate other types of maps.

Shatter map generator 2452 receives one or more of the crop moisture map 436, the genotype map 437, and an other map 439, along with the predictive shatter model 2450 which predicts shatter based upon one or more of a crop moisture value, a genotype value, and an other characteristic value, and generates a predictive map that predicts shatter at different locations in the field, such as functional predictive shatter map 2460.

Map generator 312 thus outputs a functional predictive shatter map 2460 that is predictive of shatter. Functional predictive shatter map 2460 is a predictive map 264. The functional predictive shatter map 2460, in one example, predicts shatter at different locations in a field. The functional predictive shatter map 2460 may be provided to control zone generator 313, control system 314, or both. Control zone generator 313 generates control zones and incorporates those control zones into the functional predictive shatter map 2460 to produce a predictive control zone map 265, that is a functional predictive shatter control zone map 2461.

One or both of functional predictive shatter map 2460 and functional predictive shatter control zone map 2461 may be provided to control system 314, which generates control signals to control one or more of the controllable subsystems 316 based upon the functional predictive shatter map 2460, the functional predictive shatter control zone map 2461, or both.

FIG. 5B shows, among other things, examples of the predictive model generator 310 and the predictive map generator 312 in more detail. FIG. 5B also illustrates information flow among the various components shown. The predictive model generator 310 receives one or more of crop moisture map 436, a genotype map 437, and other map(s) 439. Predictive model generator 310 also receives a geographic location 5424, or an indication of a geographic location, such as from geographic position sensors 304. Geographic location 5424 illustratively represents the geographic location of a value detected by in-situ sensors 308. In some examples, the geographic position of the agricultural harvester 100, as detected by geographic position sensors 304, will not be the same as the geographic position on the field to which a value detected by in-situ sensors 308 corresponds. For example, shatter sensors 388 may detect shatter of crop by detecting crop material on the field behind agricultural harvester 100. Thus, the geographic position of agricultural harvester 100 at the time the shatter is detected may not be the geographic location of the shatter. It will be appreciated, that the geographic position indicated by geographic position sensor 304, along with timing, machine speed and heading, machine dimensions, and sensor position (e.g., relative to geographic position sensor), sensor parameters (e.g., field of view), can be used to derive a geographic location at the field to which a value a detected by an in-situ sensor 308 corresponds.

In-situ sensors 308 illustratively include shatter sensors 388, reel parameter sensors 370, as well as processing system 338. In some examples, processing system 338 is separate from in-situ sensors 308 (such as the example shown in FIG. 2). In some instances, shatter sensors 388 or reel parameter sensors 370, or both, may be located on-board agricultural harvester 100. The processing system 338 processes sensor data generated from shatter sensors 388 to generate processed sensor data 5440 indicative of shatter values. The processing system 338 processes sensor data generated from reel parameter sensors 370 to generate processed sensor data 5440 indicative of reel parameter values, such as one or more of reel speed values, reel height values, reel fore-to-aft position values, and reel finger position values.

As shown in FIG. 5B, the example predictive model generator 310 includes a shatter-to-crop moisture and reel parameter(s) model generator 5441, a shatter-to-genotype and reel parameter(s) model generator 5442, and a shatter-to-other characteristic and reel parameter(s) model generator 5443. In other examples, the predictive model generator 310 may include additional, fewer, or different components than those shown in the example of FIG. 5. Consequently, in some examples, the predictive model generator 310 may include other items 2449 as well, which may include other types of predictive model generators to generate other types of models.

Shatter-to-crop moisture and reel parameter(s) model generator 5441 identifies a relationship between shatter value(s) detected in in-situ sensor data 5440, at geographic location(s) to which the shatter value(s), detected in the in-situ sensor data 5440, correspond, and crop moisture value(s) from the crop moisture map 436 corresponding to the same geographic location(s) to which the detected shatter value(s) correspond, and value(s) of one or more reel parameters (e.g., one or more of reel speed value(s), reel height value(s), reel fore-to-aft position value(s), and reel finger position value(s)) detected in in-situ sensor data 5440 corresponding to the same geographic location(s) to which the detected shatter value(s) correspond. Based on this relationship established by shatter-to-crop moisture and reel parameter(s) model generator 5441, shatter-to-crop moisture and reel parameter(s) model generator 5441 generates a predictive shatter model. The predictive shatter model is used by shatter map generator 2452 to predict shatter at different locations in the field based upon the georeferenced crop moisture values contained in the crop moisture map 436 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict shatter. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a shatter value can be predicted at the given location based on the predictive shatter model, the crop moisture value, from the crop moisture map 436, at that given location, and the reel parameter value(s) (e.g., one or more of an expected reel speed value, an expected reel height value, an expected reel fore-to-aft position value, and an expected reel finger position value) corresponding to that given location.

Shatter-to-genotype and reel parameter(s) model generator 5442 identifies a relationship between shatter value(s) detected in in-situ sensor data 5440, at geographic location(s) to which the shatter value(s), detected in the in-situ sensor data 5440, correspond, and genotype value(s) from the genotype map 437 corresponding to the same geographic location(s) to which the detected shatter value(s) correspond, and value(s) of one or more reel parameters (e.g., one or more of reel speed value(s), reel height value(s), reel fore-to-aft position value(s), and reel finger position value(s)) detected in in-situ sensor data 5440 corresponding to the same geographic location(s) to which the detected shatter value(s) correspond. Based on this relationship established by shatter-to-genotype and reel parameter(s) model generator 5442, shatter-to-genotype and reel parameter(s) model generator 5442 generates a predictive shatter model. The predictive shatter model is used by shatter map generator 2452 to predict shatter at different locations in the field based upon the georeferenced crop moisture values contained in the genotype map 437 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors and provided to map generator 312 as an input (along with the mapped values) to predict shatter. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a shatter value can be predicted at the given location based on the predictive shatter model, the genotype value, from the genotype map 437, at that given location, and the reel parameter value(s) (e.g., one or more of an expected reel speed value, an expected reel height value, an expected reel fore-to-aft position value, and an expected reel finger position value) corresponding to that given location.

Shatter-to-other characteristic and reel parameter(s) model generator 5443 identifies a relationship between shatter value(s) detected in in-situ sensor data 5440, at geographic location(s) to which the shatter value(s), detected in the in-situ sensor data 5440, correspond, and value(s) of an other characteristic from an other map 439 corresponding to the same geographic location(s) to which the detected shatter value(s) correspond, and value(s) of one or more reel parameters (e.g., one or more of reel speed value(s), reel height value(s), reel fore-to-aft position value(s), and reel finger position value(s)) detected in in-situ sensor data 5440 corresponding to the same geographic location(s) to which the detected shatter value(s) correspond. Based on this relationship established by shatter-to-other characteristic and reel parameter(s) model generator 5443, shatter-to-other characteristic and reel parameter(s) model generator 5443 generates a predictive shatter model. The predictive shatter model is used by shatter map generator 2452 to predict shatter at different locations in the field based upon the georeferenced other characteristic values contained in the other map 439 at the same locations in the field and the reel parameter values (e.g., one or more of the reel speed values, the reel height values, the reel fore-to-aft position values, and the reel finger position values) corresponding to the same locations in the field.

In some examples, the reel parameter values corresponding to the same locations may be expected reel parameter values. The expected reel parameter values may be the current (e.g., at the time the map is generated) reel parameter values (e.g., one or more of the current reel speed value, the current reel height value, the current reel fore-to-aft position value, and the current reel finger position value). These current reel parameter values may be detected by in-situ sensors 308 and provided to map generator 312 as an input (along with the mapped values) to predict shatter. In some examples, the expected reel parameter values can be prescribed or predicted reel parameter values, such as from a prescribed reel parameter map or predictive reel parameter map. In some examples, the expected reel parameter values may be output by a control system, or provided by an operator or user. In some examples, when the expected reel parameter values are changed (either by operator or user input or by a control system, or learning trigger criteria) the map (and perhaps the model) can be made new (or modified or revised).

Thus, for a given location in the field, a shatter value can be predicted at the given location based on the predictive shatter model, the other characteristic value, from the other map 439, at that given location, and the reel parameter value(s) (e.g., one or more of an expected reel speed value, an expected reel height value, an expected reel fore-to-aft position value, and an expected reel finger position value) corresponding to that given location.

In light of the above, the predictive model generator 310 is operable to produce a plurality of predictive shatter models, such as one or more of the predictive shatter models generated by model generators 5441, 5442, 5443, and 5449. In another example, two or more of the predictive models described above may be combined into a single predictive shatter model, such as a predictive shatter model that predicts shatter based upon two or more of the crop moisture value and a value of one or more reel parameters, the genotype value and a value of one or more reel parameters, and the other characteristic value and a value of the one or more reel parameters at different locations in the field. Any of these shatter models, or combinations thereof, are represented collectively by predictive shatter model 5450 in FIG. 5A.

The predictive shatter model 5450 is provided to predictive map generator 312. In the example of FIG. 5B, predictive map generator 312 includes shatter map generator 2452. In other examples, predictive map generator 312 may include additional or different map generators. Thus, in some examples, predictive map generator 312 may include other items 2458 which may include other types of map generators to generate other types of maps.

Shatter map generator 2452 receives one or more of the crop moisture map 436, the genotype map 437, and an other map 439, value(s) of one or more reel parameters, along with the predictive shatter model 5450 which predicts shatter based upon one or more of a crop moisture value and a value of one or more reel parameters, a genotype value and a value of one or more reel parameters, and an other characteristic value and a value of one or more reel parameters, and generates a predictive map that predicts shatter at different locations in the field, such as functional predictive shatter map 5460.

Map generator 312 thus outputs a functional predictive shatter map 5460 that is predictive of shatter. Functional predictive shatter map 5460 is a predictive map 264. The functional predictive shatter map 5460, in one example, predicts shatter at different locations in a field. The functional predictive shatter map 5460 may be provided to control zone generator 313, control system 314, or both. Control zone generator 313 generates control zones and incorporates those control zones into the functional predictive shatter map 5460 to produce a predictive control zone map 265, that is a functional predictive shatter control zone map 5461.

One or both of functional predictive shatter map 5460 and functional predictive shatter control zone map 5461 may be provided to control system 314, which generates control signals to control one or more of the controllable subsystems 316 based upon the functional predictive shatter map 5460, the functional predictive shatter control zone map 5461, or both.

Figure 6A:
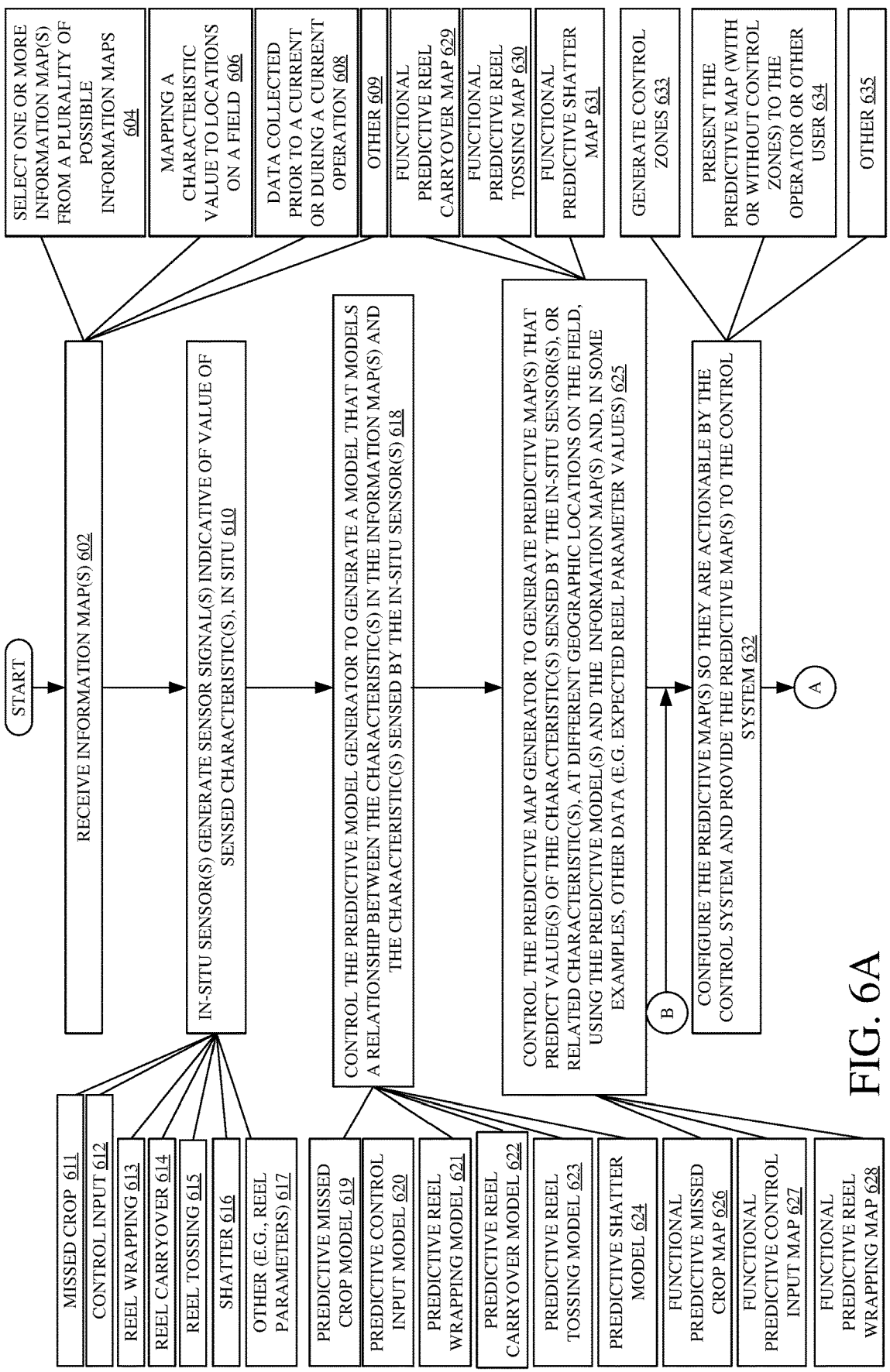
FIGS. 6A-6B (collectively referred to herein as FIG. 6) show a flow diagram illustrating one example of operation of an agricultural system in generating a map.
Figure 6B:
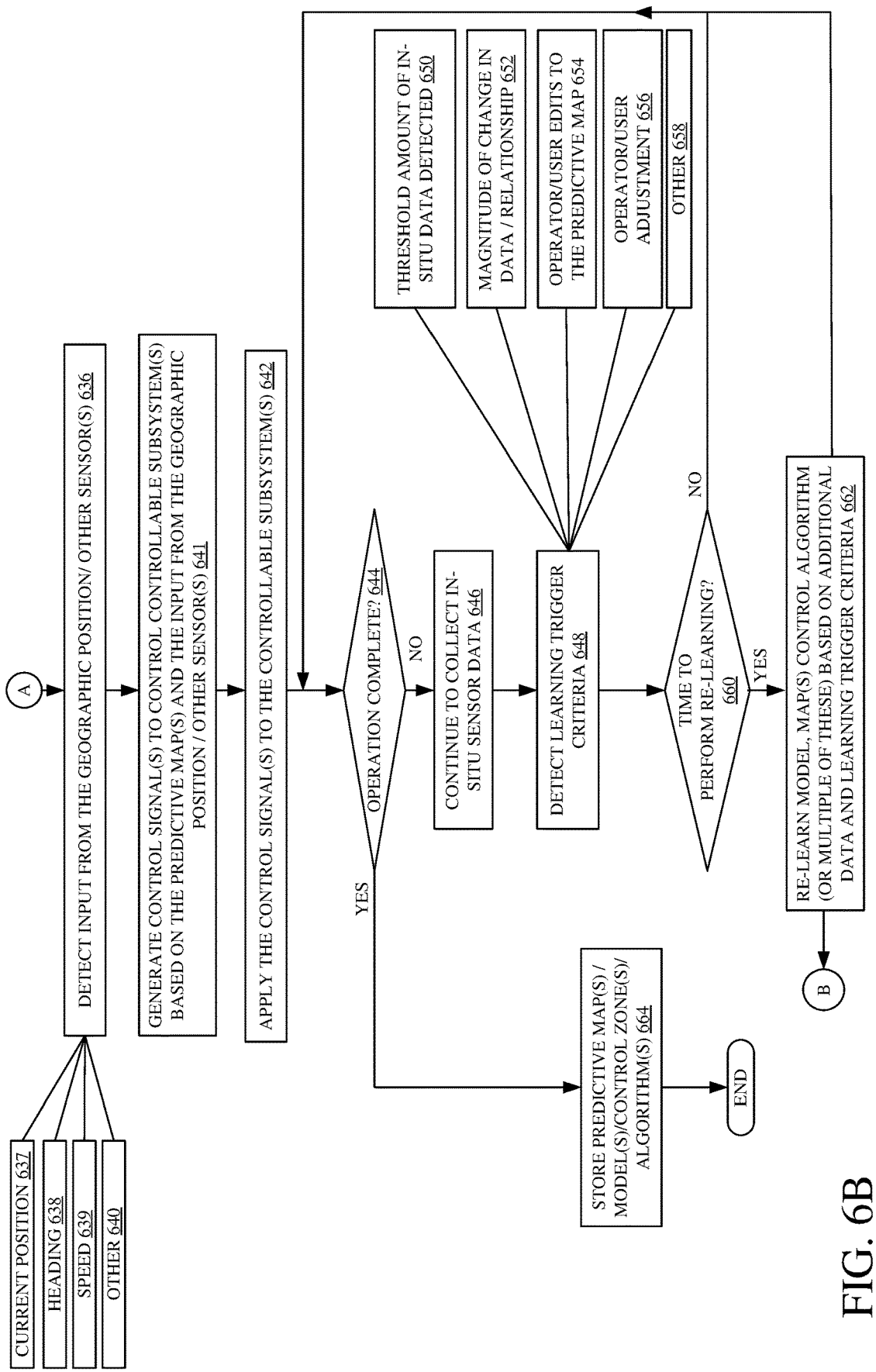

FIGS. 6A-6B (collectively referred to herein as FIG. 6) show a flow diagram illustrating one example of the operation of agricultural harvesting system architecture 300 in generating a predictive model and a predictive map.

At block 602, agricultural system 300 receives one or more information maps 358. Examples of information maps 358 or receiving information maps 358 are discussed with respect to blocks 604, 606, 608, and 609. As discussed above, information maps 358 map values of a variable, corresponding to a characteristic, to different locations in the field, as indicated at block 606. As indicated at block 604, receiving the information maps 358 may involve selecting one or more of a plurality of possible information maps 358 that are available. For instance, one information map 358 may be an optical characteristic map, such as optical characteristic map 430. Another information map 358 may be a crop state map, such as crop state map 431. Another information map 358 may be a crop height map, such as crop height map 432. Another information map 358 may be a vegetative index map, such as vegetative index map 433. Another information map 358 may be a yield map, such as yield map 434. Another information map 358 may be a weed map, such as weed map 435. Another information map 358 may be a crop moisture map, such as crop moisture map 436. Another information map 358 may be a genotype map, such as genotype map 437. Information maps 358 may include various other types of maps that map various other characteristics, such as other maps 439.

The process by which one or more information maps 358 are selected can be manual, semi-automated, or automated. The information maps 358 can be based on data collected prior to a current operation. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. For example, the sensed operating parameters during a previous seeding operation or sensed characteristics during a spraying operation earlier in the year may be used as data to generate the information maps 358. In other examples, and as described above, the information maps 358 may be predictive maps having predictive values. The predictive information map 358 can be generated by predictive map generator 312 based on a model generated by predictive model generator 310. The data for the information maps 358 can be obtained by agricultural system 300 using communication system 306 and stored in data store 302. The data for the information maps 358 can be obtained by agricultural system 300 using communication system 306 in other ways as well, and this is indicated by block 609 in the flow diagram of FIG. 6.

As agricultural harvester 100 is operating, in-situ sensors 308 generate sensor signals indicative of one or more in-situ data values indicative of a characteristic. For example, missed crop sensors 380 generate sensor data indicative of one or more in-situ data values indicative of one or more missed crop values, as indicated by block 611. Control input sensors 390 generate sensor data indicative of one or more in-situ data values indicative of one or more control inputs, as indicated by block 612. Reel wrapping sensors 382 generate sensor data indicative of one or more in-situ data values indicative of one or more reel wrapping values, as indicated by block 613. Reel carryover sensors 384 generate sensor data indicative of one or more in-situ data values indicative of one or more reel carryover values, as indicated by block 614. Reel tossing sensors 386 generate sensor data indicative of one or more in-situ data values indicative of one or more reel tossing values, as indicated by block 615. Shatter sensors 388 generate sensor data indicative of one or more in-situ data values indicative of one or more shatter values, as indicated by block 616. Various other in-situ sensors 308 or geographic position sensors 304, or both, generate sensor data indicative of one or more in-situ data values indicative of one or more other characteristic values, as indicated by block 617, for example, reel parameters sensors 370 generate sensor data indicative of one or more in-situ data values indicative of one more values of one or more reel parameters. For example, reel speed sensors 372 generate sensor data indicative of one or more in-situ data values indicative of one or more reel speed values, reel height sensors 374 generate sensor data indicative of one or more in-situ data values indicative of one or more reel height values, reel fore-to-aft position sensors 376 generate sensor data indicative of one or more in-situ data values indicative of one or more reel fore-to-aft position values, and reel finger position sensors 377 generate sensor data indicative of one or more in-situ data values indicative of one or more reel finger position values.

In some examples, data from in-situ sensors 308 is georeferenced using position, heading, or speed data, as well as machine dimension information, sensor position information, etc.

In one example, at block 618, predictive model generator 310 controls one or more of the model generators 441, 442, 443, 5000, 6000, 444, and 449 to generate a model that models the relationship between the mapped values, such as the optical characteristic values, the crop state values, the crop height values, the vegetative index values, the yield values, and the other characteristic values contained in the respective information map and the in-situ values of missed crop sensed by the in-situ sensors 308. Predictive model generator 310 generates a predictive missed crop model 450 that predicts values of missed crop based on one or more of optical characteristic values, crop state values, crop height values, vegetative index values, yield values, and other characteristic values, as indicated by block 619.

In one example, at block 618, predictive model generator 310 controls one or more of the model generators 3441, 3442, 3443, 3444, 5300, 6300 and 449 to generate a model that models the relationship between the mapped values, such as the optical characteristic values, the crop state values, the crop height values, the other characteristic values, the vegetative index values, and the yield values contained in the respective information map, the values of one or more reel parameters (e.g., one or more of reel speed values, reel height values, reel fore-to-aft position values, and reel finger position values), and the in-situ values of missed crop sensed by the in-situ sensors 308. Predictive model generator 310 generates a predictive missed crop model 3450 that predicts values of missed crop based on one or more of optical characteristic values and values of one or more reel parameters, crop state values and values of one or more reel parameters, crop height values and values of one or more reel parameters, vegetative index values and values of one or more reel parameters, yield values and values of one or more reel parameters, and other characteristic values and values of one or more reel parameters as indicated by block 619.

Thus, predictive model generator 310 can generate, as a predictive missed crop model, a predictive missed crop model 450 or a predictive missed crop model 3450, or both.

In one example, at block 618, predictive model generator 310 controls one or more of the model generators 445, 446, 447, 4000, 448, and 449 to generate a model that models the relationship between the mapped values, such as the optical characteristic values, the crop state values, the crop height values, the weed values, and the other characteristic values contained in the respective information map and the in-situ values of control input sensed by the in-situ sensors 308. Predictive model generator 310 generates a predictive control input model 451 that predicts values of missed crop based on one or more of optical characteristic values, crop state values, crop height values, weed values, and other characteristic values, as indicated by block 620.

In one example, at block 618, predictive model generator 310 controls one or more of the model generators 1421, 1422, 1423, 1424, 1425, 1426 and 1449 to generate a model that models the relationship between the mapped values, such as the crop height values, the vegetative index values, the yield values, the weed values, the crop moisture values, and the other characteristic values contained in the respective information map and the in-situ reel wrapping values sensed by the in-situ sensors 308. Predictive model generator 310 generates a predictive reel wrapping model 1450 that predicts reel wrapping values based on one or more of crop height values, vegetative index values, yield values, weed values, crop moisture values, and other characteristic values, as indicated by block 621.

In one example, at block 618, predictive model generator 310 controls one or more of the model generators 4421, 4422, 4423, 4424, 4425, 4426, and 1449 to generate a model that models the relationship between the mapped values, such as the crop height values, the vegetative index values, the yield values, the weed values, the crop moisture values, and the other characteristic values, contained in the respective information map, the values of one or more reel parameters (e.g., one or more of reel speed values, reel height values, reel fore-to-aft position values, and reel finger position values), and the in-situ values of reel wrapping sensed by the in-situ sensors 308. Predictive model generator 310 generates a predictive reel wrapping model 4450 that predicts values of reel wrapping based on one or more of crop height values and values of one or more reel parameters, vegetative index values and values of one or more reel parameters, yield values and values of one or more reel parameters, weed values and values of one or more reel parameters, crop moisture values and values of one or more reel parameters, and other characteristic values and values of one or more reel parameters as indicated by block 619.

Thus, predictive model generator 310 can generate, as a predictive reel wrapping model, a predictive reel wrapping model 1450 or a predictive reel wrapping model 4450, or both.

In one example, at block 618, predictive model generator 310 controls one or more of the model generators 1431, 1432, 1433, 1434, 1435, 1436 and 1449 to generate a model that models the relationship between the mapped values, such as the crop height values, the vegetative index values, the yield values, the weed values, the crop moisture values, and the other characteristic values contained in the respective information map and the in-situ reel carryover values sensed by the in-situ sensors 308. Predictive model generator 310 generates a predictive reel carryover model 1451 that predicts reel carryover values based on one or more of crop height values, vegetative index values, yield values, weed values, crop moisture values, and other characteristic values, as indicated by block 622.

In one example, at block 618, predictive model generator 310 controls one or more of the model generators 4431, 4432, 4433, 4434, 4435, 4436, and 1449 to generate a model that models the relationship between the mapped values, such as the crop height values, the vegetative index values, the yield values, the weed values, the crop moisture values, and the other characteristic values, contained in the respective information map, the values of one or more reel parameters (e.g., one or more of reel speed values, reel height values, reel fore-to-aft position values, and reel finger position values), and the in-situ values of reel carryover sensed by the in-situ sensors 308. Predictive model generator 310 generates a predictive reel carryover model 4451 that predicts values of reel carryover based on one or more of crop height values and values of one or more reel parameters, vegetative index values and values of one or more reel parameters, yield values and values of one or more reel parameters, weed values and values of one or more reel parameters, crop moisture values and values of one or more reel parameters, and other characteristic values and values of one or more reel parameters as indicated by block 619.

Thus, predictive model generator 310 can generate, as a predictive reel carryover model, a predictive reel carryover model 1451 or a predictive reel carryover model 4451, or both.

In one example, at block 618, predictive model generator 310 controls one or more of the model generators 1441, 1442, 1443, 1444, 1445, 1446 and 1449 to generate a model that models the relationship between the mapped values, such as the crop height values, the vegetative index values, the yield values, the weed values, the crop moisture values, and the other characteristic values contained in the respective information map and the in-situ reel tossing values sensed by the in-situ sensors 308. Predictive model generator 310 generates a predictive reel tossing model 1452 that predicts reel tossing values based on one or more of crop height values, vegetative index values, yield values, weed values, crop moisture values, and other characteristic values, as indicated by block 623.

In one example, at block 618, predictive model generator 310 controls one or more of the model generators 4441, 4442, 4443, 4444, 4445, 4446, and 1449 to generate a model that models the relationship between the mapped values, such as the crop height values, the vegetative index values, the yield values, the weed values, the crop moisture values, and the other characteristic values, contained in the respective information map, the values of one or more reel parameters (e.g., one or more of reel speed values, reel height values, reel fore-to-aft position values, and reel finger position values), and the in-situ values of reel tossing sensed by the in-situ sensors 308. Predictive model generator 310 generates a predictive reel tossing model 4452 that predicts values of reel tossing based on one or more of crop height values and values of one or more reel parameters, vegetative index values and values of one or more reel parameters, yield values and values of one or more reel parameters, weed values and values of one or more reel parameters, crop moisture values and values of one or more reel parameters, and other characteristic values and values of one or more reel parameters as indicated by block 619.

Thus, predictive model generator 310 can generate, as a predictive reel tossing model, a predictive reel tossing model 1452 or a predictive reel carryover model 4452, or both.

In one example, at block 618, predictive model generator 310 controls one or more of the model generators 2441, 2442, 2443, and 2449 to generate a model that models the relationship between the mapped values, such as the crop moisture values, the genotype values, and the other characteristic values contained in the respective information map and the in-situ shatter values sensed by the in-situ sensors 308. Predictive model generator 310 generates a predictive shatter model 2450 that predicts shatter values based on one or more of crop moisture values, genotype values, and other characteristic values, as indicated by block 624.

In one example, at block 618, predictive model generator 310 controls one or more of the model generators 5441, 5442, 5443, and 5449 to generate a model that models the relationship between the mapped values, such as the crop moisture values, the genotype values, and the other characteristic values contained in the respective information map, the values of one or more reel parameters (e.g., one or more of reel speed values, reel height values, reel fore-to-aft position values, and reel finger position values) and the in-situ shatter values sensed by the in-situ sensors 308. Predictive model generator 310 generates a predictive shatter model 5450 that predicts shatter values based on one or more of crop moisture values and values of one or more reel parameters, genotype values and values of one or more reel parameters, and other characteristic values and values of one or more reel parameters as indicated by block 624.

Thus, predictive model generator 310 can generate, as a predictive shatter model, a predictive shatter model 2450 or a predictive missed crop model 5450, or both.

At block 625, the relationship(s) or model(s) generated by predictive model generator 310 are provided to predictive map generator 312. In one example, at block 625, predictive map generator 312 generates a functional predictive missed crop map 460 that predicts values of missed crop at different geographic locations in a field at which agricultural harvester 100 is operating using the predictive missed crop model 450 and one or more of the information maps 358, such as optical characteristic map 430, crop state map 431, crop height map 432, vegetative index map 433, yield map 434, and an other map 439. Generating a predictive missed crop map, such as functional predictive missed crop map 460, is indicated by block 626.

It should be noted that, in some examples, the functional predictive missed crop map 460 may include two or more different map layers. Each map layer may represent a different data type, for instance, a functional predictive missed crop map 460 that provides two or more of a map layer that provides predictive missed crop based on optical characteristic values from optical characteristic map 430, a map layer that provides predictive missed crop based on crop state values from crop state map 431, a map layer that provides predictive missed crop based on crop height values from crop height map 432, a map layer that provides predictive missed crop based on vegetative index values from vegetative index map 433, a map layer that provides predictive missed crop based on yield values from yield map 434, and a map layer that provides predictive missed crop based on other characteristic values from an other map 439. Additionally, or alternatively, functional predictive missed crop map 460 can include a map layer that provides predictive missed crop based on one or more of optical characteristic values from optical characteristic map 430, crop state values from crop state map 431, crop height values from crop height map 432, vegetative index values from vegetative index map 433, yield values from yield map 434, and values of an other characteristic from an other map 439.

In one example, at block 625, predictive map generator 312 generates a functional predictive missed crop map 3460 that predicts values of missed crop at different geographic locations in a field at which agricultural harvester 100 is operating using the predictive missed crop model 3450 and one or more of the information maps 358, such as optical characteristic map 430, crop state map 431, crop height map 432, vegetative index map 433, yield map 434, and an other map 439 and expected values of one or more reel parameters (e.g., one or more of expected reel speed values, expected reel height values, expected reel fore-to-aft position values, and expected reel finger position values). Generating a predictive missed crop map, such as functional predictive missed crop map 3460, is indicated by block 626.

It should be noted that, in some examples, the functional predictive missed crop map 3460 may include two or more different map layers. Each map layer may represent a different data type, for instance, a functional predictive missed crop map 3460 that provides two or more of a map layer that provides predictive missed crop based on optical characteristic values from optical characteristic map 430 and values of one or more reel parameters, a map layer that provides predictive missed crop based on crop state values from crop state map 431 and values of one or more reel parameters, a map layer that provides predictive missed crop based on crop height values from crop height map 432 and values of one or more reel parameters, a map layer that provides predictive missed crop based on vegetative index values from vegetative index map 433 and values of one or more reel parameters, a map layer that provides predictive missed crop based on yield values from yield map 434 and values of one or more reel parameters, and a map layer that provides predictive missed crop based on other characteristic values from an other map 439 and values of one or more reel parameters. Additionally, or alternatively, functional predictive missed crop map 3460 can include a map layer that provides predictive missed crop based on one or more of optical characteristic values from optical characteristic map 430 and values of one or more reel parameters, crop state values from crop state map 431 and values of one or more reel parameters, crop height values from crop height map 432 and values of one or more reel parameters, vegetative index values from vegetative index map 433 and values of one or more reel parameters, yield values from yield map 434 and values of one or more reel parameters, and values of an other characteristic from an other map 439 and values of one or more reel parameters.

Thus predictive map generator 312 can generate, as a functional predictive missed crop map, functional predictive missed crop map 460 or functional predictive missed crop map 3460, or both.

In one example, at block 625, predictive map generator 312 generates a functional predictive control input map 470 that predicts values of control input at different geographic locations in a field at which agricultural harvester 100 is operating using the predictive control input model 451 and one or more of the information maps 358, such as optical characteristic map 430, crop state map 431, crop height map 432, weed map 435, and an other map 439. Generating a predictive control input map, such as functional predictive control input map 470, is indicated by block 627.

It should be noted that, in some examples, the functional predictive control input map 470 may include two or more different map layers. Each map layer may represent a different data type, for instance, a functional predictive control input map 470 that provides two or more of a map layer that provides predictive control input based on optical characteristic values from optical characteristic map 430, a map layer that provides predictive control input based on crop state values from crop state map 431, a map layer that provides predictive control input based on crop height values from crop height map 432, a map layer that provides predictive control input based on weed values from weed map 435, and a map layer that provides predictive control input based on other characteristic values from an other map 439. Additionally, or alternatively, functional predictive control input map 470 can include a map layer that provides predictive control input based on one or more of optical characteristic values from optical characteristic map 430, crop state values from crop state map 431, crop height values from crop height map 432, weed values from weed map 435, and values of an other characteristic from an other map 439.

In one example, at block 625, predictive map generator 312 generates a functional predictive reel wrapping map 1460 that predicts values of reel wrapping at different geographic locations in a field at which agricultural harvester 100 is operating using the predictive reel wrapping model 1450 and one or more of the information maps 358, such as crop height map 432, vegetative index map 433, yield map 434, weed map 435, crop moisture map 436, and an other map 439. Generating a predictive reel wrapping map, such as functional predictive reel wrapping map 1460, is indicated by block 628.

It should be noted that, in some examples, the functional predictive reel wrapping map 460 may include two or more different map layers. Each map layer may represent a different data type, for instance, a functional predictive reel wrapping map 1460 that provides two or more of a map layer that provides predictive reel wrapping based on crop height from crop height map 432, a map layer that provides predictive reel wrapping based on vegetative index values from vegetative index map 433, a map layer that provides predictive reel wrapping based on yield values from yield map 434, a map layer that provides predictive reel wrapping based on weed values from weed map 435, a map layer that provides predictive reel wrapping based on crop moisture values from crop moisture map 436, and a map layer that provides predictive reel wrapping based on other characteristic values from an other map 439. Additionally, or alternatively, functional predictive reel wrapping map 1460 can include a map layer that provides predictive reel wrapping based on one or more of crop height values from crop height map 432, vegetative index values from vegetative index map 433, yield values from yield map 434, weed values from weed map 435, crop moisture values from crop moisture map 436, and values of an other characteristic from an other map 439.

In one example, at block 625, predictive map generator 312 generates a functional predictive reel wrapping map 4460 that predicts values of reel wrapping at different geographic locations in a field at which agricultural harvester 100 is operating using the predictive reel wrapping model 4450 and one or more of the information maps 358, crop height map 432, vegetative index map 433, yield map 434, weed map 435, crop moisture map 436, and an other map 439 and expected values of one or more reel parameters. Generating a predictive reel wrapping map, such as functional predictive reel wrapping map 4460, is indicated by block 628.

It should be noted that, in some examples, the functional predictive reel wrapping map 4460 may include two or more different map layers. Each map layer may represent a different data type, for instance, a functional predictive reel wrapping map 4460 that provides two or more of a map layer that provides predictive reel wrapping based on crop height values from crop height map 432 and values of one or more reel parameters, a map layer that provides predictive reel wrapping based on vegetative index values from vegetative index map 433 and values of one or more reel parameters, a map layer that provides predictive reel wrapping based on yield values from yield map 434 and values of one or more reel parameters, a map layer that provides predictive reel wrapping based on weed values from weed map 435 and values of one or more reel parameters, a map layer that provides predictive reel wrapping based on crop moisture values from crop moisture map 436 and values of one or more reel parameters, and a map layer that provides predictive reel wrapping based on other characteristic values from an other map 439 and values of one or more reel parameters. Additionally, or alternatively, functional predictive reel wrapping map 4460 can include a map layer that provides predictive reel wrapping based on one or more of crop height values from crop height map 432 and values of one or more reel parameters, vegetative index values from vegetative index map 433 and values of one or more reel parameters, yield values from yield map 434 and values of one or more reel parameters, weed values from weed map 435 and values of one or more reel parameters, crop moisture values from crop moisture map 436 and values of one or more reel parameters, and values of an other characteristic from an other map 439 and values of one or more reel parameters.

Thus, predictive map generator 312 can generate, as a functional predictive reel wrapping map, functional predictive reel wrapping map 1460 or functional predictive reel wrapping map 4460, or both.

In one example, at block 625, predictive map generator 312 generates a functional predictive reel carryover map 1470 that predicts values of reel carryover at different geographic locations in a field at which agricultural harvester 100 is operating using the predictive reel carryover model 1451 and one or more of the information maps 358, such as crop height map 432, vegetative index map 433, yield map 434, weed map 435, crop moisture map 436, and an other map 439. Generating a predictive reel carryover map, such as functional predictive reel carryover map 1470, is indicated by block 629.

It should be noted that, in some examples, the functional predictive reel carryover map 470 may include two or more different map layers. Each map layer may represent a different data type, for instance, a functional predictive reel carryover map 1470 that provides two or more of a map layer that provides predictive reel carryover based on crop height from crop height map 432, a map layer that provides predictive reel carryover based on vegetative index values from vegetative index map 433, a map layer that provides predictive reel carryover based on yield values from yield map 434, a map layer that provides predictive reel carryover based on weed values from weed map 435, a map layer that provides predictive reel carryover based on crop moisture values from crop moisture map 436, and a map layer that provides predictive reel carryover based on other characteristic values from an other map 439. Additionally, or alternatively, functional predictive reel carryover map 1470 can include a map layer that provides predictive reel carryover based on one or more of crop height values from crop height map 432, vegetative index values from vegetative index map 433, yield values from yield map 434, weed values from weed map 435, crop moisture values from crop moisture map 436, and values of an other characteristic from an other map 439.

In one example, at block 625, predictive map generator 312 generates a functional predictive reel carryover map 4470 that predicts values of reel carryover at different geographic locations in a field at which agricultural harvester 100 is operating using the predictive reel carryover model 4451 and one or more of the information maps 358, crop height map 432, vegetative index map 433, yield map 434, weed map 435, crop moisture map 436, and an other map 439 and expected values of one or more reel parameters. Generating a predictive reel carryover map, such as functional predictive reel carryover map 4470, is indicated by block 629.

It should be noted that, in some examples, the functional predictive reel carryover map 4470 may include two or more different map layers. Each map layer may represent a different data type, for instance, a functional predictive reel carryover map 4470 that provides two or more of a map layer that provides predictive reel carryover based on crop height values from crop height map 432 and values of one or more reel parameters, a map layer that provides predictive reel carryover based on vegetative index values from vegetative index map 433 and values of one or more reel parameters, a map layer that provides predictive reel carryover based on yield values from yield map 434 and values of one or more reel parameters, a map layer that provides predictive reel carryover based on weed values from weed map 435 and values of one or more reel parameters, a map layer that provides predictive reel carryover based on crop moisture values from crop moisture map 436 and values of one or more reel parameters, and a map layer that provides predictive reel carryover based on other characteristic values from an other map 439 and values of one or more reel parameters. Additionally, or alternatively, functional predictive reel carryover map 4470 can include a map layer that provides predictive reel carryover based on one or more of crop height values from crop height map 432 and values of one or more reel parameters, vegetative index values from vegetative index map 433 and values of one or more reel parameters, yield values from yield map 434 and values of one or more reel parameters, weed values from weed map 435 and values of one or more reel parameters, crop moisture values from crop moisture map 436 and values of one or more reel parameters, and values of an other characteristic from an other map 439 and values of one or more reel parameters.

Thus, predictive map generator 312 can generate, as a functional predictive reel carryover map, functional predictive reel carryover map 1470 or functional predictive reel carryover map 4470, or both.

In one example, at block 625, predictive map generator 312 generates a functional predictive reel tossing map 1480 that predicts values of reel tossing at different geographic locations in a field at which agricultural harvester 100 is operating using the predictive reel tossing model 1452 and one or more of the information maps 358, such as crop height map 432, vegetative index map 433, yield map 434, weed map 435, crop moisture map 436, and an other map 439. Generating a predictive reel tossing map, such as functional predictive reel tossing map 1480, is indicated by block 630.

It should be noted that, in some examples, the functional predictive reel tossing map may include two or more different map layers. Each map layer may represent a different data type, for instance, a functional predictive reel tossing map 1480 that provides two or more of a map layer that provides predictive reel tossing based on crop height from crop height map 432, a map layer that provides predictive reel tossing based on vegetative index values from vegetative index map 433, a map layer that provides predictive reel tossing based on yield values from yield map 434, a map layer that provides predictive reel tossing based on weed values from weed map 435, a map layer that provides predictive reel tossing based on crop moisture values from crop moisture map 436, and a map layer that provides predictive reel tossing based on other characteristic values from an other map 439. Additionally, or alternatively, functional predictive reel tossing map 1480 can include a map layer that provides predictive reel tossing based on one or more of crop height values from crop height map 432, vegetative index values from vegetative index map 433, yield values from yield map 434, weed values from weed map 435, crop moisture values from crop moisture map 436, and values of an other characteristic from an other map 439.

In one example, at block 625, predictive map generator 312 generates a functional predictive reel tossing map 4480 that predicts values of reel tossing at different geographic locations in a field at which agricultural harvester 100 is operating using the predictive reel tossing model 4452 and one or more of the information maps 358, crop height map 432, vegetative index map 433, yield map 434, weed map 435, crop moisture map 436, and an other map 439 and expected values of one or more reel parameters. Generating a predictive reel tossing map, such as functional predictive reel tossing map 4480, is indicated by block 630.

It should be noted that, in some examples, the functional predictive reel tossing map 4480 may include two or more different map layers. Each map layer may represent a different data type, for instance, a functional predictive reel tossing map 4480 that provides two or more of a map layer that provides predictive reel tossing based on crop height values from crop height map 432 and values of one or more reel parameters, a map layer that provides predictive reel tossing based on vegetative index values from vegetative index map 433 and values of one or more reel parameters, a map layer that provides predictive reel tossing based on yield values from yield map 434 and values of one or more reel parameters, a map layer that provides predictive reel tossing based on weed values from weed map 435 and values of one or more reel parameters, a map layer that provides predictive reel tossing based on crop moisture values from crop moisture map 436 and values of one or more reel parameters, and a map layer that provides predictive reel tossing based on other characteristic values from an other map 439 and values of one or more reel parameters. Additionally, or alternatively, functional predictive reel tossing map 4480 can include a map layer that provides predictive reel tossing based on one or more of crop height values from crop height map 432 and values of one or more reel parameters, vegetative index values from vegetative index map 433 and values of one or more reel parameters, yield values from yield map 434 and values of one or more reel parameters, weed values from weed map 435 and values of one or more reel parameters, crop moisture values from crop moisture map 436 and values of one or more reel parameters, and values of an other characteristic from an other map 439 and values of one or more reel parameters.

Thus, predictive map generator 312 can generate, as a functional predictive reel tossing map, functional predictive reel carryover map 1480 or functional predictive reel tossing map 4480, or both.

In one example, at block 625, predictive map generator 312 generates a functional predictive shatter map 2460 that predicts values of shatter at different geographic locations in a field at which agricultural harvester 100 is operating using the predictive shatter model 2450 and one or more of the information maps 358, such as crop moisture map 436, genotype map 437, and an other map 439. Generating a predictive shatter map, such as functional predictive shatter map 2460, is indicated by block 631.

It should be noted that, in some examples, the functional predictive shatter map 2460 may include two or more different map layers. Each map layer may represent a different data type, for instance, a functional predictive shatter map 2460 that provides two or more of a map layer that provides predictive shatter based on crop moisture values from crop moisture map 436, a map layer that provides predictive shatter based on genotype values from genotype map 437, and a map layer that provides predictive shatter based on other characteristic values from an other map 439. Additionally, or alternatively, functional predictive shatter map 2460 can include a map layer that provides predictive shatter based on one or more of crop moisture values from crop moisture map 436, genotype values from genotype map 437, and values of an other characteristic from an other map 439.

In one example, at block 625, predictive map generator 312 generates a functional predictive shatter map 5460 that predicts values of shatter at different geographic locations in a field at which agricultural harvester 100 is operating using the predictive shatter model 5450 and one or more of the information maps 358, such as crop moisture map 436, genotype map 437, and an other map 439 and expected values of one or more reel parameters. Generating a predictive shatter map, such as functional predictive shatter map 5460, is indicated by block 631.

It should be noted that, in some examples, the functional predictive shatter map 5460 may include two or more different map layers. Each map layer may represent a different data type, for instance, a functional predictive shatter map 5460 that provides two or more of a map layer that provides predictive shatter based on crop moisture values from crop moisture map 436 and values of one or more reel parameters, a map layer that provides predictive shatter based on genotype values from genotype map 437 and values of one or more reel parameters, and a map layer that provides predictive shatter based on other characteristic values from an other map 439 and values of one or more reel parameters. Additionally, or alternatively, functional predictive shatter map 2460 can include a map layer that provides predictive shatter based on one or more of crop moisture values from crop moisture map 436 and values of one or more reel parameters, genotype values from genotype map 437 and values of one or more reel parameters, and values of an other characteristic from an other map 439 and values of one or more reel parameters.

Thus, predictive map generator 312 can generate, as a functional predictive shatter map, functional predictive shatter map 2460 or functional predictive shatter map 5460, or both.

At block 632, predictive map generator 312 configures one or more of the functional predictive missed crop map 460, the functional predictive missed crop map 3460, the functional predictive control input map 470, the functional predictive reel wrapping map 1460, the functional predictive reel wrapping map 4460, the functional predictive reel carryover map 1470, the functional predictive reel carryover map 4470, the functional predictive reel tossing map 1480, the functional predictive reel tossing map 4480, the functional predictive shatter map 2460, and the functional predictive shatter map 5460 so that the one or more maps 460, 3460, 470, 1460, 4460, 1470, 4470, 1480, 4480, 2460 and 5460 are actionable (or consumable) by control system 314. Predictive map generator 312 can provide one or more of the functional predictive missed crop map 460, the functional predictive missed crop map 3460, the functional predictive control input map 470, the functional predictive reel wrapping map 1460, the functional predictive reel wrapping map 4460, the functional predictive reel carryover map 1470, the functional predictive reel carryover map 4470, the functional predictive reel tossing map 1480, the functional predictive reel tossing map 4480, the functional predictive shatter map 2460, and the functional predictive shatter map 5460 to the control system 314 or to control zone generator 313, or both. Some examples of the different ways in which the one or more maps 460, 3460, 470, 1460, 4460, 1470, 4470, 1480, 4480, 2460, and 5460 can be configured or output are described with respect to blocks 632, 633, 634, and 635. For instance, predictive map generator 312 configures one or more of the functional predictive missed crop map 460, the functional predictive missed crop map 3460, the functional predictive control input map 470, the functional predictive reel wrapping map 1460, the functional predictive reel wrapping map 4460, the functional predictive reel carryover map 1470, the functional predictive reel carryover map 4470, the functional predictive reel tossing map 1480, the functional predictive reel tossing map 4480, the functional predictive shatter map 2460, and the functional predictive shatter map 5460 so that the one or more maps 460, 3460, 470, 1460, 4460, 1470, 4470, 1480, 4480, 2460, and 5460 include values that can be read by control system 314 and used as the basis for generating control signals for one or more of the different controllable subsystems 316 of mobile machine 100, as indicated by block 632.

In one example, at block 633, control zone generator 313 can divide the functional predictive missed crop map 460 into control zones based on the values on the functional predictive missed crop map 460 to generate functional predictive missed crop control zone map 461. In one example, at block 633, control zone generator 313 can divide the functional predictive missed crop map 3460 into control zones based on the values on the functional predictive missed crop map 3460 to generate functional predictive missed crop control zone map 3461. In one example, at block 633, control zone generator 313 can divide the functional predictive control input map 470 into control zones based on the values on the functional predictive control input map 470 to generate functional predictive control input control zone map 471. In one example, at block 633, control zone generator 313 can divide the functional predictive reel wrapping map 1460 into control zones based on the values on the functional reel wrapping map 1460 to generate functional predictive reel wrapping control zone map 1461. In one example, at block 633, control zone generator 313 can divide the functional predictive reel wrapping map 4460 into control zones based on the values on the functional reel wrapping map 4460 to generate functional predictive reel wrapping control zone map 4461. In one example, at block 633, control zone generator 313 can divide the functional predictive reel carryover map 1470 into control zones based on the values on the functional predictive reel carryover map 1470 to generate functional predictive reel carryover control zone map 1471. In one example, at block 633, control zone generator 313 can divide the functional predictive reel carryover map 4470 into control zones based on the values on the functional predictive reel carryover map 4470 to generate functional predictive reel carryover control zone map 4471. In one example, at block 633, control zone generator 313 can divide the functional predictive reel tossing map 1480 into control zones based on the values on the functional predictive reel tossing map 1480 to generate functional predictive reel tossing control zone map 1481. In one example, at block 633, control zone generator 313 can divide the functional predictive reel tossing map 4480 into control zones based on the values on the functional predictive reel tossing map 4480 to generate functional predictive reel tossing control zone map 4481. In one example, at block 633, control zone generator 313 can divide the functional predictive shatter map 2460 into control zones based on the values on the functional predictive shatter map 2460 to generate functional predictive shatter control zone map 2461. In one example, at block 633, control zone generator 313 can divide the functional predictive shatter map 5460 into control zones based on the values on the functional predictive shatter map 5460 to generate functional predictive shatter control zone map 5461.

Contiguously-geolocated values that are within a threshold value of one another can be grouped into a control zone. The threshold value can be a default threshold value, or the threshold value can be set based on an operator input, based on an input from an automated system, or based on other criteria. A size of the zones may be based on a responsiveness of the control system 314, the controllable subsystems 316, based on wear considerations, or on other criteria.

At block 634, predictive map generator 312 configures one or more of the functional predictive missed crop map 460 or 3460, or both, the functional predictive control input map 470, the functional predictive reel wrapping map 1460 or 4460, or both, the functional predictive reel carryover map 1470 or 4470, or both, the functional predictive reel tossing map 1480 or 4480, or both, and the functional predictive shatter map 2460 or 5460, or both, for presentation to an operator or other user. At block 634, control zone generator 313 can configure one or more of the functional predictive missed crop control zone map 461 or 3461, or both, the functional predictive control input control zone map 471, the functional predictive reel wrapping control zone map 1461 or 4461, or both, the functional predictive reel carryover control zone map 1471 or 4471, or both, the functional predictive reel tossing control zone map 1481 or 4481, or both, and the functional predictive shatter control zone map 2461 or 5461, or both, for presentation to an operator or other user. When presented to an operator or other user, the presentation of the one or more maps 460, 3460, 470, 1460, 4460, 1470, 4470, 1480, 4480, 2460 and 5460 or of the one or more maps 461, 3461, 471, 1461, 4461, 1471, 4471, 1481, 4481, 2461, and 5461, or both, may contain one or more of the predictive values on the one or more functional predictive maps 460, 3460, 470, 1460, 4460, 1470, 4470, 1480, 4480, 2460, 5460 correlated to geographic location, the control zones of the one or more functional control zone maps 461, 3461, 471, 1461, 4461, 1471, 4471, 1481, 4481, 2461, and 5461 correlated to geographic location, and settings values or control parameters that are used based on the predicted values on the one or more functional predictive maps 460, 3460, 470, 1460, 4460, 1470, 4470, 1480, 4480, 2460, and 5460 or control zones on the one or more functional predictive control zone maps 461, 3461, 471, 1461, 4461, 1471, 4471, 1481, 4481, 2461, and 5461. The presentation can, in another example, include more abstracted information or more detailed information. The presentation can also include a confidence level that indicates an accuracy with which the predictive values on the one or more maps 460, 3460, 470, 1460, 4460, 1470, 4470, 1480, 4480, 2460, and 5460 or the control zones one the one or more maps 461, 3461, 471, 1461, 4461, 1471, 4471, 1481, 4481, 2461, and 5461 conform to measured values that may be measured by sensors on agricultural harvester 100 as agricultural harvester 100 operates at the field. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of mobile machine 100 may be unable to see the information corresponding to the one or more functional predictive maps 460, 3460, 470, 1460, 4460, 1470, 4470, 1480, 4480, 2460, and 5460 or make any changes to machine operation. A supervisor, such as a supervisor at a remote location, however, may be able to see the one or more functional predictive maps 460, 3460, 470, 1460, 4460, 1470, 4470, 1480, 4480, 2460, and 5460 on the display but be prevented from making any changes. A manager, who may be at a separate remote location, may be able to see all of the elements on the one or more functional predictive maps 460, 3460, 470, 1460, 4460, 1470, 4470, 1480, 4480, 2460, and 5460 and also be able to change the one or more functional predictive maps 460, 3460, 470, 1460, 4460, 1470, 4470, 1480, 4480, 2460, and 5460. In some instances, the one or more functional predictive maps 460, 3460, 470, 1460, 4460, 1470, 4470, 1480, 4480, 2460, and 5460 accessible and changeable by a manager located remotely may be used in machine control. This is one example of an authorization hierarchy that may be implemented. The one or more functional predictive maps 460, 3460, 470, 1460, 4460, 1470, 4470, 1480, 4480, 2460, and 5460 or the one or more functional predictive control zone maps 461, 3461, 471, 1461, 4461, 1471, 4471, 1481, 4481, 2461, and 5461, or both, can be configured in other ways as well, as indicated by block 635.

At block 636, input from geographic position sensors 304 and other in-situ sensors 308 are received by the control system 314. Particularly, at block 637, control system 314 detects an input from the geographic position sensors 304 identifying a geographic location of agricultural harvester 100. Block 638 represents receipt by the control system 314 of sensor inputs indicative of trajectory or heading of agricultural harvester 100, and block 639 represents receipt by the control system 314 of a speed of agricultural harvester 100. Block 640 represents receipt by the control system 314 of other information from various in-situ sensors 308, such as values of one or more reel parameters from one or more reel parameter sensors 370, for instance one or more of reel speed values from reel speed sensor 372, reel height values from reel height sensors 374, reel fore-to-aft position values from reel fore-to-aft position sensors 376, and reel finger position values from reel finger position sensors 377.

At block 641, control system 314 generates control signals to control the controllable subsystems 316 based on one or more of the functional predictive maps 460, 3460, 470, 1460, 4460, 1470, 4470, 1480, 4480, 2460, and 5460 or one or more of the functional predictive control zone maps 461, 3461, 471, 1461, 4461, 1471, 4471, 1481, 4481, 2461, and 5461, or both, and the input from the geographic position sensor 304 and any other in-situ sensors 308. At block 642, control system 314 applies the control signals to the controllable subsystems 316. It will be appreciated that the particular control signals that are generated, and the particular controllable subsystems 316 that are controlled, may vary based upon one or more different things. For example, the control signals that are generated and the controllable subsystems 316 that are controlled may be based on the type of the one or more functional predictive maps 460, 3460, 470, 1460, 4460, 1470, 4470, 1480, 4480, 2460, and 5460 or the one or more functional predictive control zone maps 461, 3461, 471, 1461, 4461, 1471, 4471, 1481, 4481, 2461, and 5461, or both, that are being used. Similarly, the control signals that are generated and the controllable subsystems 316 that are controlled and the timing of the control signals can be based on various latencies of agricultural harvester 100 and the responsiveness of the controllable subsystems 316.

By way of example, propulsion controller 331 of control system 314 can generate control signals to control propulsion subsystem 350 to control one or more propulsion parameters of agricultural harvester 100, such as one or more of the speed at which the agricultural harvester 100 travels, the deceleration of agricultural harvester 100, and the acceleration of agricultural harvester 100, based on one or more of the functional predictive maps 460, 3460, 470, 1460, 4460, 1470, 4470, 1480, 4480, 2460, and 5460 or one or more of the functional predictive control zone maps 461, 3461, 471, 1461, 4461, 1471, 4471, 1481, 4481, 2461, and 5461, or both.

In another example, path planning controller 334 of control system 314 can generate control signals to control steering subsystem 352 to control a route parameter of agricultural harvester 100, such as one or more of a commanded path at the field over which agricultural harvester 100 travels, and the steering of agricultural harvester 100, based on one or more of the functional predictive maps 460, 3460, 470, 1460, 4460, 1470, 4470, 1480, 4480, 2460, and 5460 or one or more of the functional predictive control zone maps 461, 3461, 471, 1461, 4461, 1471, 4471, 1481, 4481, 2461, and 5461, or both.

In another example, reel controller 335 of control system 314 can generate control signals to control reel subsystem 340 to control one or more operating parameters of reel 164, based on one or more of the functional predictive maps 460, 3460, 470, 1460, 4460, 1470, 4470, 1480, 4480, 2460, and 5460 or one or more of the functional predictive control zone maps 461, 3461, 471, 1461, 4461, 1471, 4471, 1481, 4481, 2461, and 5461, or both. For example, reel controller 335 can generate control signals to control one or more fore-to-aft actuators 342 to control fore-to-aft position of reel 164, based on one or more of the functional predictive maps 460, 3460, 470, 1460, 4460, 1470, 4470, 1480, 4480, 2460, and 5460 or one or more of the functional predictive control zone maps 461, 3461, 471, 1461, 4461, 1471, 4471, 1481, 4481, 2461, and 5461, or both. In another example, reel controller 335 can generate control signals to control one or more reel height actuators 344 to control the height of reel 164, based on one or more of the functional predictive maps 460, 3460, 470, 1460, 4460, 1470, 4470, 1480, 4480, 2460, and 5460 or one or more of the functional predictive control zone maps 461, 3461, 471, 1461, 4461, 1471, 4471, 1481, 4481, 2461, and 5461, or both. In another example, reel controller 335 can generate control signals to control one or more reel speed actuators 346 to control speed of reel 164, based on one or more of the functional predictive maps 460, 3460, 470, 1460, 4460, 1470, 4470, 1480, 4480, 2460, and 5460 or one or more of the functional predictive control zone maps 461, 3461, 471, 1461, 4461, 1471, 4471, 1481, 4481, 2461, and 5461, or both. In another example, reel controller 335 can generate control signals to control one or more finger position actuators 348 to control position of reel fingers 117, based on one or more of the functional predictive maps 460, 3460, 470, 1460, 4460, 1470, 4470, 1480, 4480, 2460, and 5460 or one or more of the functional predictive control zone maps 461, 3461, 471, 1461, 4461, 1471, 4471, 1481, 4481, 2461, and 5461, or both.

In another example, interface controller 330 of control system 314 can generate control signals to control an interface mechanism (e.g., 218 or 364) to generate a display, alert, notification, or other indication based on or indicative of the one or more functional predictive maps 460, 3460, 470, 1460, 4460, 1470, 4470, 1480, 4480, 2460, and 5460 or one or more of the functional predictive control zone maps 461, 3461, 471, 1461, 4461, 1471, 4471, 1481, 4481, 2461, and 5461, or both.

In another example, communication system controller 329 of control system 314 can generate control signals to control communication system 306 to communicate one or more of the functional predictive maps 460, 3460, 470,

1460, 4460, 1470, 4470, 1480, 4480, 2460, and 5460 or one or more of the functional predictive control zone maps 461, 3461, 471, 1461, 4461, 1471, 4471, 1481, 4481, 2461, and 5461, or both, to another item of agricultural system 300 (e.g., remote computing systems 368 or user interfaces 364).

These are merely examples. Control system 314 can generate various other control signals to control various other items of mobile machine 100 (or agricultural system 300) based on one or more of the functional predictive maps 460, 3460, 470, 1460, 4460, 1470, 4470, 1480, 4480, 2460, and 5460 or one or more of the functional predictive control zone maps 461, 3461, 471, 1461, 4461, 1471, 4471, 1481, 4481, 2461, and 5461, or both.

At block 644, a determination is made as to whether the operation has been completed. If the operation is not completed, the processing advances to block 646 where in-situ sensor data from geographic position sensor 304 and in-situ sensors 308 (and perhaps other sensors) continue to be read.

In some examples, at block 648, agricultural system 300 can also detect learning trigger criteria to perform machine learning on one or more of the functional predictive maps 460, 3460, 470, 1460, 4460, 1470, 4470, 1480, 4480, 2460, and 5460, one or more of the functional predictive control zone maps 461, 3461, 471, 1461, 4461, 1471, 4471, 1481, 4481, 2461, and 5461, one or more of the predictive models 450, 3450, 451, 1450, 4450, 1451, 4451, 1452, 4452, 2450, and 5450, the zones generated by control zone generator 313, one or more control algorithms implemented by the controllers in the control system 314, and other triggered learning.

The learning trigger criteria can include any of a wide variety of different criteria. Some examples of detecting trigger criteria are discussed with respect to blocks 650, 652, 654, 656, and 658. For instance, in some examples, triggered learning can involve recreation of a relationship used to generate a predictive model when a threshold amount of in-situ sensor data are obtained from in-situ sensors 308. In such examples, receipt of an amount of in-situ sensor data from the in-situ sensors 308 that exceeds a threshold triggers or causes the predictive model generator 310 to generate a new predictive model that is used by predictive map generator 312. Thus, as agricultural harvester 100 continues an operation, receipt of the threshold amount of in-situ sensor data from the in-situ sensors 308 triggers the creation of a new relationship represented by a new predictive model (e.g., one or more of new model 450, new model 451, new model 1450, new model 1451, new model 1452, and new model 2450) generated by predictive model generator 310. Further, one or more new functional predictive maps 460, 3460, 470, 1460, 4460, 1470, 4470, 1480, 4480, 2460, and 5460 or one or more new functional predictive control zone maps 461, 3461, 471, 1461, 4461, 1471, 4471, 1481, 4481, 2461, and 5461, or both, can be generated using the respective new models 450, 3450, 451, 1450, 4450, 1451, 4451, 1452, 4452, 2450, and 5450. Block 650 represents detecting a threshold amount of in-situ sensor data used to trigger creation of a new predictive model.

In other examples, the learning trigger criteria may be based on how much the in-situ sensor data from the in-situ sensors 308 are changing, such as over time or compared to previous values. For example, if variations within the in-situ sensor data (or the relationship between the in-situ sensor data and the information in the one or more information maps 358) are within a selected range or is less than a defined amount, or below a threshold value, then a new predictive model is not generated by the predictive model generator 310. As a result, the predictive map generator 312 does not generate a new functional predictive map, a new functional predictive control zone map, or both. However, if variations within the in-situ sensor data are outside of the selected range, are greater than the defined amount, or are above the threshold value, for example, then the predictive model generator 310 generates a new model using all or a portion of the newly received in-situ sensor data that the predictive map generator 312 uses to generate a new functional predictive map which can be provided to control zone generator 313 for the creation of a new functional predictive control zone map. At block 652, variations in the in-situ sensor data, such as a magnitude of an amount by which the data exceeds the selected range or a magnitude of the variation of the relationship between the in-situ sensor data and the information in the one or more information maps, can be used as a trigger to cause generation of one or more of a new predictive model, a new functional predictive map, and a new functional predictive control zone map. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 310 switches to a different information map (different from the originally selected information map), then switching to the different information map may trigger re-learning by predictive model generator 310, predictive map generator 312, control zone generator 313, control system 314, or other items. In another example, transitioning of agricultural harvester 100 to a different topography or to a different control zone may be used as learning trigger criteria as well.

In some instances, operator 360 or user 366 can also edit the one or more functional predictive maps 460, 3460, 470, 1460, 4460, 1470, 4470, 1480, 4480, 2460, and 5460 or the one or more functional predictive control zone maps 461, 3461, 471, 1461, 4461, 1471, 4471, 1481, 4481, 2461, and 5461, or both. The edits can change value(s) on the one or more functional predictive maps 460, 3460, 470, 1460, 4460, 1470, 4470, 1480, 4480, 2460, and 5460, change a size, shape, position, or existence of control zone(s) on the one or more functional predictive control zone maps 461, 3461, 471, 1461, 4461, 1471, 4471, 1481, 4481, 2461, and 5461, or both. Block 654 shows that edited information can be used as learning trigger criteria.

In some instances, it may also be that operator 360 or user 366 observes that automated control of a controllable subsystem 316, is not what the operator or user desires. In such instances, the operator 360 or user 366 may provide a manual adjustment to the controllable subsystem 316 reflecting that the operator 360 or user 366 desires the controllable subsystem 316 to operate in a different way than is being commanded by control system 314. Thus, manual alteration of a setting by the operator 360 or user 366 can cause one or more of predictive model generator 310 to generate a new model, predictive map generator 312 to generate a new functional predictive map, control zone generator 313 to generate one or more new control zones on a functional predictive control zone map, and control system 314 to relearn a control algorithm or to perform machine learning on one or more of the controller components 329 through 339 in control system 314 based upon the adjustment by the operator 360 or user 366, as shown in block 656. Block 658 represents the use of other triggered learning criteria.

In other examples, relearning may be performed periodically or intermittently based, for example, upon a selected time interval such as a discrete time interval or a variable time interval, as indicated by block 660.

If relearning is triggered, whether based upon learning trigger criteria or based upon passage of a time interval, as indicated by block 660, then one or more of the predictive model generator 310, predictive map generator 312, control zone generator 313, and control system 314 performs machine learning to generate one or more new predictive models, one or more new predictive maps, one or more new control zones, and one or more new control algorithms, respectively, based upon the learning trigger criteria. The new predictive model(s), the new predictive map(s), the new control zone(s), and the new control algorithm(s) are generated using any additional data that has been collected since the last learning operation was performed. Performing relearning is indicated by block 662.

If the operation has been completed, operation moves from block 662 to block 664 where one or more of the functional predictive map(s), functional predictive control zone map(s), the predictive model(s), the control zone(s), and the control algorithm(s), are stored. The functional predictive map(s), functional predictive control zone map(s), predictive model(s), control zone(s), and control algorithm(s), may be stored locally on data store 302 or sent to a remote system using communication system 306 for later use.

If the operation has not been completed, operation moves from block 662 to block such that the one or more of the new predictive model(s), the new functional predictive map(s), the new functional predictive control zone map(s), the new control zone(s), and the new control algorithm(s) can be used in the control of agricultural harvester 100.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or the same worksite at a future time.

The revision of the model in response to new data may employ machine learning methods. Without limitation, machine learning methods may include memory networks, Bayes systems, decisions trees, Eigenvectors, Eigenvalues and Machine Learning, Evolutionary and Genetic Algorithms, Cluster Analysis, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value varies from a predictive value of the characteristic, such as by a threshold amount. This deviation may only be detected in areas of the field where the elevation of the worksite is above a certain level. Thus, the revision to the predictive value is only applied to other areas of the worksite having elevation above the certain level. In this simpler example, the predictive characteristic value and elevation at the point the deviation occurred and the detected characteristic value and elevation at the point the deviation cross the threshold are used to generate a linear equation. The linear equation is used to adjust the predictive characteristic value in areas of the worksite (which have not yet been operated on in the current operation, such as unharvested areas) in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field are obtained, such as one or more of an optical characteristic map, a crop state map, a crop height map, a vegetative index map, a yield map, and another type of map.

In-situ sensors generate sensor data indicative of in-situ characteristic values, such as in-situ values of missed crop.

A predictive model generator generates one or more predictive models based on the one or more obtained maps and the in-situ sensor data, such as a predictive missed crop model.

A predictive map generator generates one or more functional predictive maps based on a model generated by the predictive model generator and the one or more obtained maps. For example, the predictive map generator may generate a functional predictive missed map that maps predictive values of missed crop to one or more locations on the worksite based on a predictive missed crop model and the one or more obtained maps.

Control zones, which include machine settings values, can be incorporated into the functional predictive missed crop map to generate a functional predictive missed crop map with control zones.

As another example, without limitation, consider an instance of the paradigm described herein which is parameterized as follows.

One or more maps of the field are obtained, such as one or more of an optical characteristic map, a crop state map, a crop height map, a vegetative index map, a yield map, and another type of map.

In-situ sensors generate sensor data indicative of in-situ characteristic values, such as in-situ values of missed crop and in-situ values of one or more reel parameters.

A predictive model generator generates one or more predictive models based on the one or more obtained maps and the in-situ sensor data, such as a predictive missed crop model.

A predictive map generator generates one or more functional predictive maps based on a model generated by the predictive model generator and the one or more obtained maps. For example, the predictive map generator may generate a functional predictive missed map that maps predictive values of missed crop to one or more locations on the worksite based on a predictive missed crop model, the one or more obtained maps, and in-situ values of one or more reel parameters.

Control zones, which include machine settings values, can be incorporated into the functional predictive missed crop map to generate a functional predictive missed crop map with control zones.

As another example, without limitation, consider an instance of the paradigm described herein which is parameterized as follows.

One or more maps of the field are obtained, such as one or more of an optical characteristic map, a crop state map, a crop height map, a weed map, and another type of map.

In-situ sensors generate sensor data indicative of in-situ characteristic values, such as in-situ control input values.

A predictive model generator generates one or more predictive models based on the one or more obtained maps and the in-situ sensor data, such as a predictive control input model.

A predictive map generator generates one or more functional predictive maps based on a model generated by the predictive model generator and the one or more obtained maps. For example, the predictive map generator may generate a functional predictive control input map that maps predictive control input values to one or more locations on the worksite based on a predictive control input model and the one or more obtained maps.

Control zones, which include machine settings values, can be incorporated into the functional predictive control input map to generate a functional predictive control input map with control zones.

As another example, without limitation, consider an instance of the paradigm described herein which is parameterized as follows.

One or more maps of the field are obtained, such as one or more of a crop height map, a vegetative index map, a yield map, a weed map, a crop moisture map, and another type of map.

In-situ sensors generate sensor data indicative of in-situ characteristic values, such as in-situ reel wrapping values.

A predictive model generator generates one or more predictive models based on the one or more obtained maps and the in-situ sensor data, such as a predictive reel wrapping model.

A predictive map generator generates one or more functional predictive maps based on a model generated by the predictive model generator and the one or more obtained maps. For example, the predictive map generator may generate a functional predictive reel wrapping map that maps predictive reel wrapping values to one or more locations on the worksite based on a predictive reel wrapping model and the one or more obtained maps.

Control zones, which include machine settings values, can be incorporated into the functional predictive reel wrapping map to generate a functional predictive reel wrapping map with control zones.

As another example, without limitation, consider an instance of the paradigm described herein which is parameterized as follows.

One or more maps of the field are obtained, such as one or more of a crop height map, a vegetative index map, a yield map, a weed map, a crop moisture map, and another type of map.

In-situ sensors generate sensor data indicative of in-situ characteristic values, such as in-situ reel wrapping values and in-situ values of one or more reel parameters.

A predictive model generator generates one or more predictive models based on the one or more obtained maps and the in-situ sensor data, such as a predictive reel wrapping model.

A predictive map generator generates one or more functional predictive maps based on a model generated by the predictive model generator and the one or more obtained maps. For example, the predictive map generator may generate a functional predictive reel wrapping map that maps predictive reel wrapping values to one or more locations on the worksite based on a predictive reel wrapping model, the one or more obtained maps, and in-situ values of one or more reel parameters.

Control zones, which include machine settings values, can be incorporated into the functional predictive reel wrapping map to generate a functional predictive reel wrapping map with control zones.

As another example, without limitation, consider an instance of the paradigm described herein which is parameterized as follows.

One or more maps of the field are obtained, such as one or more of a crop height map, a vegetative index map, a yield map, a weed map, a crop moisture map, and another type of map.

In-situ sensors generate sensor data indicative of in-situ characteristic values, such as in-situ reel carryover values.

A predictive model generator generates one or more predictive models based on the one or more obtained maps and the in-situ sensor data, such as a predictive reel carryover model.

A predictive map generator generates one or more functional predictive maps based on a model generated by the predictive model generator and the one or more obtained maps. For example, the predictive map generator may generate a functional predictive reel carryover map that maps predictive reel carryover values to one or more locations on the worksite based on a predictive reel carryover model and the one or more obtained maps.

Control zones, which include machine settings values, can be incorporated into the functional predictive reel carryover map to generate a functional predictive reel carryover map with control zones.

As another example, without limitation, consider an instance of the paradigm described herein which is parameterized as follows.

One or more maps of the field are obtained, such as one or more of a crop height map, a vegetative index map, a yield map, a weed map, a crop moisture map, and another type of map.

In-situ sensors generate sensor data indicative of in-situ characteristic values, such as in-situ reel carryover values and in-situ values of one or more reel parameters.

A predictive model generator generates one or more predictive models based on the one or more obtained maps and the in-situ sensor data, such as a predictive reel carryover model.

A predictive map generator generates one or more functional predictive maps based on a model generated by the predictive model generator and the one or more obtained maps. For example, the predictive map generator may generate a functional predictive reel carryover map that maps predictive reel carryover values to one or more locations on the worksite based on a predictive reel carryover model, the one or more obtained maps, and in-situ values of one or more reel parameters.

Control zones, which include machine settings values, can be incorporated into the functional predictive reel carryover map to generate a functional predictive reel carryover map with control zones.

As another example, without limitation, consider an instance of the paradigm described herein which is parameterized as follows.

One or more maps of the field are obtained, such as one or more of a crop height map, a vegetative index map, a yield map, a weed map, a crop moisture map, and another type of map.

In-situ sensors generate sensor data indicative of in-situ characteristic values, such as in-situ reel tossing values.

A predictive model generator generates one or more predictive models based on the one or more obtained maps and the in-situ sensor data, such as a predictive reel tossing model.

A predictive map generator generates one or more functional predictive maps based on a model generated by the predictive model generator and the one or more obtained maps. For example, the predictive map generator may generate a functional predictive reel tossing map that maps predictive reel tossing values to one or more locations on the worksite based on a predictive reel tossing model and the one or more obtained maps.

Control zones, which include machine settings values, can be incorporated into the functional predictive reel tossing map to generate a functional predictive reel tossing map with control zones.

As another example, without limitation, consider an instance of the paradigm described herein which is parameterized as follows.

One or more maps of the field are obtained, such as one or more of a crop height map, a vegetative index map, a yield map, a weed map, a crop moisture map, and another type of map.

In-situ sensors generate sensor data indicative of in-situ characteristic values, such as in-situ reel tossing values and in-situ values of one or more reel parameters.

A predictive model generator generates one or more predictive models based on the one or more obtained maps and the in-situ sensor data, such as a predictive reel tossing model.

A predictive map generator generates one or more functional predictive maps based on a model generated by the predictive model generator and the one or more obtained maps. For example, the predictive map generator may generate a functional predictive reel tossing map that maps predictive reel tossing values to one or more locations on the worksite based on a predictive reel tossing model, the one or more obtained maps, and in-situ values of one or more reel parameters.

Control zones, which include machine settings values, can be incorporated into the functional predictive reel tossing map to generate a functional predictive reel tossing map with control zones.

As another example, without limitation, consider an instance of the paradigm described herein which is parameterized as follows.

One or more maps of the field are obtained, such as one or more of a crop moisture map, a genotype map, and another type of map.

In-situ sensors generate sensor data indicative of in-situ characteristic values, such as in-situ shatter values.

A predictive model generator generates one or more predictive models based on the one or more obtained maps and the in-situ sensor data, such as a predictive shatter model.

A predictive map generator generates one or more functional predictive maps based on a model generated by the predictive model generator and the one or more obtained maps. For example, the predictive map generator may generate a functional predictive shatter map that maps predictive shatter values to one or more locations on the worksite based on a predictive shatter model and the one or more obtained maps.

Control zones, which include machine settings values, can be incorporated into the functional predictive shatter map to generate a functional predictive shatter map with control zones.

As another example, without limitation, consider an instance of the paradigm described herein which is parameterized as follows.

One or more maps of the field are obtained, such as one or more of a crop moisture map, a genotype map, and another type of map.

In-situ sensors generate sensor data indicative of in-situ characteristic values, such as in-situ shatter values and in-situ values of one or more reel parameters.

A predictive model generator generates one or more predictive models based on the one or more obtained maps and the in-situ sensor data, such as a predictive shatter model.

A predictive map generator generates one or more functional predictive maps based on a model generated by the predictive model generator and the one or more obtained maps. For example, the predictive map generator may generate a functional predictive shatter map that maps predictive shatter values to one or more locations on the worksite based on a predictive shatter model, the one or more obtained maps, and in-situ values of one or more reel parameters.

Control zones, which include machine settings values, can be incorporated into the functional predictive shatter map to generate a functional predictive shatter map with control zones.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), and operator or user makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained map(s). The functional predictive map(s) or the functional predictive control zone map(s), or both, are then revised based on the revised model(s) and the values in the obtained map(s).

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic and interactions. It will be appreciated that any or all of such systems, components, logic and interactions may be implemented by hardware items, such as processors, memory, or other processing components, some of which are described below, that perform the functions associated with those systems, components, or logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 7:
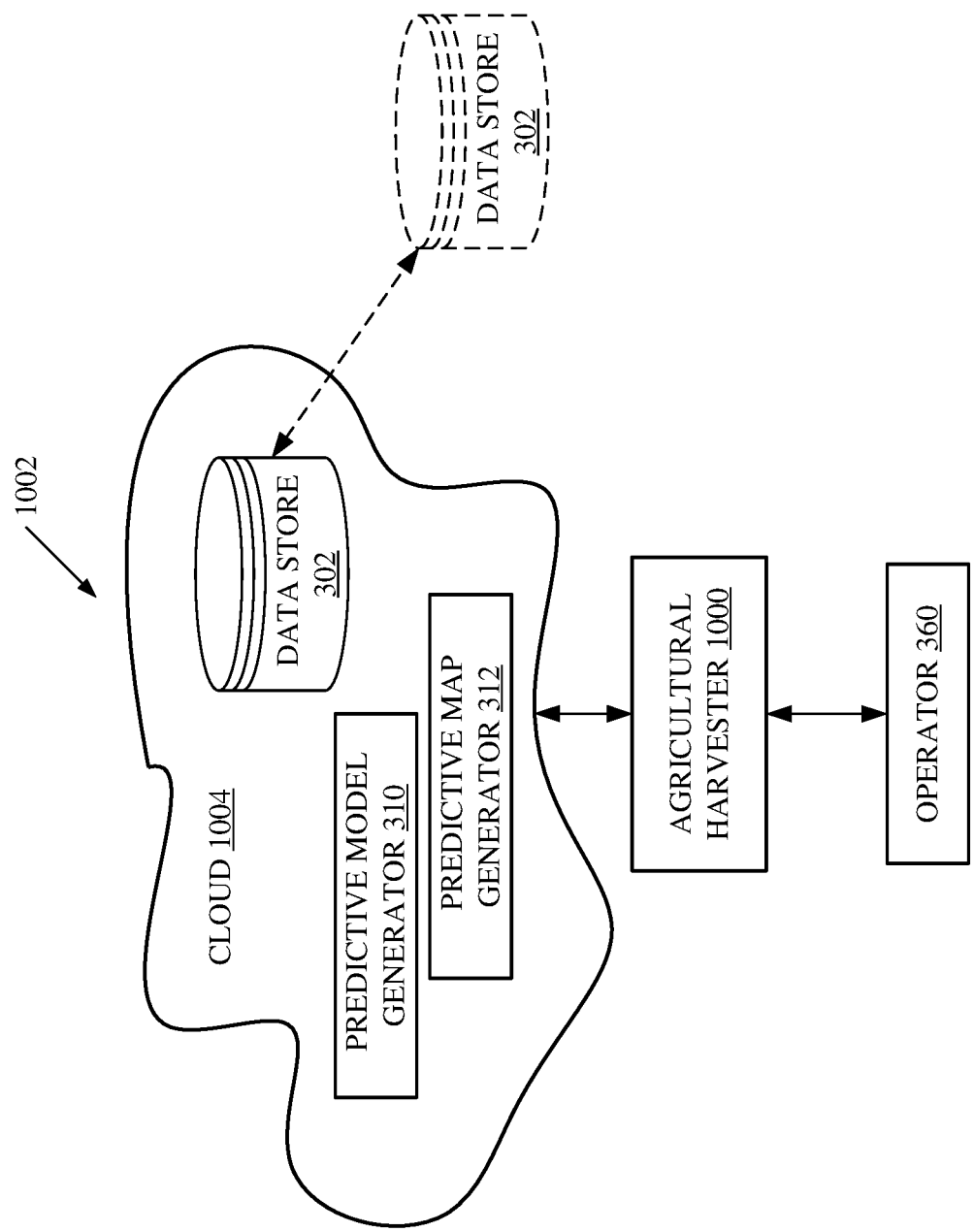
FIG. 7 is a block diagram showing one example of an agricultural harvester in communication with a remote server environment.

FIG. 7 is a block diagram of agricultural harvester 1000, which may be similar to agricultural harvester 100 shown in FIG. 2. The agricultural harvester 1000 communicates with elements in a remote server architecture 1002. In some examples, remote server architecture 1002 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 2 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 7, some items are similar to those shown in FIG. 2 and those items are similarly numbered. FIG. 7 specifically shows that predictive model generator 310 or predictive map generator 312, or both, may be located at a server location 1004 that is remote from the agricultural harvester 1000. Therefore, in the example shown in FIG. 7, agricultural harvester 1000 accesses systems through remote server location 1004. In other examples, various other items may also be located at server location 1004, such as data store 302, map selector 309, predictive model 311, functional predictive maps 263 (including predictive maps 264 and predictive control zone maps 265), control zone generator 313, control system 314, and processing system 338.

FIG. 7 also depicts another example of a remote server architecture. FIG. 7 shows that some elements of FIG. 2 may be disposed at a remote server location 1104 while others may be located elsewhere. By way of example, data store 302 may be disposed at a location separate from location 1004 and accessed via the remote server at location 1004. Regardless of where the elements are located, the elements can be accessed directly by agricultural harvester 1000 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the agricultural harvester 1000 comes close to the machine containing the information collection system, such as a fuel truck prior to fueling, the information collection system collects the information from the agricultural harvester 1000 using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on the agricultural harvester 1000 until the agricultural harvester 1000 enters an area having wireless communication coverage. The agricultural harvester 1000, itself, may send the information to another network.

It will also be noted that the elements of FIG. 2, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1002 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 8:
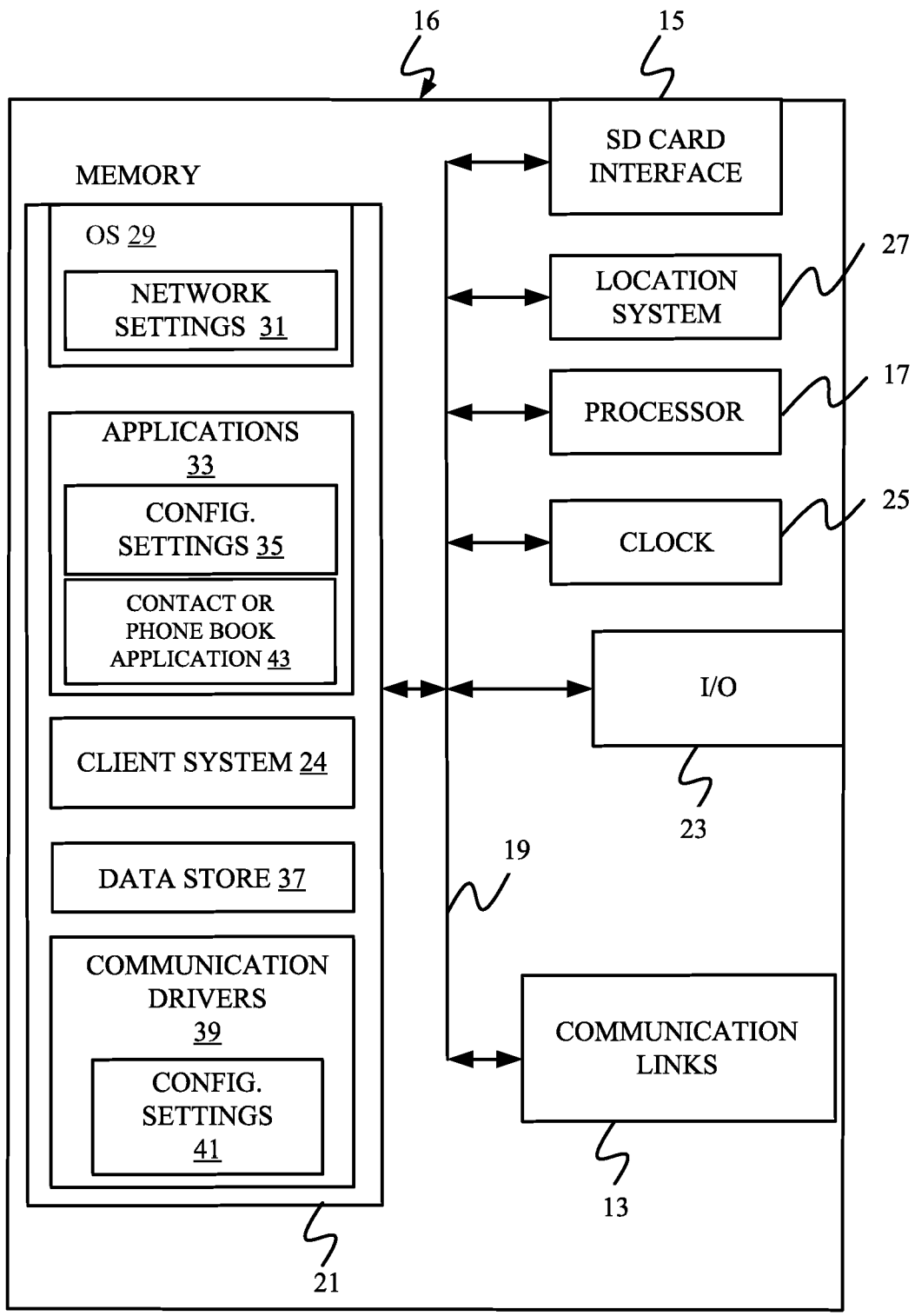
FIGS. 8-10 show examples of mobile devices that can be used in an agricultural harvester.
Figure 9:
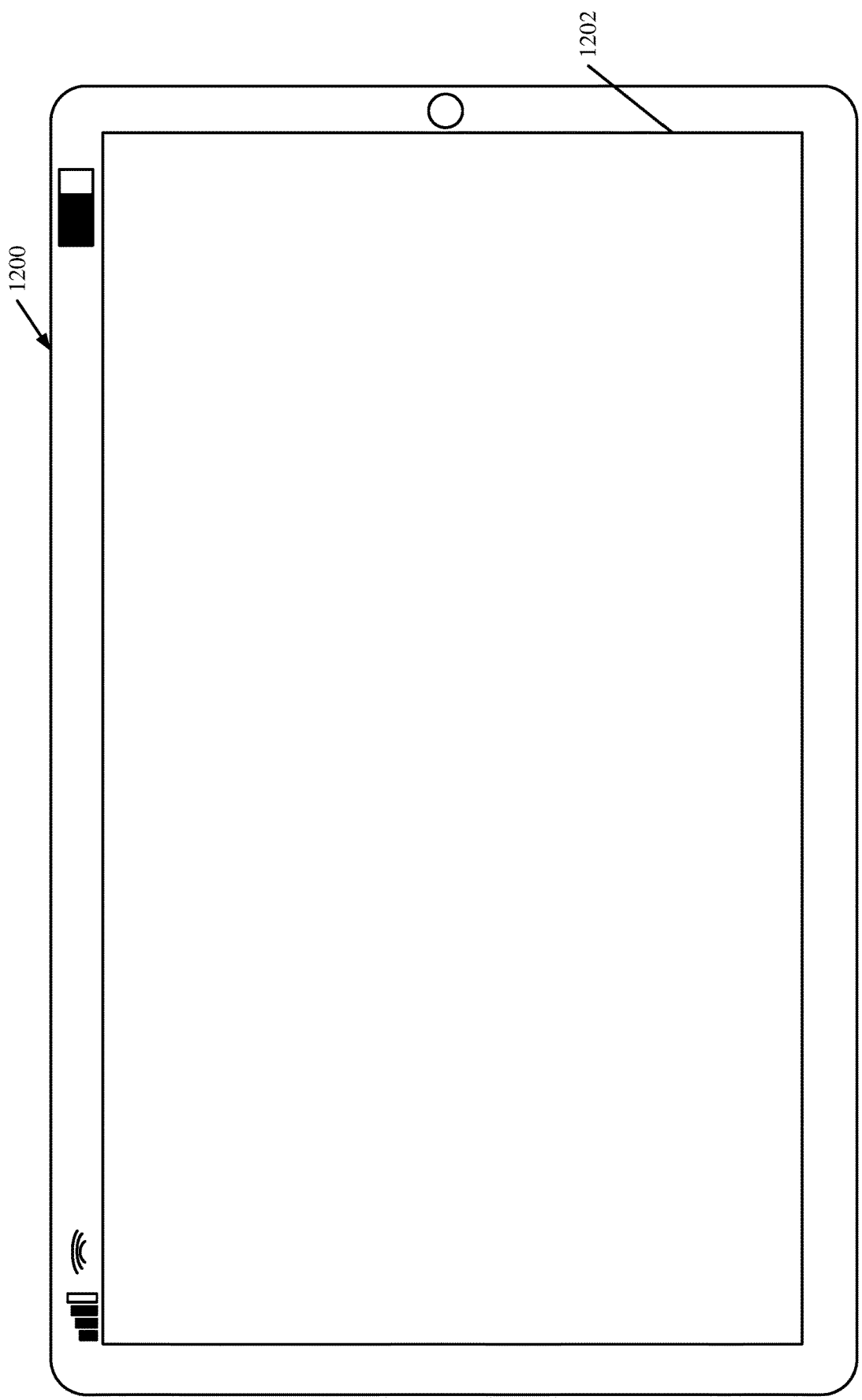
Figure 10:
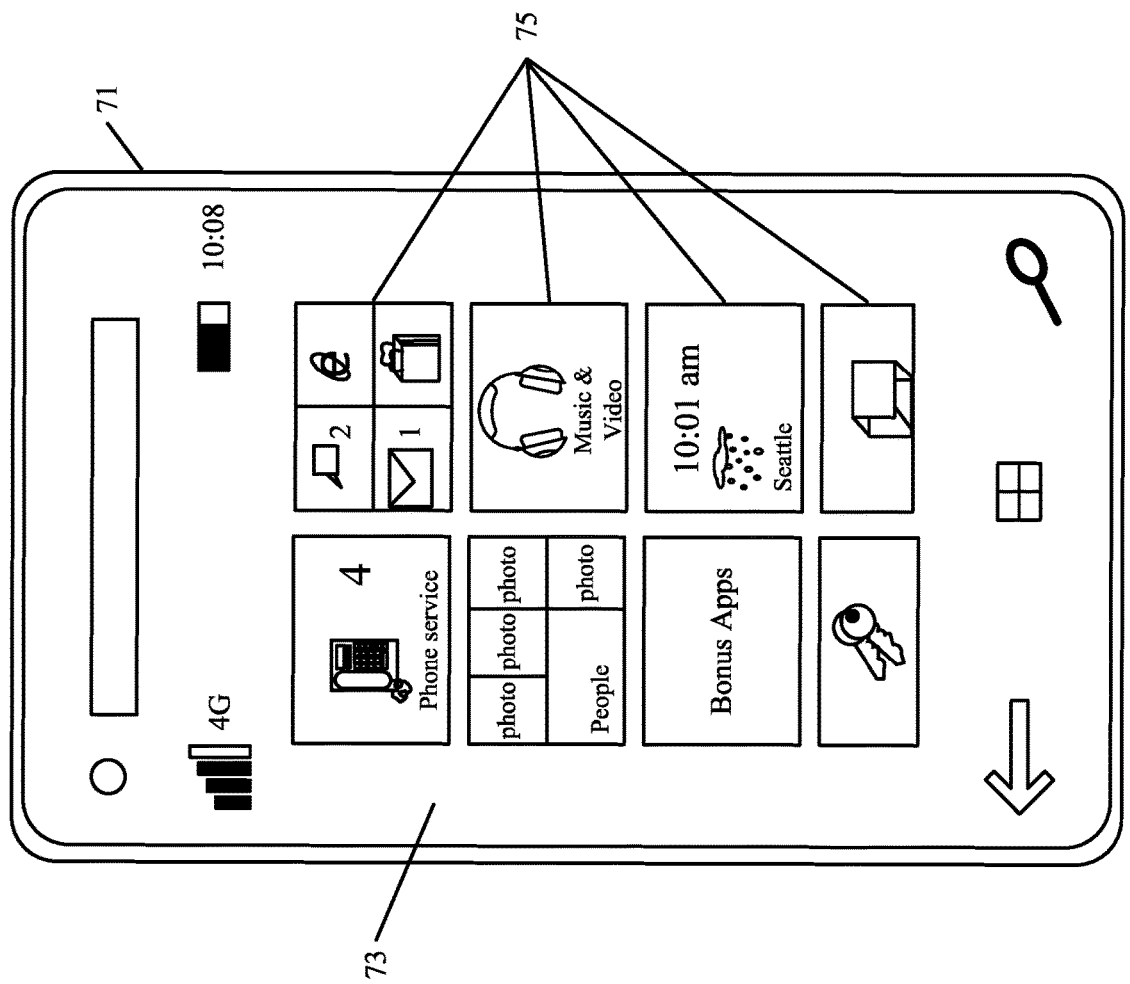

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of agricultural harvester 100 for use in generating, processing, or displaying the maps discussed above. FIGS. 9-10 are examples of handheld or mobile devices.

FIG. 8 provides a general block diagram of the components of a client device 16 that can run some components shown in FIG. 2, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 9 shows one example in which device 16 is a tablet computer 1200. In FIG. 9, computer 1200 is shown with user interface display screen 1202. Screen 1202 can be a touch screen or a pen-enabled interface that receives inputs from a pen or stylus. Tablet computer 1200 may also use an on-screen virtual keyboard. Of course, computer 1200 might also be attached to a keyboard or other user input device through a suitable attachment mechanism, such as a wireless link or USB port, for instance. Computer 1200 may also illustratively receive voice inputs as well.

FIG. 10 is similar to FIG. 9 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
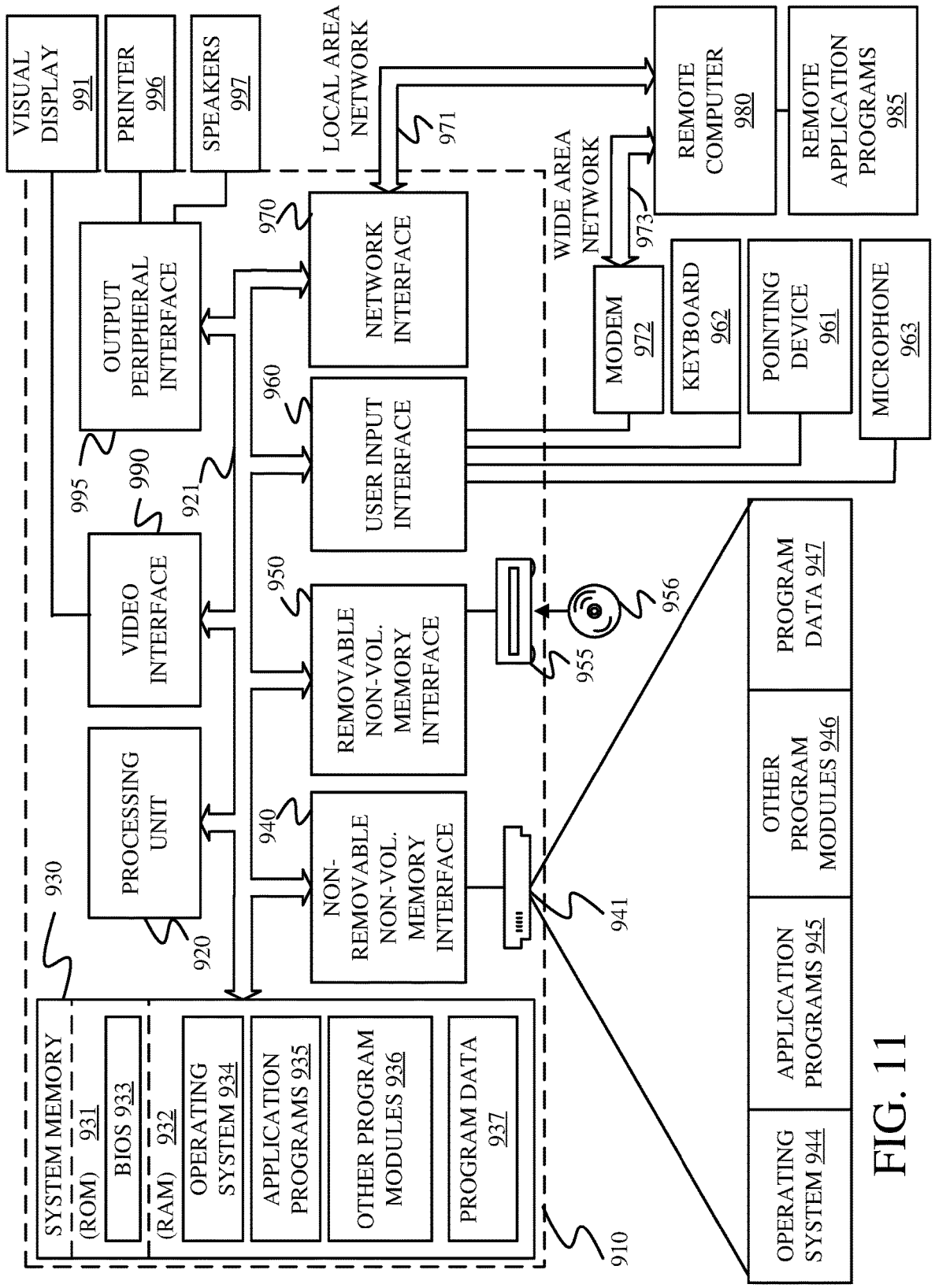
FIG. 11 is a block diagram showing one example of a computing environment that can be used in an agricultural harvester.

FIG. 11 is one example of a computing environment in which elements of FIG. 2 can be deployed. With reference to FIG. 11, an example system for implementing some embodiments includes a computing device in the form of a computer 910 programmed to operate as discussed above. Components of computer 910 may include, but are not limited to, a processing unit 920 (which can comprise processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 2 can be deployed in corresponding portions of FIG. 11.

Computer 910 typically includes a variety of computer readable media. Computer readable media may be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory or both such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data or program modules or both that are immediately accessible to and/or presently being operated on by processing unit 920. By way of example, and not limitation, FIG. 11 illustrates operating system 934, application programs 935, other program modules 936, and program data 937.

The computer 910 may also include other removable/non-removable volatile/nonvolatile computer storage media. By way of example only, FIG. 11 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 910. In FIG. 11, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a controller area network—CAN, local area network—LAN, or wide area network WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 11 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:
   a communication system that receives an information map that maps values of a first characteristic corresponding to a plurality of different geographic locations in a field;
   a geographic position sensor that detects a geographic location of an agricultural harvester at the field;
   an in-situ sensor that detects a value of reel tossing corresponding to a first geographic location of the plurality of different geographic locations in the field, wherein reel tossing comprises tossing of plant material by a reel of a header of the agricultural harvester over a back or a side of the header;
   a model generator that generates a predictive model that models a relationship between values of the first characteristic and values of reel tossing based on a value of the first characteristic, in the information map, corresponding to the first geographic location in the field and the value of reel tossing, detected by the in-situ sensor, corresponding to the first geographic location in the field;
   a map generator that generates a predictive map of the field that maps predictive values of reel tossing to one or more geographic locations of the plurality of different geographic locations in the field based on the predictive model and the values of the first agricultural characteristic, in the information map, corresponding to the one or more geographic locations in the field, the one or more geographic locations in the field different than the first geographic location; and
   a control system that generates a control signal to control a reel subsystem of the agricultural harvester based on the geographic location of the agricultural harvester and the predictive map.

2. The agricultural system of claim 1, wherein the reel subsystem comprises an actuator that is controllably actuatable to adjust a position of a reel of the agricultural harvester, and wherein the control signal controls the actuator to adjust the position of the reel based on the geographic location of the agricultural harvester and the predictive map.

3. The agricultural system of claim 1, wherein the reel subsystem comprises a reel speed actuator that is controllable to adjust a rotational speed of a reel of the agricultural harvester, and wherein the control signal controls the reel speed actuator to adjust the rotational speed of the reel based on the geographic location of the agricultural harvester and the predictive map.

4. The agricultural system of claim 1, wherein the reel subsystem comprises a reel finger position actuator that is controllably actuatable to adjust a position of a reel finger of the agricultural harvester, and wherein the control signal controls the reel finger position actuator to adjust the position of the reel finger based on the geographic location of the agricultural harvester and the predictive map.

5. The agricultural system of claim 1, wherein the first characteristic comprises one of: (i) an optical characteristic; (ii) crop state; (iii) crop height; (iv) vegetative index; (v) yield; (vi) a weed characteristic; (vii) crop moisture; or (viii) genotype.

6. A method of controlling an agricultural harvester comprising:
   receiving an information map that maps values of a first characteristic corresponding to a plurality of different geographic locations in the field;
   detecting a geographic location of the agricultural harvester at the field during a harvesting operation;
   detecting, with an in-situ sensor, during the harvesting operation, a value of shatter corresponding to a first geographic location of the plurality of different geographic locations in the field;
   generating, during the harvesting operation, a predictive model that models a relationship between values of the first characteristic and values of shatter based on a value of the first characteristic, in the information map, corresponding to the first geographic location in the field and the value of shatter, detected by the in-situ sensor, corresponding to the first geographic location in the field;
   generating, during the harvesting operation, a predictive map of the field that maps predictive values of shatter to one or more geographic locations of the plurality of different geographic locations in the field based on the predictive model and the values of the first agricultural characteristic, in the information map, corresponding to the one or more geographic locations in the field, the one or more geographic locations in the field different than the first geographic location; and
   generating, during the harvesting operation, a control signal to control a reel subsystem of the agricultural harvester based on the geographic location of the agricultural harvester and the predictive map.

7. The method of claim 6, wherein generating, during the harvesting operation, the control signal comprises generating, during the harvesting operation, the control signal to control a reel height actuator, of the reel subsystem, that is actuatable to adjust a height of a reel of the agricultural harvester based on the predictive map and the geographic location of the agricultural harvester.

8. The method of claim 6, wherein generating, during the harvesting operation, the control signal comprises generating, during the harvesting operation, the control signal to control a reel speed actuator, of the reel subsystem, that is actuatable to adjust a rotational speed of a reel of the agricultural harvester based on the predictive map and the geographic location of the agricultural harvester.

9. The method of claim 6, wherein generating, during the harvesting operation, the control signal comprises generating the control signal to control a reel finger position actuator, of the reel subsystem, that is actuatable to adjust a position of a reel finger of the agricultural harvester based on the predictive map and the geographic location of the agricultural harvester.

10. The method of claim 6, wherein generating, during the harvesting operation, the control signal comprises generating, during the harvesting operation, the control signal to control a reel fore-to-aft position actuator, of the reel subsystem, that is actuatable to adjust a fore-to-aft position of the reel of the agricultural harvester based on the predictive map and the geographic location of the agricultural harvester.

11. An agricultural system comprising:
- a first in-situ sensor configured to detect, during a harvesting operation, a value of a first characteristic corresponding to a first geographic location in a field;
- a second in-situ sensor configured to detect, during the harvesting operation, a value of a second characteristic corresponding to the first geographic location in the field, the second characteristic comprising one of shatter or reel tossing, wherein reel tossing comprises tossing of plant material by a reel of a header of an agricultural harvester over a back or a side of the header;
- one or more processors; and
- memory storing instructions executable by the one or more processors that, when executed by the one or more processors, configure the agricultural system to:
  - identify, during the harvesting operation, a relationship between the first characteristic and the second characteristic based, at least, on the value of the first characteristic corresponding to the first geographic location detected by the first in-situ sensor and the value of the second characteristic corresponding to the first geographic location detected by the second in-situ sensor;
  - obtain an expected value of the first characteristic corresponding to a second geographic location in the field;
  - identify, during the harvesting operation, a predictive value of the second characteristic corresponding to the second geographic location in the field based on the expected value of the first characteristic corresponding to the second geographic location and the relationship; and
  - control, during the harvesting operation, a controllable subsystem of an agricultural harvester based on the predictive value of the second characteristic corresponding to the second geographic location.

12. The agricultural system of claim 11, wherein the expected value of the first characteristic corresponding to the second geographic location is provided by operator or user input.

13. The agricultural system of claim 11, wherein the expected value of the first characteristic corresponding to the second geographic location is provided by a map of the field.

14. The agricultural system of claim 11, wherein the expected value of the first characteristic corresponding to the second geographic location is a current value of the first characteristic.

15. The agricultural system of claim 11, wherein the controllable subsystem comprises a reel subsystem of the agricultural harvester.

16. The agricultural system of claim 11, wherein the first characteristic comprises one of reel speed, reel height, reel fore-to-aft position, or reel finger position.

17. The agricultural system of claim 11, wherein the instructions, when executed by the one or more processors, configure the one or more processors to:
- obtain, from an information map, a value of a third characteristic corresponding to the first geographic location; and
- identify the relationship as being between the first characteristic, the second characteristic, and the third characteristic based, at least, on the value of the first characteristic corresponding to the first geographic location detected by the first in-situ sensor, the value of the second characteristic corresponding to the first geographic location detected by the second in-situ sensor, and the value of the third characteristic corresponding to the first geographic location obtained from the information map.

18. The agricultural system of claim 17, wherein the first characteristic is one of reel speed, reel height, reel fore-to-aft position, or reel finger position.

19. The agricultural system of claim 18, wherein the third characteristic is one of crop state, an optical characteristic, genotype, crop moisture, vegetative index, yield, a weed characteristic, or crop height.

* * * * *